(12) United States Patent
Albert

(10) Patent No.: US 11,615,485 B2
(45) Date of Patent: Mar. 28, 2023

(54) SYSTEM AND METHOD FOR PREDICTING ENGAGEMENT ON SOCIAL MEDIA

(71) Applicant: Strategic Communication Advisors, LLC., Slingerlands, NY (US)

(72) Inventor: David Kenneth Albert, Slingerlands, NY (US)

(73) Assignee: Strategic Communication Advisors, LLC., Slingerlands, NY (US)

( * ) Notice: Subject to any disclaimer, the term of this patent is extended or adjusted under 35 U.S.C. 154(b) by 0 days.

(21) Appl. No.: 17/150,764

(22) Filed: Jan. 15, 2021

(65) Prior Publication Data

US 2021/0248687 A1 Aug. 12, 2021

Related U.S. Application Data

(60) Provisional application No. 62/961,836, filed on Jan. 16, 2020.

(51) Int. Cl.
G06Q 50/00 (2012.01)
H04L 67/306 (2022.01)

(52) U.S. Cl.
CPC ........... G06Q 50/01 (2013.01); H04L 67/306 (2013.01)

(58) Field of Classification Search
CPC .............................. G06Q 50/01; H04L 67/306
See application file for complete search history.

(56) References Cited

U.S. PATENT DOCUMENTS

| | | | |
|---|---|---|---|
| 2014/0365208 A1* | 12/2014 | De Choudhury | G06F 40/30 704/9 |
| 2015/0067061 A1* | 3/2015 | Poston | H04L 67/20 709/204 |
| 2015/0081609 A1* | 3/2015 | Hande | G06Q 50/01 706/46 |
| 2016/0080485 A1* | 3/2016 | Hamedi | G06Q 50/01 709/204 |
| 2016/0147760 A1* | 5/2016 | N | G06F 16/3322 707/751 |
| 2017/0024454 A1* | 1/2017 | Brunn | H04L 67/535 |
| 2017/0249389 A1* | 8/2017 | Brovinsky | G06F 16/24578 |
| 2017/0262759 A1* | 9/2017 | Lawrence | G06N 5/022 |
| 2017/0323215 A1* | 11/2017 | Lada | G06N 20/00 |
| 2018/0060416 A1* | 3/2018 | Bastide | G06Q 10/10 |
| 2018/0189668 A1* | 7/2018 | Ray | G06Q 50/01 |
| 2019/0163711 A1* | 5/2019 | Dhawan | G06F 16/9535 |
| 2019/0370851 A1* | 12/2019 | Haddadnia | G06Q 30/0244 |
| 2021/0288928 A1* | 9/2021 | Bragdon | G06N 20/00 |

OTHER PUBLICATIONS

Zhang, Suwei, et al. "Hashtag recommendation for photo sharing services." Proceedings of the AAAI Conference on Artificial Intelligence. vol. 33. No. 01. 2019. (Year: 2019).*

* cited by examiner

Primary Examiner — Richard W. Crandall
Assistant Examiner — Corey Russ
(74) Attorney, Agent, or Firm — Heslin Rothenberg Farley & Mesiti P.C.

(57) ABSTRACT

Embodiments of the present invention include a computer program product, a computer system, and a computer-implemented method for generating a data model that machine learns from social media postings to determine whether social media postings will gain traction.

20 Claims, 44 Drawing Sheets

Select all of the items below that describe your image:

☐ Prominently displays at least one person

☐ Provides tips or free content

☐ Offers a behind-the-scenes look at my life

☐ Includes an electronic or tech device

☐ Contains a positive message

☐ Highlights a well-known location

FIG. 31

SYSTEM AND METHOD FOR PREDICTING ENGAGEMENT ON SOCIAL MEDIA

CROSS REFERENCE TO RELATED APPLICATIONS

This application claims priority from U.S. provisional patent application No. 62/961,836, filed Jan. 16, 2020, entitled, "System and Method for Predicting Engagement on Social Media," which are all hereby incorporated herein by reference in their entirety for all purposes.

FIELD OF INVENTION

The present invention provides a system and method for utilizing machine learned to predict engagement for content posted on a social networking or social media platform such as Facebook, Instagram, Twitter and other similar social networks.

BACKGROUND ON THE INVENTION

Social networking platforms which allow people to post text and multimedia/visual content have become a mainstay of everyday life for billions of individuals throughout the world. Because there are so many people using social media, organizations such as businesses, nonprofit associations, government agencies and other entities attempt to leverage social media to cultivate relationships with customers and stakeholders, develop loyalty among customers and stakeholders, as well as build a brand presence. Moreover, organizations can use social media platforms not just to market their goods and services but to communicate with their customers, vendors, suppliers, employees and other target audiences about important information, product updates and events happening within the organization that may affect them.

SUMMARY OF INVENTION

Shortcomings of the prior art are overcome and additional advantages are provided through the provision of a method for predicting engagement for content posted on a social networking or social media platform. In some embodiments of the present invention, automated steps are taken as a result of these predictions. Embodiments of the present invention include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for estimating engagement on a social media post based the components the post, such components including but not limited to a text component, a multimedia/visual component and a hashtag component. Embodiments include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for estimating engagement on a social media post based on the number of followers on the account where the content will be posted. Embodiments include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for predicting engagement on social media based on the content characteristics of a proposed post, the number of followers, and/or the percentage of followers who will likely see a post. Embodiments of the present invention include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for predicting an engagement rate for a proposed social media post based on the presence of certain characteristics known to result in user engagement, such characteristics include but are not limited to: a seasonal component, the provision of tips or advice in a specific content area, a hyperlink, the posing of a question, a call-to-action, positive sentiment, a connection to a current news item, simplicity, and a multimedia/visual component. Embodiments of the present invention include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for determining the predicted engagement of a social media post based on a best fit combination of text and multimedia/visual characteristics identified through a series of statistical analyses to be associated with engagement on a specific social network or social media platform. Embodiments of the present invention include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for calculating a text coefficient for a social media post based on the characteristics of the text in the post, such characteristics including but not limited to the simplicity or readability of the text; the sentiment or polarity of the text; the inclusion of a question, tips or free advice, a call to action, or a link; and relating the content to an item currently being covered in the news, a season, time of year or annual event. Embodiments of the present invention include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for calculating a multimedia or visual coefficient for a social media post based on the characteristics of a photograph, graphic, diagram, infographic, video, animation, audio or some other like file that depicts an image, motion picture or sound recording, or some combination of these items in the post, such characteristics including but not limited to the prominent display of people, identifiable places or landmarks, technological devices, positive or inspirational messages, tips, or behind-the-scenes activities. Embodiments of the present invention include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for calculating a hashtag coefficient for a social media post based on the number of hashtags in the post and the mean engagement rate associated with an increase in the engagement rate for posts in a database of pre-existing social media posts. Embodiments of the present invention include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for predicting an engagement rate on social media based on a correlation between the engagement rate and the known engagement characteristics for a dataset of pre-existing social media posts. Embodiments of the present invention include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for estimating engagement on social media based on a series of linear or multiple linear regression equations using different combinations of variables proven to increase engagement. Embodiments of the present invention include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for predicting engagement on social media based on linear or multiple linear regressions in which engagement or engagement rate is the dependent variable. Embodiments of the present invention include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for predicting engagement on social media using a series of equations based on a linear, exponential or logarithmic regression. Embodiments of the present invention include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for predicting engagement on social media based on a series of "n" number of equations that take into account different combinations of characteristics of a proposed social media post. Embodiments of the present invention include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for assigning specific numerical values to content characteristics in a predictive model based on linear or multiple linear regression analyses where the content characteristics that have significant correlations with engagement rate are used as independent variables and engagement rate is the dependent variable. Embodiments of the present invention include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method to determine the predicted engagement rate with a post based on the number of followers on the social media account where the content will be posted and the impression rate, or the percentage of the account's followers who are expected to see the post. Embodiments of the present invention include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for (automatically) selecting the most accurate predictive model for a social media post from "n" number of equations based on a comparison of the "n" number of predicted engagements with actual engagement for a series of pre-existing Facebook posts and selecting the equations that rank highest or attain the greatest number of points in a selection factor matrix. Embodiments of the present invention include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for selecting an equation for predicting engagement on social media by passing the results from "n" number of equations through a series of logical conditions such that the lowest positive value for predicted engagement is selected. Embodiments of the present invention include a computer program product (comprising a storage medium readable by a processing circuit and storing instructions for execution by the processing circuit for performing a method), a computer system (including a memory, one or more processors in communication with the memory, and program instructions executable by the one or more processors via the memory to perform a method) and a computer-implemented method for predicting the engagement rate for a social media post based on the predicted mean engagement rate for a given number of followers on the social media account from which the content will be posted.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

The present invention provides a system and method for predicting engagement for content posted on a social networking or social media platform such as Facebook, Instagram, Twitter and other similar social networks. Further details appear in the Detailed Description.

BRIEF DESCRIPTION OF DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings, which are filed herewith and described in the Detailed Description.

FIG. 31 depicts various aspects of some embodiments of the present invention.

DETAILED DESCRIPTION OF THE INVENTION

Figure 1:
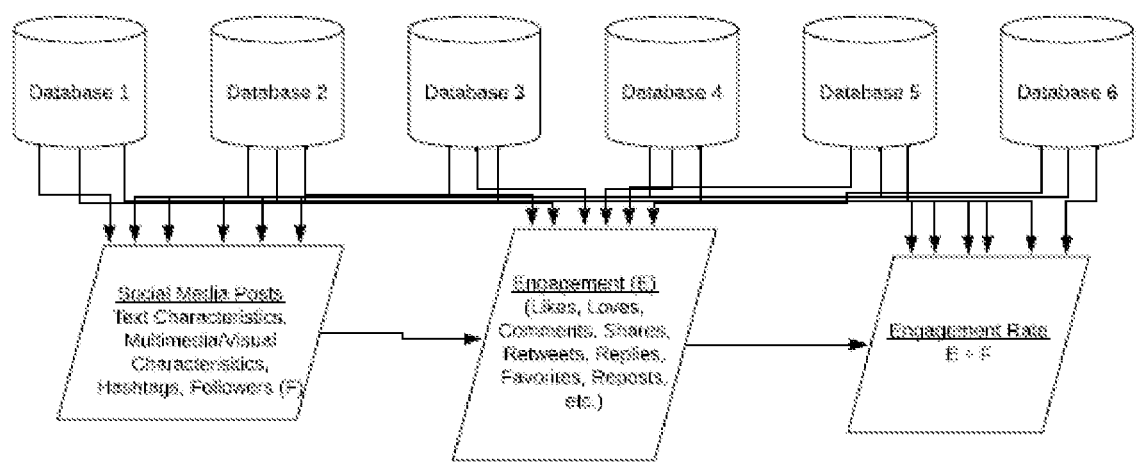
FIG. 1 is a technical computing environment in which various aspects of some embodiments of the present invention can be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. Program code can be depicted as a program/utility, having a set (at least one) of program modules, may be stored in one or more memories.

One of the most compelling aspects of social media platforms is that they allow two-way communication between an organization and its social media audience. In this aspect, social media marketing communications differs from many other forms of marketing communication such as direct mailings, brochures, letters, traditional advertising and the like, all of which allow only one-way communication with the target audience. On social media, feedback from one's audience is often immediate, as individuals see a post appear in their newsfeed or timeline and react to it, sometimes in real time. Such two-way communication typically takes the form of the audience reacting to a post by "liking" or "loving" the post, "sharing" the post with others in their social network, "retweeting," "replying," to or "commenting" on the post and the like. Thus, organizations can monitor how individuals are interacting with the content they post.

Despite the enormous potential that the use of social media holds for organizations to reach potential customers and build relationships with important stakeholders, there are many practical challenges associated with social media marketing. These challenges include finding the time to post content on a regular basis so as to establish and maintain a consistent presence on various social media networks, as well as the cost of hiring a social media agency or professional to create, post and monitor content on social networks. Perhaps the greatest challenge, even for social media savvy professionals, is creating content that will prompt the target audience to "like," "love," "share," "retweet," "reply," "comment," etc.

More specifically, the challenge in creating content for social media is twofold: first, one has to create content that stands out from the steady stream of posts coming from other users. On Twitter, for example, approximately 500 million tweets are sent every day; nearly 6,000 tweets are posted every second. Moreover, tweets themselves are often fleeting and momentary; the so-called "half-life" of a tweet is 24 seconds. Thus, an individual sending a tweet has only a small window of opportunity to capture their audience's attention. On Facebook, the average number of friends is 338, which means that a person could have dozens of new posts from friends appear in their newsfeed at any given time.

The second challenge in creating content for social media is getting the user to take some action, or engage with the content after it has momentarily caught their attention. This challenge is made more daunting by the fact that the algorithms that determine which content will appear in an individual's newsfeed, timeline, etc. often take into consideration how frequently that individual has engaged with content posted by that same source in the past. That is, social media networks often target content toward individuals who have previously interacted with content from the same source. For example, as an individual on Facebook engages (likes, shares, etc.) with content from account A, that individual is likely to see more posts from account A in the future. In social media terminology, interaction or engagement with a post increases "organic reach," or the number of people who see the post without using paid advertising to promote the post. Conversely, if an individual consistently does not interact with content from account A, social media network algorithms may adjust to this lack of interaction and distribute less content from account A to that individual. If this lack of activity occurs with other individuals as well, it can reduce the overall number of people who see posts from account A—i.e., the account's organic reach. Therefore, one has a compelling need to create content that will prompt one's audience to engage (i.e., like, love, share, retweet, reply, comment, etc.).

In addition, educational institutions have a need to instruct students who are studying marketing, public relations, communications, business, public policy and other disciplines on how to create engaging content for social media. Because social media use is so pervasive in society, students who wish to work in these fields can be knowledgeable in how to use social media to support a business, promote a social cause, or carry out some other endeavor. A number of colleges and universities currently offer standalone courses in social media, or include instruction in social media as part of the curriculum in other courses.

There is a need for an instrument to help individuals who are using social media platforms on behalf of any organization or endeavor to develop content that will capture the attention of their target audience and prompt the audience to take some action such as like, love, share, retweet, reply, comment, etc. Such an instrument could be used by businesses, nonprofit organizations, government agencies and other entities to create social media content that increases awareness among a target audience of their specific goods, services, mission, causes and overall brand. Moreover, such an instrument can help generate sales, loyalty and satisfaction among the target audience of each entity. Even individuals who are not affiliated with a business, organization, institution or other entity could use such an instrument to increase interactions with their posts and help increase their organic reach among their social media friends, followers and the like, resulting in more people seeing their posts. Further, there is a need for an instrument to help students in educational environments learn how to use social media effectively and become skilled in the practical application of social media. Such an instrument could be a valuable instructional technology on how to create engaging posts for students studying applied social media.

Embodiments of the present invention include computer program products, computer systems, and computer-implemented methods that help individuals who are using social media platforms on behalf of any organization or endeavor to develop content that will capture the attention of their target audience and prompt the audience to take some action such as like, love, share, retweet, reply, comment, etc. The guidance provided to individuals is not only automated, but also, timely. Furthermore, in embodiments of the present invention, the program code generates a model and trains thus model to provide improved guidance moving forward. In addition to providing the guidance, the program code can take definitive action to promote content to audiences on various computing platforms. Embodiments of the present invention are inextricably linked to computing at least because examples disclosed herein address issues specific to social media using a hardware and software framework which is the vehicle upon which social media exists and is promoted. Hence, both the issue and solution are inextricably tied to computing. Additionally, the integration of machine learning into the application enabled the continued improvement of the core functionality of certain embodiments of the present invention. Furthermore, embodiments of the present invention are practice in that they address this unique social media issue and provide usability as well as automated artificial intelligence in addressing the issue. Finally, examples herein offer significantly more as the processes described herein address specific issues, which are explained herein, in a manner that was not previously possible.

The content of a social media post typically contains two main components and one subcomponent:

(i) a language-based TEXT component in which the individual creating the post composes a message that he or she wants to communicate to his or her audience using alphanumeric data including words, letters, numbers, characters, etc., and may also include emojis; and (ii) a computer file-based MULTIMEDIA or VISUAL component that contains a photograph, infographic, diagram, video, animation, audio or some other like file that depicts an image, motion picture or sound recording, or some combination of these items, often in the form of a .jpg, .jpeg., .png, .gif, .tiff, .mov, .mp4, .wmv, .fly, .ogv., .webm, .mp3, etc. that the user uploads, drags, etc. to a social media platform. A multimedia/visual component can also include an augmented reality or three-dimensional image, a virtual reality image and the like.

(iii) a HASHTAG subcomponent, often included as part of the text component, that encompasses one or more phrases that begin with the "pound" sign (#) followed by a string of alphanumeric data such as words, numbers and/or characters with no spaces separating them.

In addition, another important factor in predicting engagement for a proposed social media post is FOLLOWERS, or the number of individuals and other accounts on the same social media platform that receive posts, content or notifications and the like in their feed, timeline or other form of user interface from the account that will be posting. To become a follower of an account on a particular social media network, one can create an account on that network and then "follow" or "like" a specific page, account, etc., or take some other similar action that results in the receipt of posts, content, notifications, etc. from another account.

For the purposes of this invention, ENGAGEMENT is defined as an individual taking some action in response to a specific post or content on a social media platform such as Facebook, Twitter, Instagram, and other similar platforms that allow users to post, share, reply and comment on content. The action taken by the user in response to specific content includes but is not limited to "liking", "sharing", "replying," "commenting", "retweeting", "reposting", "favoriting" or other similar action. Engagement is defined as the sum total of all these actions for a particular post or social media content. The ENGAGEMENT RATE for a post is defined as the quotient of engagement divided by followers.

The process for predicting engagement on a specific social media network begins with the collection of data from that network. FIG. 1 describes a database of pre-existing content from various organizations and individuals that have been posted on different social media networks including but not limited to Facebook, Instagram and Twitter.

In this embodiment of the invention, for each social media network, program code executing on one or more processors takes a sample of pre-existing content or "posts" from various organizations and individuals such as nonprofit organization "A", nonprofit organization "B", small business "C", small business "D", social media influencer "E", social media influencer "F" and the like. Such pre-existing posts are stored in a series of databases that correspond to the specific social network on which the content was posted (Facebook, Instagram, Twitter, etc.).

Figure 2:
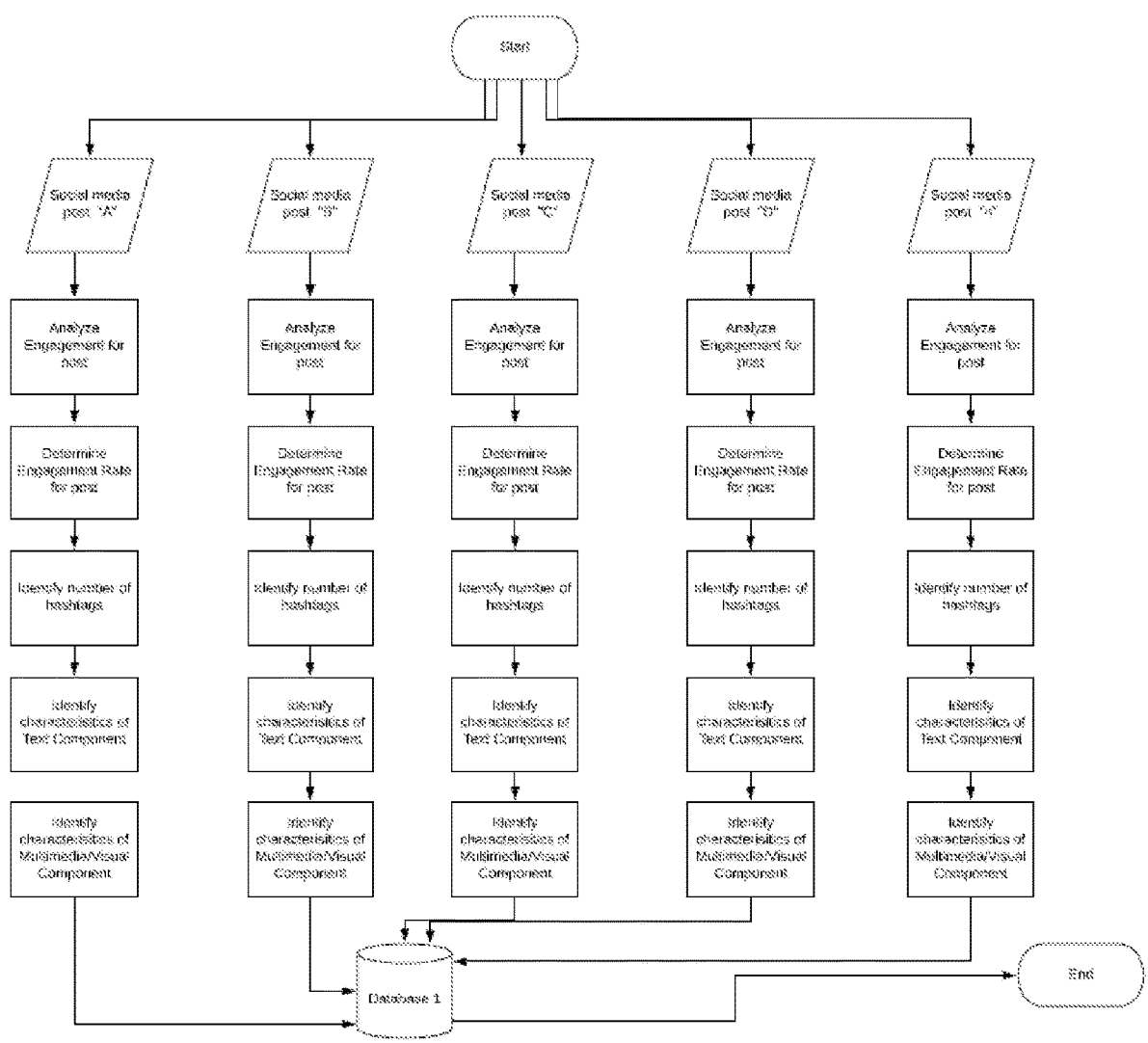
FIGS. 2-2A are workflows that depict various aspects of some embodiments of the present invention.

For each single post in a database (FIG. 2), the program code determines engagement, expressed as a whole number, by taking the sum of the total number of interactions with the post taken by members of the respective social network. Such interactions can include but not be limited to an individual "liking", "loving", "sharing", "retweeting", "reposting", "replying" to or "commenting" on that post. The program code then calculates the engagement rate, expressed as a decimal, for each single post by taking the quotient of engagement divided by the number followers on the account where the content was posted.

Next, for each single post, the program code in an embodiment of the present invention checks the text component for the presence of certain characteristics positively associated with engagement. The presence or absence of each characteristic is denoted in the database by "yes" or "no", "true" or "false", "0" or "1", or some other Boolean operator. The program code then checks the multimedia/visual component of each post for the presence or absence of engagement characteristics, such presence or absence being denoted in the database by "yes" or "no", "0" or "1", or other Boolean operator.

In some embodiments of the present invention, the program code then checks the text component of the post to determine the presence or absence of one or more hashtags and denote the specific number of hashtags, expressed as a positive whole number, such as 0, 1, 2, 3 (and so on) in the database. The program code can analyze the text utilizing one or more natural language processing algorithms.

Figure 2A:
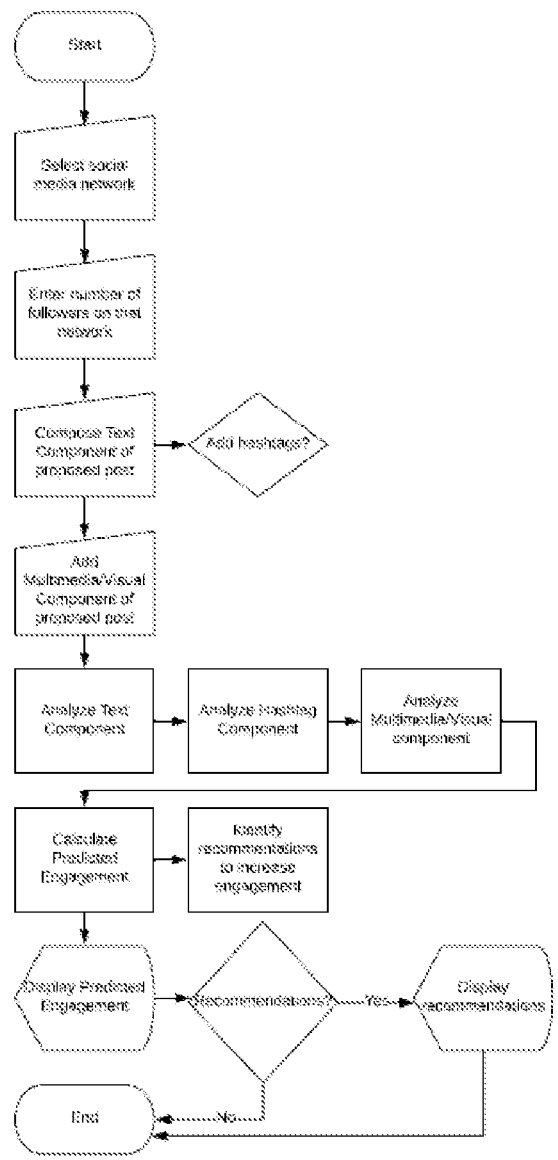
Figure 2B:
FIG. 2B is an example of a graphical user interface displaying various aspects of some embodiments of the present invention.

The present invention displays an interface (FIG. 2a, FIG. 2b) in which the user selects the social media outlet such as Facebook, Instagram, Twitter or the like on which he/she would like to post content. The interface includes an area where the user enters the number of followers or page likes, etc. he/she has on the social media account from which the content will be posted. The interface then presents the user with an area in which they can enter the text component and hashtag subcomponent of a proposed social media post, as well as an area in which the user can upload, drag-and-drop, or otherwise include a multimedia component of a proposed social media post.

Figure 3:
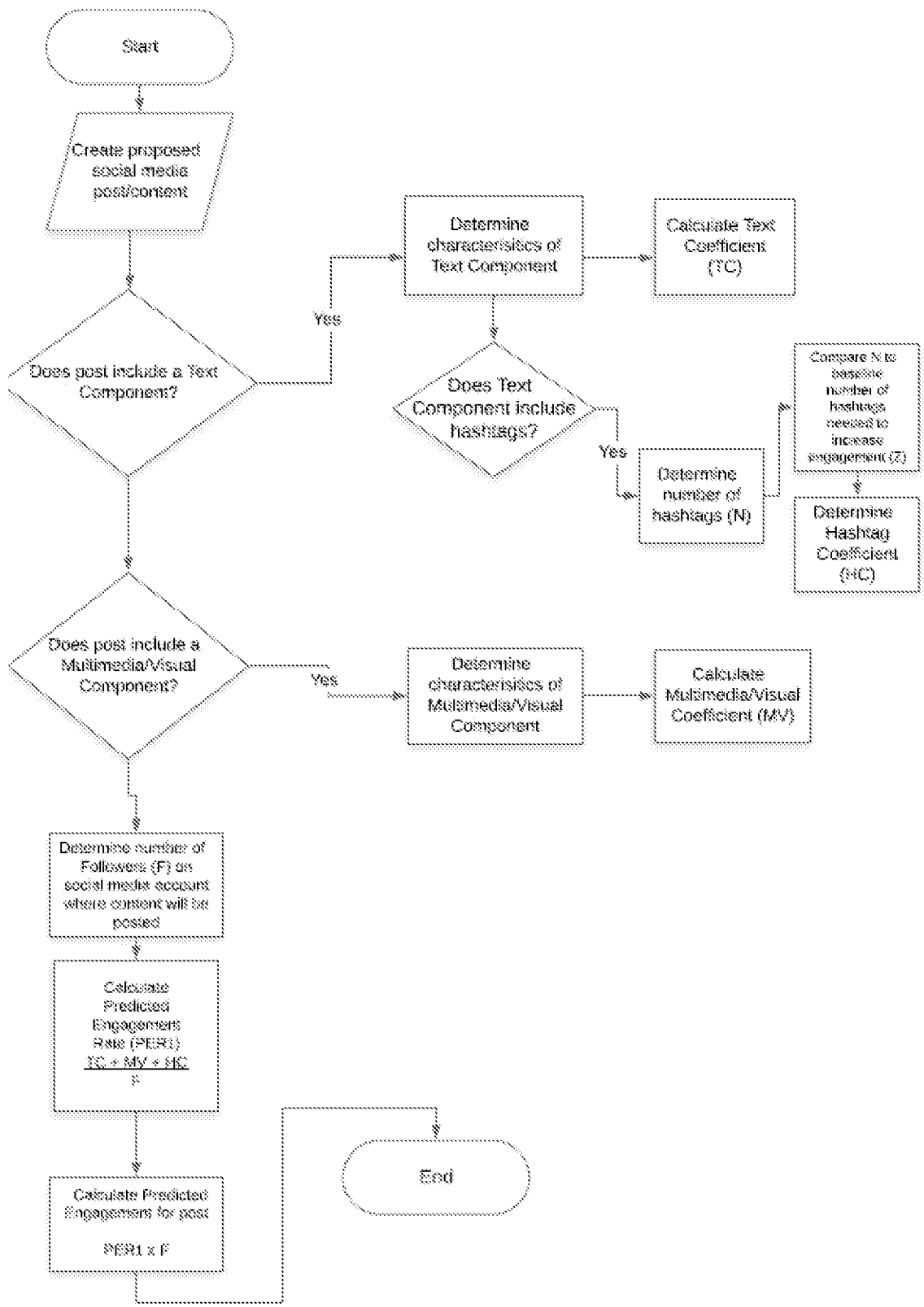
FIG. 3 is a workflow that depicts various aspects of some embodiments of the present invention.
Figure 4A:
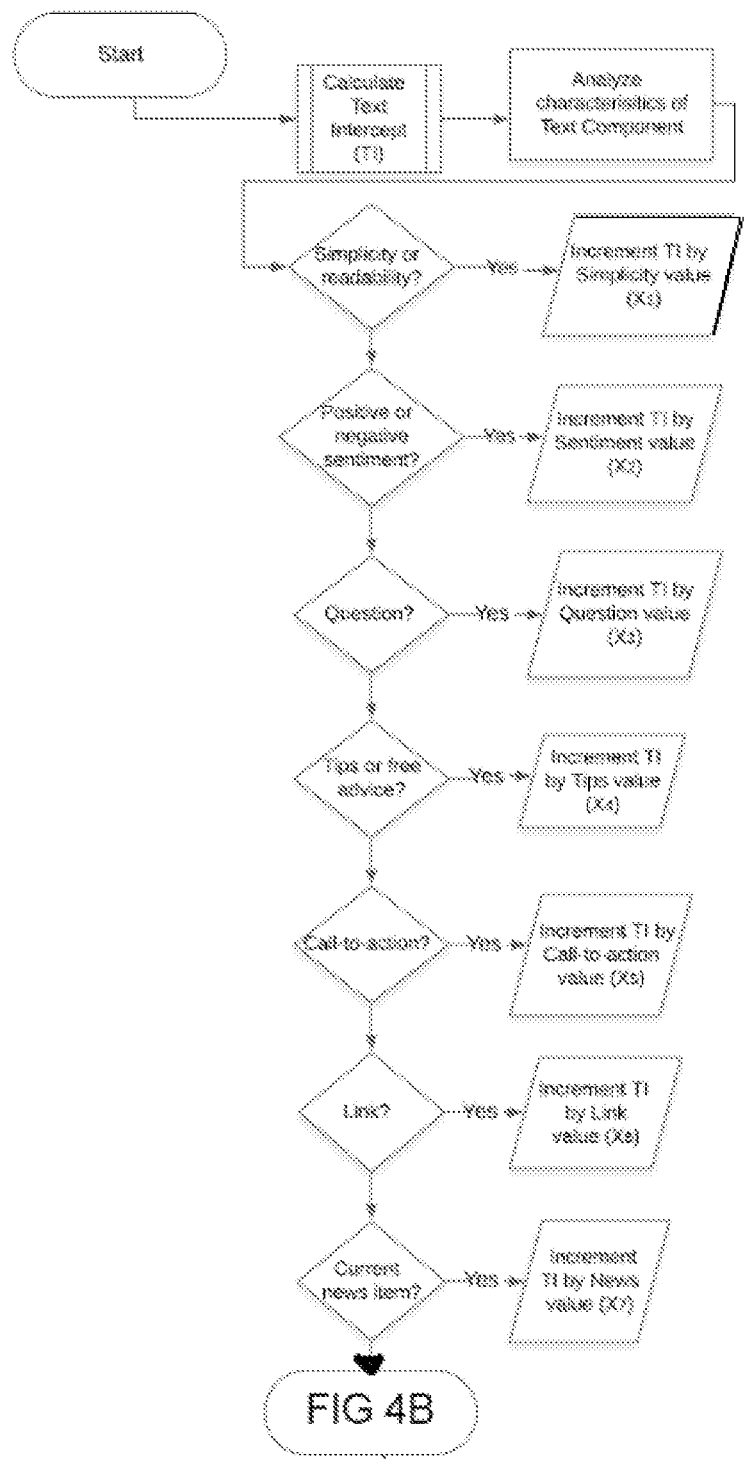
FIGS. 4A-4B are workflows that depict various aspects of some embodiments of the present invention.
Figure 4B:
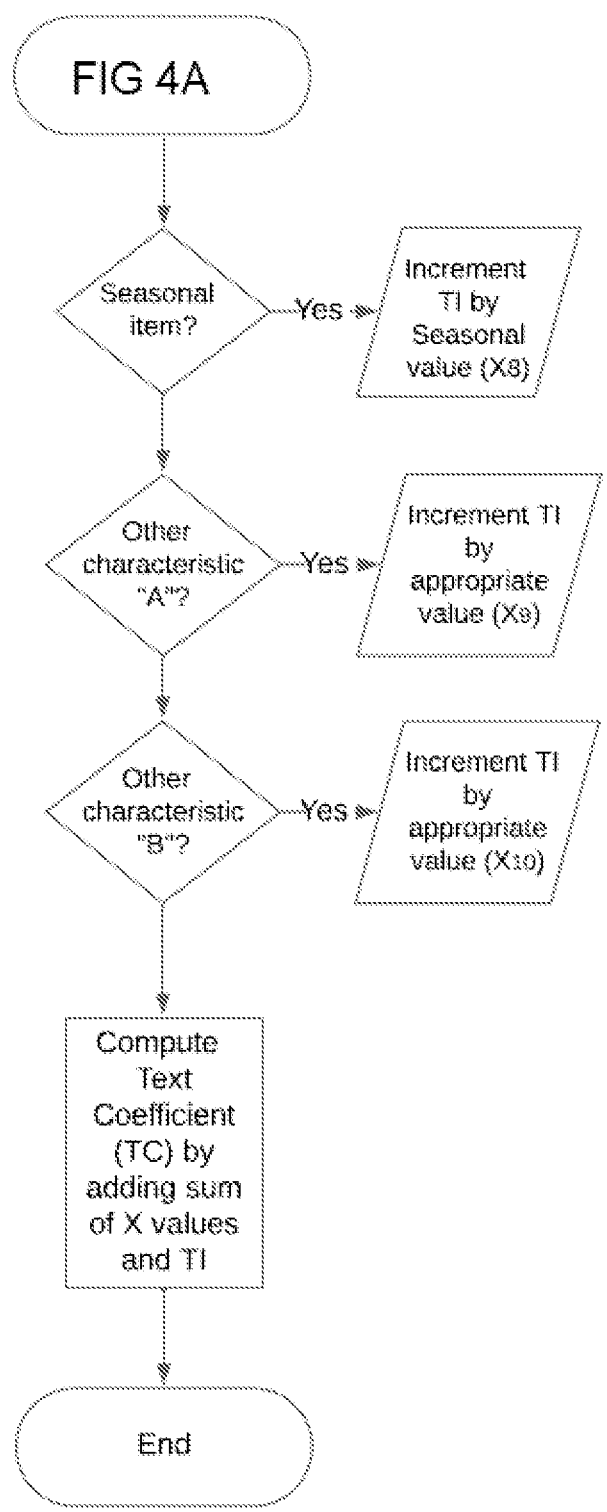

The first step in the invention is to analyze the characteristics of the TEXT component of a proposed social media post for the presence of specific characteristics or qualities that research shows contributes to engagement on social media (FIG. 3, FIGS. 4A-4B). These characteristics include but are not limited to: SIMPLICITY or READABILITY, SENTIMENT, QUESTION, TIPS, CALL TO ACTION, LINK, NEWS, and SEASONAL.

One characteristic that has been proven to contribute to engagement on social media is the SIMPLICITY or READABILITY of the text in the proposed social media post. Posts with fewer words are more likely to be read by the end user than much longer posts. In addition, posts that are written at a certain reading level and contain words that are known by more people, as opposed to esoteric, technical words and jargon, are likely to be understood by more people. Therefore, in this embodiment of the invention, the simplicity or readability of a proposed social media post can be measured by the number of words in the post, and/or the complexity of the words in the post based on a reading level analysis of the words in the post.

For example, the program code in some embodiments of the present invention can determine simplicity or readability by establishing a cutoff for either the total number of words or the total number of characters in a proposed post at any whole number (X), where X can equal 50, 100, 200, 300 and the like, based on a statistical analysis of the word or character counts in posts and engagement levels on those posts. If the number of words (W) or the number of characters (C) in the proposed post is less than or equal to X, then the post is deemed to possess the characteristic of Simplicity/Readability (S). The program code can then assign a Boolean value of "yes" or "no", "true" or "false" and the like, as in below:

$$W \| C \leq X \rightarrow S = \text{true}$$

$$W \| C > X \rightarrow S = \text{false}$$

In one implementation, to improve the readability of a proposed social media post, the program code can choose to allow a maximum word or character count. If the word (W)

and/or character (C) count in the proposed post exceeds a pre-set value for X, then the program code can require the individual creating the post to reduce the number of words and/or characters before executing the predictive equation. Or, the program code can assign a numerical value to Simplicity/Readability (S) based on a statistically significant unstandardized coefficient for this metric in a multiple linear regression in which simplicity and readability as measured by word or character count is an independent variable and engagement, or engagement rate, is the dependent variable. For example, if X=100:

$$W||C \leq 100 \rightarrow S=5.765$$

$$W||C>100 \rightarrow S=0.000$$

Another way to measure the simplicity or readability of a proposed social media post is by examining the specific language, or actual words, used in the text component of the post. In this implementation, the program code can apply a known reading-level scale to the text to determine the reading or grade level at which the text is written. In general, text written at lower reading or grade levels will be more readable and understood by a higher percentage of social media users who may see the proposed post. Text written at an eight-grade reading level, for example, will be understood by a larger number of people than text which is written at a college level. The program code can identify a readability score (RS) based on the reading level of the post using known methods for assessing readability and then assign a value to the simplicity characteristic (S). For example, in the implementation below, Y equals the grade level at which the text is written. If the program code sets the target reading level for the text component of the proposed social media post at grade 8 such that Y=8 (and/or this level is preconfigured by an administrator), the program code can assign a specific value to S as follows:

$$RS \leq 8 \rightarrow S=5.765$$

$$RS>8 \rightarrow S=0.000$$

The next step in the invention is to determine whether the SENTIMENT or POLARITY of the text is positive, negative or neutral. One embodiment of this step of the invention is to use a sentiment analysis technique in which the words entered by the user in the proposed social media post are compared to lists of positive and negative words. In this embodiment, the program code would count the number of words in the text portion of the post that appear in the lists of positive and negative words, respectively. If the number of words in the proposed post that appear in the list of positive words exceeds the number of words in the proposed post that appear in the list of negative words, then the tone of the post is assigned a positive sentiment, as shown in the process below where: ST equals Sentiment, PW is the number of positive words in the post, and NW is the number of negative words in the post. If the number of words in the proposed post that appear in the list of negative words is less than or equal to the number of words in the proposed post that appear in the list of positive words, then the post is assigned a sentiment of negative or neutral.

$$PW>NW \rightarrow ST=Positive$$

$$NW \geq PW \rightarrow ST=Negative/Neutral$$

Similarly, if the number of words in the proposed post that appear in the list of positive words exceeds the number of words in the proposed post that appear in the list of negative words by a certain pre-set ratio (A:B), then the tone of the post is assigned a positive sentiment, as shown in the equations below where ST equals Sentiment, PW:NW is the actual ratio of positive words to negative words in the post and A:B is a pre-set ratio of positive to negative words such as 3:1 or 5:1 at which the tone of the post is deemed to be positive. If the ratio of positive words to negative words in the post is less than the pre-set ratio, then the sentiment of the post is deemed to be negative.

$$PW:NW \geq A:B \rightarrow ST=Positive$$

$$PW:NW<X:Y \rightarrow ST=Negative$$

If the overall sentiment of the proposed post is positive, then the program code assigns the value of the Sentiment Characteristic (SC) from the regression equation for each social media network in the equation for predicting engagement. The value of sentiment in contributing to engagement can differ based on the social media outlet for which the proposed post is written. For example, sentiment may be a larger contributing factor to engagement on Facebook than it is on Twitter. In this manner, the weight of the Sentiment Characteristic (SC) in the equation for predicting engagement on Facebook may be higher than in the predictive equation for Twitter:

$$SC_{(Twitter)}=2.526$$

$$SC_{(Facebook)}=11.118$$

In addition, the value assigned to the Sentiment Coefficient (SC) for the same social media outlet is not constant, as it can vary based on the other variables in the equation being used to predict engagement:

$$SC_{(Facebook)}=11.118 \quad \text{(equation \#1)}$$

$$SC_{(Facebook)}=0.002 \quad \text{(equation \#2)}$$

If the overall sentiment of the proposed post is negative or neutral, then the program code sets the value of the Sentiment Characteristic (SC) to zero.

Another factor that can contribute to engagement on social media platforms is the direct posing of a QUESTION to one's audience. Posing a question is a direct request for interaction, in the sense that the poster would like the end user to answer or respond to the question. The program code therefore checks the text component of the proposed social media post for the presence of a question. More specifically, the program code determines if the user has posed a question by checking the text of a proposed social media post for the presence of a question mark character, or "?". If the proposed post includes a question, then the program code assigns a value to the Question characteristic (Q) based on a statistically significant unstandardized coefficient in the multiple linear regression equation for the respective social media network. If the proposed social media post does not include a question, then the program code sets the value of the Question characteristic (Q) to zero, as shown below:

$$Q_{(Instagram)}=0.055$$

$$Q_{(Twitter)}=0.048$$

$$Q_{(Facebook)}=0.000$$

Another factor that contributes to engagement is the presence of free content in the form of TIPS or advice, suggestions and the like that can help improve one's professional or personal life. The emphasis is on tips and practical information that the end reader can use in his or her daily life. This category can include advice on a wide range of topics such as managing stress at work, multi-tasking, raising children, improving gardening skills, becoming a better public speaker, etc.,—in short, any type of information provided directly in the social media post that can lead to self-improvement or professional development. The free content or advice in the proposed social media post can relate to a specific industry or area of expertise such as marketing, general management or leadership advice, as well as lifestyles such as diet and exercise choices, etc. More specifically, an accountant may include tips for filing one's income taxes, an attorney may provide legal advice on how to start a business, a chef may offer culinary advice, and the like.

In one embodiment of the invention, the program code determines if the proposed social media post includes advice, tips or practical information by analyzing the text for the presence of specific words that are typically identified with the dispensing of advice, as well as words associated with success and achievement. In particular, the program code checks (e.g., utilizing one or more natural language processing algorithms) the text of the proposed post for the following types of words:

NOUNS such as: "tips", "advice", "lessons", "pointers", "takeaways", "axioms", "signs", "hints", "insights", "how to", "know-how", "expertise", "facts", "habits", "mastery", "counsel", "recommendations", "secrets", "solutions", "success", "wisdom", "truths", "maxims", "symptoms" and similar such words.

VERBS that might precede these nouns, or that could be used to describe the act of giving advice such as: "offer", "impart", "learn", "improve", "increase", "help", "hone", "overcome", "prepare", "raise", "achieve", "attain", "heighten", "accomplish", "simplify", "enhance", "restore", "streamline", "strengthen", "troubleshoot", "maximize", "succeed", "understand" and similar words.

ADJECTIVES that are used to describe advice such as: "foolproof", "proven", "free", "essential", "hands-on", "practical", "key" and similar words.

If the aforementioned words or other like-words are present in the text portion of the post, then the program code assigns a weight to the Tips characteristic (T) based on a statistically significant unstandardized coefficient in the multiple linear regression equation for the respective social media outlet. If these words are not present in the post, the program code assign a weight of zero to the Tips characteristic (T).

$$T_{(Twitter)}=0.160$$

—OR—

$$T_{(Twitter)}=0.000$$

The text portion of a proposed social media post can include a CALL-TO-ACTION. A call-to-action is an invitation or direct request to one's audience to take a specific action such as: sign an online petition, take a survey or quiz, participate in a poll, join a mailing list, click on a link, share a post, like a page, follow a specific account, retweet a photo, tag (i.e., mention) another user in a post, play a game, join a group or event, provide feedback, etc. A call-to-action is measured by the presence of certain action verbs that ask the end user to take some specific action. Therefore, in one implementation of the invention, we determine whether a proposed social media post includes a call-to-action by searching the text component of the post for the presence of action verbs that invite, direct or ask the end user to take a specific action. Such action verbs include but are not limited to words such as: "join", "take", "participate", "send", "click", "call", "contact", "act", "activate", "read", "start", "submit", "view", "visit", "watch", "hear", "listen", "tell", "identify", "enter", "open", "vote", "share", "comment", "reply", "retweet", "re-post", "follow", "like", "tag" and the like.

If the text portion of a proposed social media post includes a call-to-action, then we assign the proper numerical weight to the Call-to-Action characteristic (CTA) based on the statistically significant unstandardized coefficient in the multiple linear regression equation for that social media outlet. Otherwise, we assign a weight of zero to the Call-to-Action (CTA) component of the predictive model, as in:

$$CTA_{(Instagram)}=0.055;$$

—OR—

$$CTA_{(Instagram)}=0.000;$$

If certain characteristics of the text component of a proposed social media post are highly correlated with each other, we might select only one measure as an embodiment of that characteristic. For example, if the presence of a question in a proposed social media post is highly correlated based on a significant correlation coefficient or factor analysis with the presence of a call-to-action in increasing either engagement (i.e., the number of likes, shares, comments, replies, retweets, etc.) or the engagement rate (total engagement divided by number of followers), then we might select only one of these measures to include in the predictive model, but not both measures, as in:

$$(Q_{(Instagram)}>0)\&(CTA_{(Instagram)}>0) \rightarrow CTA_{(Instagram)}=0$$

In this manner, we set the Call-to-Action variable (CTA) at zero and use the statistically significant unstandardized coefficient for Question (Q) in the predictive equation.

Including a LINK that an end user may click on can generate engagement with a social media post. For example, many individuals using Twitter include a link to a blog entry or website in their tweets so that the end user can interact with, or click on the link to find more information about a given topic, read an article, browse a website, etc. We can check for the presence of a link in a proposed social media post by identifying a URL, or Universal Resource Locator, in the text component of the proposed post. In an embodiment of the invention, we would search for specific letter combinations that indicate the presence of a URL or link. These letter combinations include: URL protocols such as "http", "https", "ftp", etc.; components of a web domain name such as "www", ".com", ".net", ".edu", ".org", ".gov" and the like; as well as phrases that appear in a link shorteners such as: "tinyurl", "t.co", "lnkd.in", "goo.gl", "ow.ly", and the like.

If the text portion of the proposed social media post includes a link, we can then assign a numerical value to the link characteristic (L) in the predictive model. In one embodiment of the invention, the value of L is based on the statistically significant unstandardized coefficient in a multiple linear regression equation where the presence of a link is an independent variable and engagement or engagement rate is the dependent variable. Otherwise, the program code assigns a weight of zero to the link characteristic of the predictive model, as identified below:

$$L_{(Twitter)}=0.025$$

$$L_{(Facebook)}=0.000$$

In another embodiment, the link characteristic can be used to provide recommendations on how to improve a proposed social media post, rather than as a variable in the equation for predicting engagement. In this embodiment, if the link characteristic is found to be a significant factor in generating engagement on a social media platform through a multiple linear regression, correlation matrix or some other measure, the absence of a link in the text component of a proposed social media post can signal a recommendation for the individual creating the post to include a link to an article or blog entry.

A social media post that relates to an item currently being covered in the NEWS media can generate engagement on certain social media platforms such as Facebook, Twitter and others. Therefore, as a variable in predicting engagement on these platforms, the program code determines if the social media post relates to a story that is currently being covered in the news media. The relevance of a post to a current news item can take the form of an individual posting a news item or sharing the news item, or taking some similar action, on social media.

In one embodiment of the invention, the relevance of a post to a current news item can be measured by identifying certain word matches in the text portion of a proposed social media post with words that concurrently appear in one or more news media outlets. In this embodiment, the program code identifies word matches in nouns and proper nouns that suggest references to specific people, places, events and things currently in the news (i.e., news-related keywords). These news-related keywords are words that remain after non-news words such as adjectives, prepositions, adverbs, definite and indefinite articles, conjunctions, determiners, pronouns, contractions and the like are removed from the comparison.

In some embodiments of the present invention, the program code sets or an administrator pre-sets a specific threshold target for news-related keyword matches to increase the certainty that a proposed social media post references an actual news item. If the number of news-related keywords that overlap between the proposed social media post and the national news outlet meets or exceeds the pre-set threshold target, then the program code determines that the post is related to a current news item. For example, if after removing non-news words, the analysis for matching news-related keywords in a post and a national media outlet reveals that that both the social media post and the media outlet simultaneously contain the news-related words "Trump", "Russia" and "collusion" or the news-related words "Paris", "climate", "change", and "treaty", the program code can conclude that the proposed social media post relates to a current news item (and display the results through a user interface).

If the text component of the proposed social media post includes a reference to a current news item, and statistical analysis demonstrates that news-related content generates higher levels of engagement on the social media outlet where the individual intends to post, then the program code assigns a numerical weight to the News characteristic (N) based on the value of the unstandardized coefficient in a multiple linear regression equation, where the unstandardized coefficient is statistically significant based on a predetermined alpha level. Otherwise, the program code assigns a weight of zero to N in the predictive model. For example, if "Y" represents the threshold target for news-related keyword matches, and the program code sets Y at 3:

$$(Y \geq 3) \rightarrow N = 13.162$$

$$(Y < 3) \rightarrow N = 0.000$$

Relating a social media post to a particular SEASON can increase engagement. A seasonal element can be the time of year, a religious or secular holiday, or a recurring annual event. In one embodiment of the invention, the program code checks for the presence of a seasonal element by searching for specific keywords. For example, the program code can identify a seasonal post that relates to the time of year by the presence of keywords such as "spring", "summer", "winter" or "fall". Examples include social media content that mentions "spring cleaning", "summer vacations" "winter blues" or "fall foliage". The program code can identify the presence of a seasonal post that relates to a religious or secular holiday by the presence of keywords such as "New Year", "Martin Luther King, Jr. Day", "Valentine's Day", "President's Day", "Easter", "Passover", "Mother's Day", "Memorial Day", "Father's Day", "Independence Day", "Labor Day", "Rosh Hashanah", "Yom Kippur", "Halloween", "Veterans Day", "Thanksgiving", "Christmas", "Hanukkah," "Ramadan", "Kwanzaa" and the like. The program code can identify the presence of a seasonal post that relates to a recurring annual event, defined as events that happen at or about the same time every year, by the presence of keywords that denote such events including but not limited to: "State of the Union", "Super Bowl", "Groundhog Day", "Daylight Savings", "Spring Break", "Earth Day", "April 15 tax deadline", "Kentucky Derby", "graduation", "World Series", "New York City Marathon", "Election Day", "Black Friday", "Cyber Monday" and the like.

If the proposed social media post contains a seasonal element, the program code can set the Seasonal characteristic (SL) at the value of the statistically significant unstandardized coefficient from a multiple regression equation in which seasonal is an independent variable and engagement or engagement rate is the dependent variable, or if the post does not contain a seasonal element, the program code set the SL at zero, such that:

$$SL = 3.810$$

—OR—

$$SL = 0$$

Text characteristics are not mutually exclusive. For example, the text component of a proposed social media post may include more than one or even all of the characteristics associated with greater engagement. However, if two text characteristics are highly correlated with each other based on factor loadings in a principle components analysis, correlation coefficients in a correlation matrix, or some other similar statistical measure, the program code would select only one of these characteristics for use in the predictive model.

Many social media posts include a MULTIMEDIA or VISUAL component which can take the form of a photograph, graphic, diagram, infographic, video, animation, audio or some other like file that depicts an image, motion picture or sound recording, or some combination of these items. A multimedia/visual component can also include an augmented reality or three-dimensional image, a virtual reality image and the like.

On many social media platforms, such as Facebook and Twitter, it is currently not necessary to include a multimedia or visual component when creating a post. However, research has shown that posts that do include multimedia/visual content receive higher levels of engagement than those that do not. Further, some social media outlets, such as the photo-sharing platform Instagram, may require a multimedia/visual component. This component of the predictive model is especially important for estimating engagement on photo-sharing social media applications such as Instagram.

Figure 5:
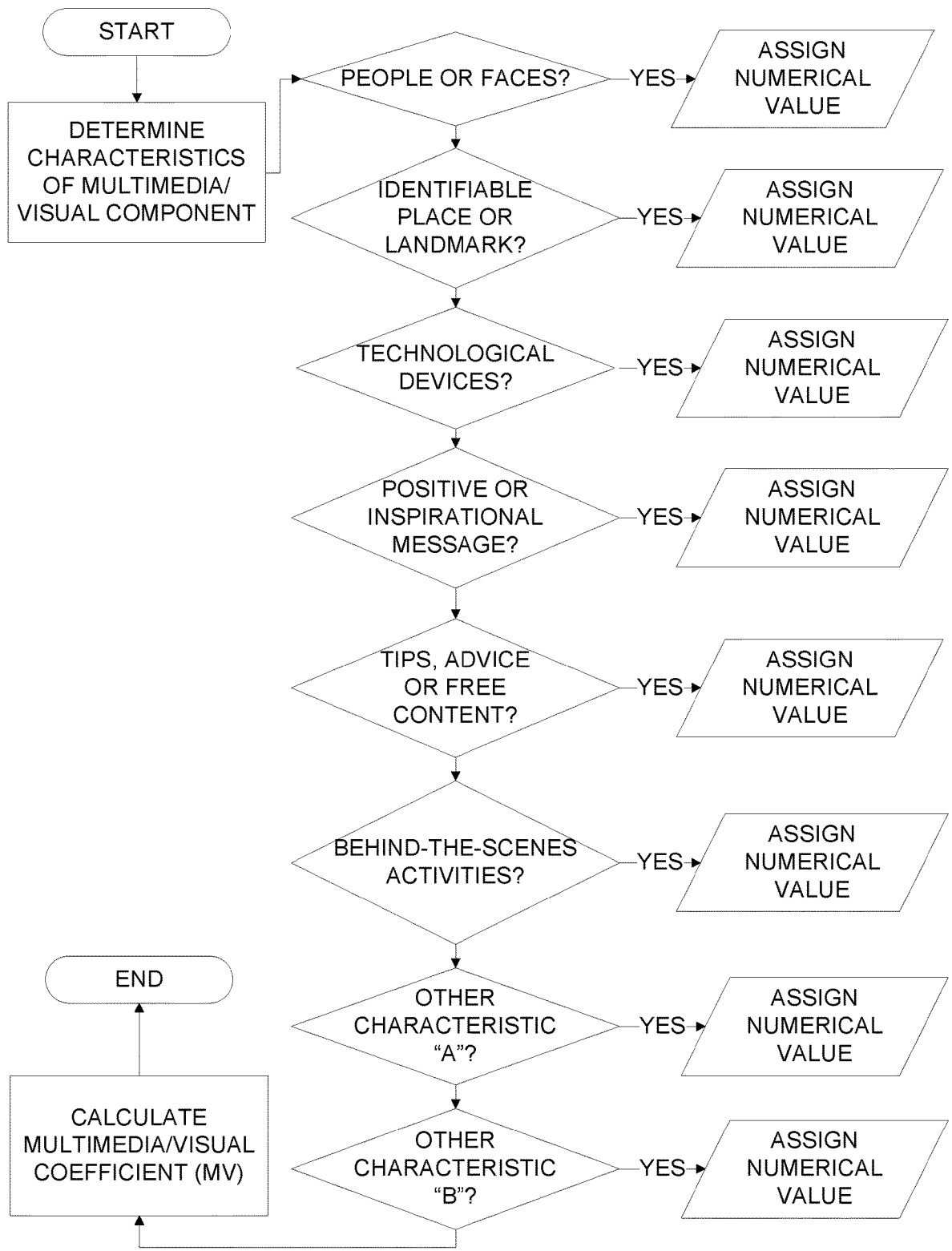
FIGS. 5 and 5B are examples of a graphical user interface displaying various aspects of some embodiments of the present invention.

In one embodiment of the invention (FIG. 5), the program code determines whether the proposed social media post includes a multimedia/visual component by detecting the presence of a computer file with an extension of .jpg, .jpeg., .png, .gif, .tiff, .mov, .mp4, .wmv, .fly, .webm, .ogv, .mp3 or some other similar type of image, motion picture or sound recording file that the user uploads, drags, etc. to the application. The multimedia/visual component can be part of a proposed social media post that includes a text component, or it can be a standalone visual with no text component. In some cases, such as when the target social media outlet for the proposed post can require a visual component (such as Instagram), in some embodiments of the present invention, the example can require the individual creating the post to include a multimedia/visual component before executing the equation for predicting engagement. If the target social media outlet does not require a multimedia/visual image, then an embodiments of the present invention can calculate the predicted engagement level for the post without the presence of a multimedia component.

If the proposed post does contain a multimedia/visual component, the program code assigns a value to this component based on the weight of multimedia content in predicting engagement or engagement rate in a multiple linear regression equation where the presence of a multimedia component (either "yes" or "no", "true" or "false", "0" or "1", etc.) is used as an independent variable and engagement or engagement rate is the dependent variable. The program code then assigns the value of the unstandardized coefficient for the multimedia variable, where the unstandardized coefficient is statistically significant based on a pre-determined alpha level, as the value for the Multimedia/Visual component (MV) in the predictive model, as shown below:

$$MV_{(Twitter)} = 1.959$$

In another embodiment of the invention (FIG. 5), the program code can determine the content and qualities of the multimedia/visual component of a proposed social media post. Research has shown that visuals that possess certain characteristics tend to result in higher levels of user engagement compared to images or visuals that do not possess these qualities. In one embodiment of the invention, the program code can describe the characteristics that result in higher engagement with a social media post as visuals that depict one or more of the following items: PEOPLE, IDENTIFIABLE PLACES or LANDMARKS, TECHNOLOGICAL DEVICES, POSITIVE or INSPIRATIONAL MESSAGES, TIPS, or BEHIND-THE-SCENES ACTIVITIES. In addition, there may be more characteristics of the multimedia/visual component that result in higher levels of engagement. Under those circumstances, the program code would assign values to these multimedia/visual characteristics based on a multiple linear regression analysis.

Visuals that prominently feature one or more PEOPLE or FACES as a focal point have been proven to increase engagement compared to images that do not include people or places. Such visuals can be identified by the prominent presence of an individual person or more than one person, group photos, selfies, photos of celebrities and known personalities, and the like.

Visuals that highlight IDENTIFIABLE PLACES or well-known LANDMARKS have also been proven to increase engagement. Such visuals are defined as those where the location depicted would be readily identifiable to the world population at large, or to someone familiar with the specific geographic area in which the landmark is located. For example, visuals depicting the Eiffel Tower, the White House, Times Square, the Golden Gate Bridge, and the Grand Canyon and similar types of locations are examples of well-known or famous landmarks or places that would be readily identifiable to a worldwide population. In addition, some readily identifiable places may not be well-known to a global audience but are known to individuals familiar with a specific geographic or regional area. Examples of such regional landmarks include the state Capitol building in Albany, N.Y.; the Nubble Lighthouse in York Beach, Me.; the Chapel of the Holy Cross in Sedona, Ariz.; and similar types of attractions. Finally, some readily identifiable places that are not well-known to a global or regional audience may be familiar to individuals interested in a specific topic or industry. For example, fans of professional baseball may be familiar with Jet Blue Park in Fort Myers, Fla.; technology enthusiasts may be familiar with the I-IP Garage in Palo Alto, Calif.; and thoroughbred horse racing fans will likely be familiar with the Saratoga Race Course in Saratoga, N.Y.

Visuals that include commonly known TECHNOLOGICAL DEVICES such as a smart phone, tablet or computer, audio player, camera, virtual reality headset, augmented reality glasses, smart watches, 3-D printers, video gaming equipment, wearable fitness trackers and the like have been proven to increase engagement on social media.

Visuals that include POSITIVE or INSPIRATIONAL MESSAGES such as an uplifting quotation or words of encouragement can increase engagement. This type of visual is often created with photo- or video-editing software that allows one to overlay text onto a background image as well as embed text only, or a combination of text and graphics, into an image or other form of visual file such as .jpeg, .jpg, .png, .gif, tiff, .mp4, .mov, or similar computer image format. The positive or inspirational message in the visual is therefore written in text, but is a part of the visual component of a social media post.

Visuals that offer TIPS or ADVICE related to a particular area of expertise can increase engagement. This category is similar to the "tips" category in the text component of a social media post, except in this instance the tips or practical information are embedded within a jpeg, .jpg, .png, .gif, .tiff or other type of image file suitable for posting on a social media platform. The tips or advice can appear either with or without a background image or accompanying photo or graphic.

Visuals that offer a BEHIND-THE-SCENES look at one's life or business can generate engagement. Such visuals provide a glimpse inside activities in one's personal life or business that would otherwise not be accessible to the audience. Examples include a musician rehearsing for an upcoming concert, the making or manufacturing of a product, performers backstage during a theatrical production, the view from the helm of a cruise ship, and the like.

Figure 5B:
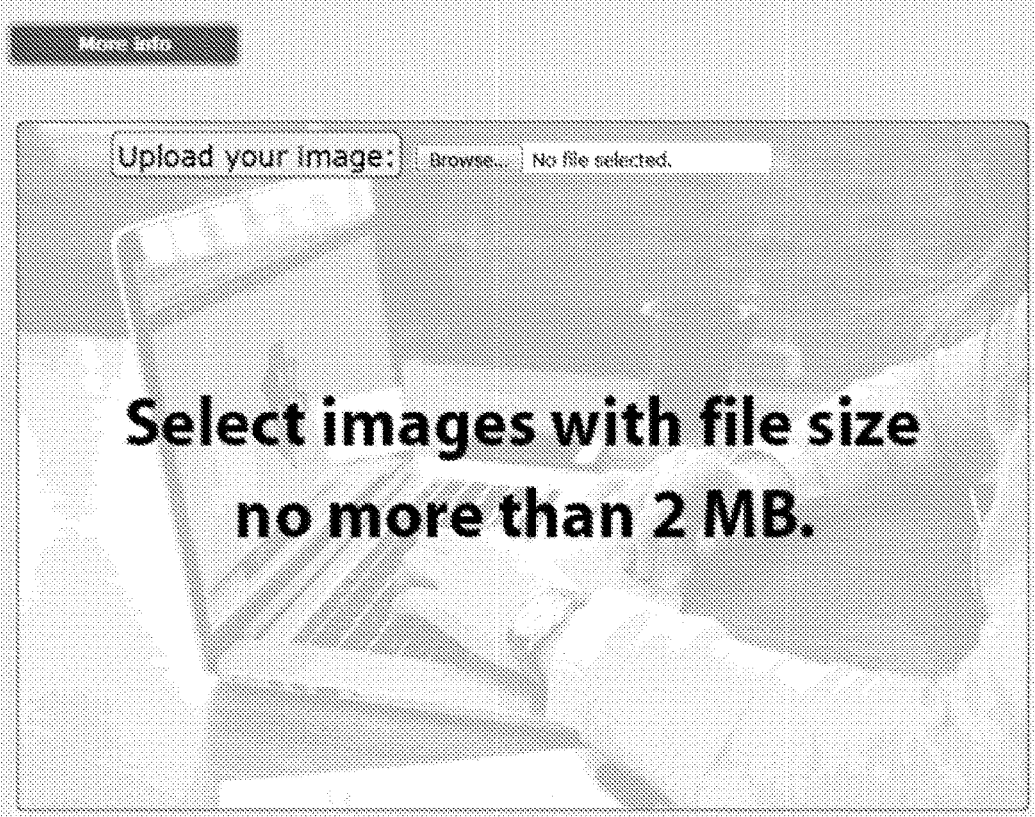

In one implementation of the invention, to determine the properties or characteristics of the visual component of a proposed social media post, the application may ask the user to identify the qualities of the visual that he or she is proposing to post on social media (FIG. 5b). Such an implementation can take the form of a questionnaire that the individual completes after he/she has submitted a photo, video, image or like file to the application. In this instance, the questionnaire might take a checklist-type of form as illustrated in FIG. 31. The example instructs the user to "Select all of the items below that describe your image:" and provides the choices: prominently displays at least one person, provides tips or free content, offers a behind-the-scenes look at my life, includes an electronic or tech device, contains a positive message, and highlights a well-known location.

In another embodiment of the present invention, the application might incorporate artificial intelligence to determine certain characteristics of the multimedia/visual component of a proposed social media post. For example, such artificial intelligence may scan or analyze the multimedia/visual component to detect the presence of a face or facial features, identify whether a face belongs to a prominent individual or celebrity, or detect the presence of a well-known location. Such artificial intelligence may work by comparing the image or motion picture in the multimedia/visual component of a proposed post against a store of visuals retrieved through an online search, database, etc.

The application may also make use of voice recognition technology to determine the presence of a voice in the multimedia/visual component of a proposed social media post, or to identify the voice of a prominent individual in a video, podcast, musical composition or some other sound recording that can be included in a social media post.

Using a multiple linear regression equation, the program code determines how much each visual characteristic contributes to overall engagement on a specific social media platform such as Facebook, Instagram or Twitter, and assigns a weight or value to each characteristic, based on the unstandardized coefficient for that characteristic, where the unstandardized coefficient is statistically significant based on a pre-determined alpha level.

Visual characteristics are not mutually exclusive. For example, a photograph may prominently feature a person and offer a behind-the-scenes view of some activity. In like fashion, a single image may highlight a well-known location and include a text overlay with a positive or inspirational message. Indeed, it is possible for one visual to possess all the engagement characteristics used in the predictive model. However, if two visual characteristics are highly correlated with each other based on factor loadings in a principle components analysis, correlation matrix, or some other similar statistical measure, the program code would select only one of these characteristics for use in the predictive model.

For example, if statistical analysis shows that the visual characteristics technological devices (G) and behind-the-scenes (BTS) are highly correlated or closely related, the program code would select only one of these characteristics to include in the predictive model, as shown below:

$$(G>0) \& (BTS>0) \rightarrow BTS=0$$

Similarly, suppose a factor analysis has demonstrated that the visual characteristics of Positive/Inspirational message and the presence of People are correlated with each other. Therefore, in order to avoid duplicating measures in the predictive model, the program code would use only one of these characteristics—in this case, the Inspirational characteristic (I), and would set the People characteristic (PE) to zero, as highlighted below:

$$(I>0) \& (PE>0) \rightarrow PE=0$$

One or more HASHTAGS are frequently included in the text component of a social media post. Hashtags are phrases that begin with the "pound" sign (#) followed by a string of words, numbers and/or characters with no spaces separating them. Individuals who post content on various social media platforms can include hashtags for any number of reasons, including to express a particular sentiment (#happy, #celebrate, Move); tie their post to a particular subject or topic (#marketing, #branding, #travel, #womeninbusiness); tie their post to a season (#summervibes, #winter), holiday (#NewYears2018, #Easter, #fathersday), place (#france, #calgary, #paris) or event (#AcademyAwards, #SuperBowlLXI, #BETAwards). In addition, social media users may use hashtags to participate in a dialogue with others (#ImAlwaysApologizingFor, #MyHappiestNerdDay, #tbt—an abbreviation for "Throwback Thursday" in which user posts nostalgic photos, items, sentiments, etc.). A business may use hashtags to promote a product (#TheLionKing, #RaspberryPi4). A hashtag may serve more than one function. For example, the hashtag #MondayMotivation can be used both to express a positive or motivational sentiment as well as to tie a post to a particular topic or theme. When an individual includes a hashtag in a post, she/he is starting or contributing to a "thread" of like-posts.

As a non-limiting example, of particular importance to this embodiment of the invention is that when social media users include one or more hashtags in their posts, their post is added to an ongoing stream of content from other individuals who used the same hashtag—called the "thread" for that hashtag. A single thread can contain anywhere from one post to more than one hundred million posts. For example, on Jun. 26, 2019, there were 528,441,089 posts on Instagram that had the hashtag "#happy". When an individual adds multiple hashtags to a post, he or she can exponentially increase the number of users on that platform who see that post. The reasons for this are because (a) people with a specific interest in a topic, event, season, etc. can follow a hashtag, which opens up one's post to a larger audience beyond just that individual's followers on a particular social network; (b) social media outlets such as Facebook, Twitter and Instagram allow users to search for posts that include a specific hashtag. Therefore, when one includes a hashtag she/he is making that post more accessible to individuals who search for that hashtag; and (c) when a social media user decides to include a hashtag in a post, the program code can assume that at least a portion of them will first review other posts that have been posted along that thread. Therefore, the potential audience for a post with the hashtag "#happy" includes individuals who follow this hashtag, individuals who search for this hashtag, as well as individuals who use this hashtag.

As mentioned earlier, a hashtag can expose a post to a much wider audience. This is particularly significant for users who have a small number of followers. For example, if an individual who has 50 followers posts on Instagram and his post receives zero engagement (i.e., no likes, comments or reposts) from his followers, then the maximum audience for that post was 50, assuming all of his followers saw the post. If, however, the individual includes five hashtags in his post, and each hashtag is followed by 100 people, then that individual has potentially exposed his post to 500 more individuals, not including the followers of anyone who shares or engages with the post. Excluding any individuals who may see the post as a result of shares or reposts, the maximum potential audience for the post with the inclusion of the five hashtags is 550 people, compared to 50 people without the hashtag.

Figure 6:
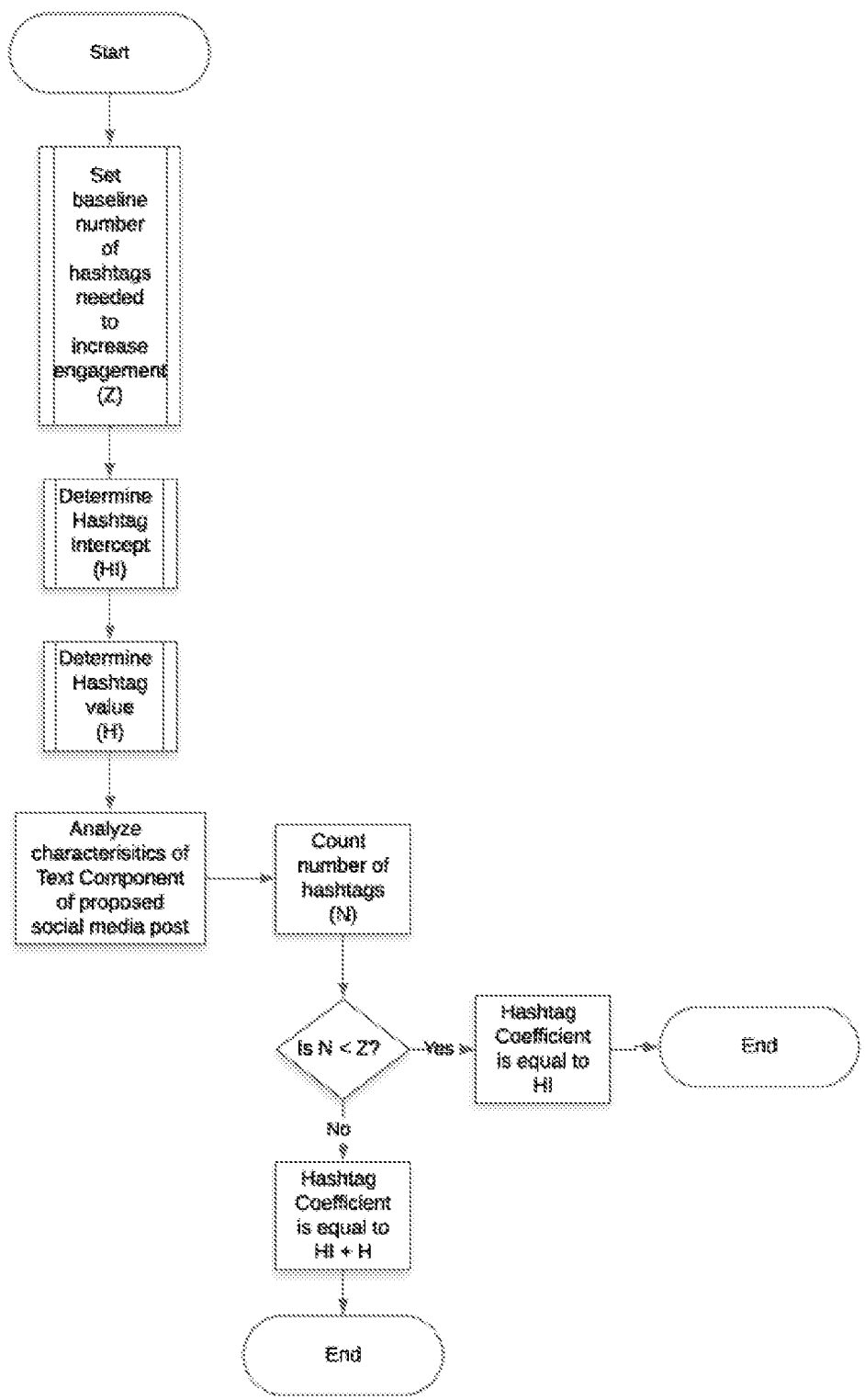
FIG. 6 is a workflow that depicts various aspects of some embodiments of the present invention.

In one embodiment of the invention (FIG. 6), the program code can test for the presence of one or more hashtags by counting the number of pound signs (#) that appear in the text component of a proposed social media post. The program code can then assign a cutoff point or baseline for the number of hashtags at which we see a significant increase in engagement. To determine the number of hashtags at which engagement increases, the program code analyzes mean engagement rates associated with various numbers of hashtags in a database of Instagram posts and finds the percentile at which the mean engagement rate increases significantly, or identifies the number of hashtags that results in a significant difference in engagement as measured by a statistical test such as a T-test or similar analysis. The program code then designates that number as the baseline number of hashtags needed in a post to increase engagement. If the number of hashtags in a proposed post (N) meets or exceeds the baseline number of hashtags needed to increase engagement (Z), the program code can assign a numerical weight or value to the Hashtag Coefficient (HC) in the predictive model, based on the value of the unstandardized coefficient in a multiple linear regression equation, where the unstandardized coefficient is statistically significant. In the diagram below, both N and Z represent some positive whole number such as 0, 1, 2, 3, 4, etc.:

$$(N \geq Z) \rightarrow HC = 10.238$$

In some instances, based on the number of followers and the target social media platform, the number of hashtags can be such a strong predictor of engagement that the program code can use it as a standalone measure in the predictive model, in conjunction with the text component and the visual component.

In this embodiment of the invention, if the number of hashtags (N) in the proposed social media post does not meet or exceed the baseline number of hashtags at which engagement is expected to increase (Z), then the program code automatically (or a user with manual intervention) sets the numerical value of the hashtag coefficient (HC) in the predictive model at the value of the intercept or constant from a multiple linear regression equation in which the number of hashtags is the independent variable and engagement or engagement rate is the dependent variable, in the manner shown below:

$$(N<Z) \rightarrow HC=0.007$$

where N and Z represent some positive whole number such as 0, 1, 2, 3, 4, etc.

If the number of hashtags (N) in the proposed social media post meets or exceeds the baseline number of hashtags at which engagement is expected to increase (Z), then the program code increments the value of the hashtag coefficient (HC) by the value of the statistically significant unstandardized coefficient for the variable hashtag in a multiple linear regression equation in which the number of hashtags is the independent variable and engagement or engagement rate is the dependent variable, in the manner shown below:

$$(N \geq Z) \rightarrow HC=0.007+0.011$$

In another embodiment of the invention, the content of the hashtags in a social media post can be mined as part of a sentiment analysis of the text component described above to help determine whether the post expresses a positive, negative or neutral tone. In addition, the hashtags can be mined to determine if the post relates to a particular season or time of year. In this manner, the use of hashtags can make the post more positive or determine if the post is seasonal. Both are factors that can increase engagement.

An important factor in predicting engagement for a proposed social media post is FOLLOWERS, or the number of individuals and other accounts on the same social media platform that receive posts, content or notifications and the like in their feed, timeline or other form of user interface from the account that will be posting. To become a follower of an account on a particular social media network, one can create an account on that network and then "follow" or "like" a specific page, account, etc., or take some other similar action that results in the receipt of posts, content, notifications, etc. from another account.

Predicting Engagement on Instagram

Instagram is a mobile-based social media application that allows users to share photos with others in their Instagram network. In addition to sharing photos, users can apply filters to their photos to change the appearance of the photograph, add text and hashtags to their Instagram posts, and comment on posts from others. Instagram also allows users to post short video snippets, referred to as "stories."

The process for predicting engagement begins with the analysis of the characteristics of a dataset of pre-existing Instagram posts (FIG. 1). The analysis identifies whether the posts in the dataset include the presence of certain characteristics that are known to result in user engagement or interaction. Such characteristics include but are not limited to: a seasonal component, the provision of tips or advice in a specific content area, a hyperlink, the posing of a question, a call-to-action, positive sentiment, a connection to a current news item, simplicity (brief, readable or easy to understand), and a multimedia/visual component. In addition, the multimedia/visual component is further analyzed for the presence of characteristics that are known to result in user engagement or interaction. Such characteristics include but are not limited to: people, identifiable places or landmarks, technological devices, positive or inspirational messages, tips, or behind-the-scenes activities. There may be more text characteristics or multimedia/visual characteristics proven to increase engagement on Instagram. For each Instagram post in the dataset, the program code determines actual engagement, then calculates the engagement rate for that post based on the number of followers on the Instagram account where the content was posted.

In an implementation of the invention, the program code uses two equations to predict engagement on the photo-sharing social media platform, Instagram. In equation #1, the program code calculates an estimated engagement rate for the post based on the characteristics of the text component, the multimedia/visual component, and the number of hashtags. In another embodiment, the program code calculates an estimated engagement rate based on the number of followers on the account where the content will be posted. The program code then selects the lowest engagement rate and takes the product of the estimated engagement rate, expressed as a decimal, and the number of followers. The result is rounded to the nearest positive whole number and displayed. If the chosen predictive model yields a negative number for predicted engagement due to the negative slope in the logarithmic regression equation used for representing the relationship between followers and mean engagement rate, the program code sets predicted engagement to zero.

Calculation of Text Coefficient

The calculation of the TEXT COEFFICIENT is based on the characteristics or qualities of the text component of the proposed Instagram post. A multiple linear regression analyzing the characteristics of the text such as SIMPLICITY or READABILITY (S), SENTIMENT (ST), QUESTION (Q), TIPS (T), CALL TO ACTION (CTA), LINK (L), NEWS (N), and SEASONAL (SL) and the like will determine which of those qualities contributes positively to engagement, or engagement rate, on Instagram. For each of these qualities that are present in the proposed Instagram post, the program code assigns them numerical values based on a statistically significant unstandardized coefficient from a multiple linear regression equation. The program code then adds those values to the constant from the regression equation.

Theoretically, if all characteristics were significant predictors of engagement or engagement rate on Instagram, the program code would describe the equation for calculating the Text Coefficient (TC) of a proposed Instagram post as the Text Intercept (TI), or constant from the regression equation, plus the sum of all statistically significant regression coefficients:

$$TC = TI + \sum_{i=1}^{n} x_i$$

where:
n=the total number of statistically significant coefficients from a multiple linear regression equation; and $X_i \ldots X_n$=the values of the statistically significant unstandardized regression coefficients that are present in the text component of the proposed post, as shown below:
$X_1$=SIMPLICITY or READABILITY value (S)
$X_2$=SENTIMENT value (ST)
$X_3$=QUESTION value (Q)
$X_4$=TIPS value (T)
$X_5$=CALL TO ACTION value (CTA)
$X_6$=LINK value (L)
$X_7$=NEWS value (N)
$X_8$=SEASONAL value (SL)
$X_9$=some other characteristic
$X_{10}$=some other characteristic, etc.

If a strong association exists between two or more variables, such as the variables Question and Call-to-Action, one also express this equation as:

$$TC=TI+S+ST+(Q\|CTA)+T+L+N+SL$$

In one embodiment of the invention, if only one of these characteristics of the text component, QUESTION, yields a positive and statistically significant unstandardized regression coefficient, and that characteristic is present in the text component of the proposed Instagram post, one could use that characteristic in the predictive model in embodiments of the present invention. The text coefficient in the overall predictive model is increased based on the presence of a question in the text component. If more than one of these text characteristics are significant predictors of engagement or engagement rate based on the p values of the unstandardized coefficients in a regression, and each of those characteristics is present in the text component of the proposed Instagram post, the program code could increase the text coefficient by the value of the respective statistically significant unstandardized regression coefficients for those variables.

If the post includes two variables that are highly correlated with each other, as identified by a statistically significant correlation coefficient in a principal components analysis or correlation matrix, the program code can automatically select just one of these characteristics for the predictive equation. For example, if posing a QUESTION and including a CALL TO ACTION are both significant predictors of engagement on Instagram but are highly correlated with each other, and both characteristics are present in the text component of the proposed post, the program code would assign a numerical value to only one of these variables in the predictive equation so as not to overvalue or duplicate what is essentially the same measure.

In this implementation, the equation for calculating the Text Coefficient (TC) takes the form below, in which the program code automatically selects which one of the correlated text characteristics to use in the equation, $X_1$ or $X_2$, based on the characteristic with the highest factor loading in a principal components analysis, such that the program code selects the characteristics with the highest factor loading.

$$TC=TI+(X_1\|X_2)$$

where:
TC=Text Coefficient
TI=Text Intercept/Constant
$X_1$=QUESTION value
$X_2$=CALL TO ACTION value If the text component of the Instagram post included a question, the equation would be as follows:

$$TC=TI+X_1(\text{Question})$$

$$TC=0.059+0.055$$

$$TC=0.114$$

Calculation of Multimedia/Visual Coefficient

Next the program code calculates a numerical value for the MULTIMEDIA/VISUAL COEFFICIENT based on the qualities of the multimedia/visual component of the proposed Instagram post. For predicting engagement on Instagram, a multimedia/visual component can be required since the platform is largely intended for sharing photos. If the multimedia/visual component of the proposed Instagram post includes certain characteristics that are known to increase engagement such as prominently highlighting PEOPLE, IDENTIFIABLE PLACES or LANDMARKS, TECHNOLOGICAL DEVICES, POSITIVE or INSPIRATIONAL MESSAGES, TIPS, or BEHIND-THE-SCENES ACTIVITIES and the like, the program code assigns a value to that characteristic from the regression equation. The Multimedia/Visual Intercept (MI), or constant from the regression equation, plus the sum of these variables equals the Multimedia/Visual Coefficient (MC):

$$MC = MI + \sum_{i=1}^{n} x_i$$

where:
n=the total number of statistically significant unstandardized coefficients from a multiple linear regression equation
$X_i \ldots X_n$=the values of the statistically significant unstandardized regression coefficients that are present in the multimedia/visual component of the proposed post, where:
$X_1$=TIPS value (S)
$X_2$=IDENTIFIABLE PLACE or LANDMARK value (ST)
$X_3$=TECHNOLOGICAL DEVICES value (Q)
$X_4$=BEHIND THE SCENES ACTIVITIES value (T)
$X_5$=POSITIVE OR INSPIRATIONAL MESSAGES value (CTA)
$X_6$=PEOPLE value (L)
$X_7$=some other characteristic
$X_8$=some other characteristic, etc.

If the multimedia/visual component in the proposed Instagram post includes two variables that are highly correlated with each other, as identified by a principal components analysis or correlation matrix, the program code automatically selects just one of these characteristics for the predictive equation. For example, if prominently featuring a TECHNOLOGICAL DEVICE and highlighting a BEHIND THE SCENES ACTIVITY are both significant predictors of engagement on Instagram but are highly correlated with each other through a principal components analysis, correlation coefficient or other similar measure of association between two variables, and both characteristics are present in the multimedia/visual component of the proposed post, the program code (in some embodiments of the present invention) can assign a numerical value to only one of these variables in the predictive equation so as not to overvalue or duplicate what is essentially the same measure. Similarly, if the multimedia/visual characteristics, POSITIVE or INSPIRATIONAL MESSAGES and PEOPLE, are both significant predictors of engagement on Instagram but are highly correlated with each other, and both characteristics are present in the multimedia/visual component of the proposed post, the program code can assign a numerical value to only one of these variables in the predictive equation.

In this implementation, the equation for calculating the Multimedia/Visual Coefficient (MC) takes the form:

$$MC=MI+X_1X_2+(X_3\|X_4)+(X_5\|X_6)$$

where:
MI=Multimedia/Visual Intercept
$X_1$=TIPS value
$X_2$=IDENTIFIABLE PLACE or LANDMARK value
$X_3$=TECHNOLOGICAL DEVICES value
$X_4$=BEHIND THE SCENES ACTIVITIES value
$X_5$=POSITIVE OR INSPIRATIONAL MESSAGES value
$X_6$=PEOPLE value An actual embodiment might look like the equation below:

$$MC=MI+X_1(\text{Tips})+X_2(\text{Identifiable Place})+X_3(\text{Technological Devices})+X_5 \text{ (Positive or Inspirational Messages)}$$

$$MC=0.048+0.162+0.059+0.039+0.048$$

$$MC=0.356$$

Calculation of Hashtag Coefficient

Equation #1 also incorporates the number of hashtags in a proposed social media post in the model for predicting engagement on Instagram. This equation is based on a linear regression using engagement rate as the dependent variable and the number of hashtags as the independent variable. In this embodiment, if the number of hashtags in a proposed post (N) is greater than or equal to the baseline number of hashtags needed to increase engagement (Z), the Hashtag Coefficient (HC) is equal to the sum of the intercept of the regression equation, or Hashtag Intercept (III), and the unstandardized regression coefficient (II), provided that the unstandardized coefficient is statistically significant. If the number of hashtags in the proposed post is less than the baseline number (Z), the hashtag coefficient is equal to the intercept (HI) of the regression equation.

The program code can determine the baseline number of hashtags needed to increase engagement (Z) by analyzing engagement rates associated with various numbers of hashtags in a database of Instagram posts and finding the number of hashtags at which the engagement rate increases or shows a meaningful upward trend. For example, in the table below, for a pre-existing set of Instagram posts in a database there is a large increase in mean engagement rate from the $70^{th}$ to $80^{th}$ percentile, between posts that have six and 19 hashtags. Please see Table 1 below.

TABLE 1

|  | Hashtags | Mean ER | Difference from previous percentile |
|---|---|---|---|
| Valid | 316 | 316 | |
| Missing | 0 | 0 | |
| Mean | 7.288 | 0.08588 | |
| Std. Deviation | 10.03 | 0.1241 | |
| Minimum | 0 | 0.001224 | |
| 10th percentile | 0 | 0.002589 | 0.001365 |
| 20th percentile | 0 | 0.004185 | 0.001596 |
| 30th percentile | 0 | 0.01286 | 0.008675 |
| 40th percentile | 1 | 0.02251 | 0.009650 |
| 50th percentile | 2 | 0.03215 | 0.009640 |
| 60th percentile | 4 | 0.04207 | 0.009920 |
| 70th percentile | 6 | 0.06082 | 0.018750 |
| 80th percentile | 19 | 0.1484 | 0.087580 |
| 90th percentile | 27 | 0.3047 | 0.156300 |
| Maximum | 30 | 0.5547 | 0.250000 |

Based on this data set, the program code can set the baseline number of hashtags at which the mean engagement rate increases (Z) at 7.

If Z=7, the program code can use the equations below to calculate HC:

$$N \geq 7 \rightarrow HC=HI+H$$

$$N<7 \rightarrow HC=HI$$

where:
HC=Hashtag Coefficient from the regression equation
HI=Hashtag Intercept
H=Hashtag variable (based on unstandardized regression coefficient)
N=Number of hashtags in the proposed post If we set values for HI and H, the program code can determine HC as follows:

$$N \geq 7 \rightarrow HC=0.007+0.011$$

$$HC=0.018$$

$$N<7 \rightarrow HC=0.007$$

Each of the final coefficients—the Text Coefficient (TC), Multimedia/Visual Coefficient (MC) and Hashtag Coefficient (IIC)—is then weighted for relevance in the equation for calculating the final Engagement Rate based on the strength of their respective $R^2$, or coefficient of determination, values from the respective regression equations. Multiplying the three values for the components of an Instagram post—text, multimedia/visual and hashtags—by $R^2$ assigns a weighting for each component based on its relative contribution to engagement.

Thus, in one embodiment of the invention, the equation for Predicted Engagement Rate may take the form:

$$PER_1=(TC \times R^2_1)+(MC \times R^2_2)+(HC \times R^2_3)$$

where:
$PER_1$=Predicted Engagement Rate (option 1)
TC=Text Coefficient
MC=Multimedia/Visual Coefficient
HC=Hashtag Coefficient
$R^2_1$=coefficient of determination from linear regression with engagement rate as the dependent variable and text characteristics as independent variables.

$R^2_2$=coefficient of determination from linear regression with engagement rate as the dependent variable and multimedia/visual characteristics as independent variables.

$R^2_3$=coefficient of determination from linear regression with engagement rate as the dependent variable and the number of hashtags as the independent variable.

An actual embodiment of the equation appears below. In this embodiment, for a proposed Instagram post, the Multimedia/Visual component comprises the largest component, followed by the Hashtag component and then the Text component.

$$PER_1=(0.114\times 0.058)+(0.356\times 0.143)+(0.007\times 0.757)$$

$$PER_1=0.006612+0.050908+0.005299$$

$$PER_1=0.062819$$

Calculation of Engagement Based on Followers Coefficient

Figure 7:
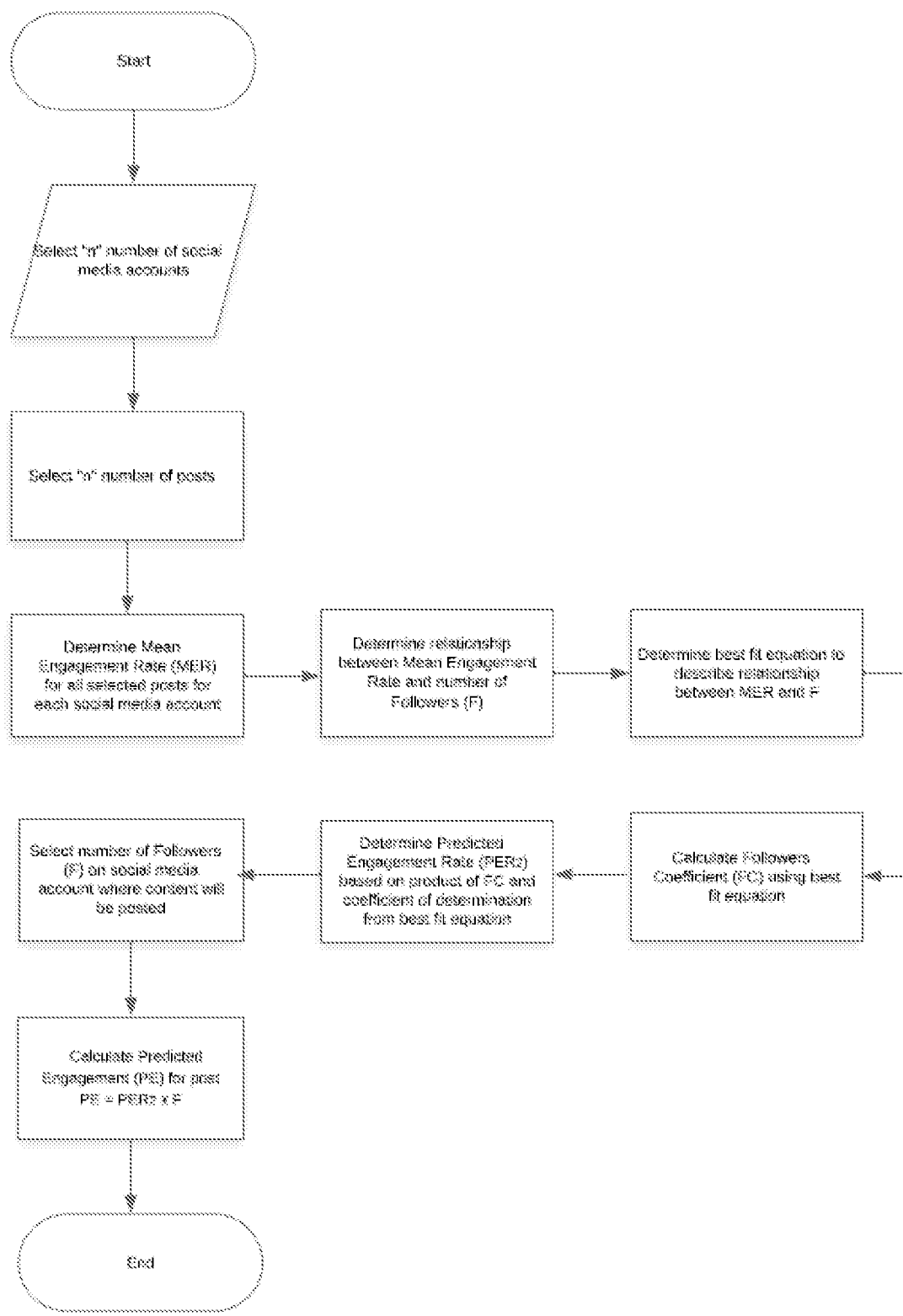
FIG. 7 is a workflow that depicts various aspects of some embodiments of the present invention.

Alternatively, another method of calculating the predicted engagement rate for a proposed Instagram post is based solely on the number of FOLLOWERS on an Instagram account (FIG. 7), To determine the relationship between engagement rate and the number of followers, the program code calculates the mean engagement rate (Mean ER) for a set number of posts for "n" number of accounts. For example, the Table 2 below identifies followers and mean engagement rates for five different Instagram accounts:

TABLE 2

| Account | Followers | Mean ER |
|---|---|---|
| A | 311 | 0.04371 |
| B | 1046 | 0.04119 |
| C | 19000 | 0.0157 |
| D | 66200 | 0.002933 |
| E | 79700 | 0.00476 |

Figure 28:
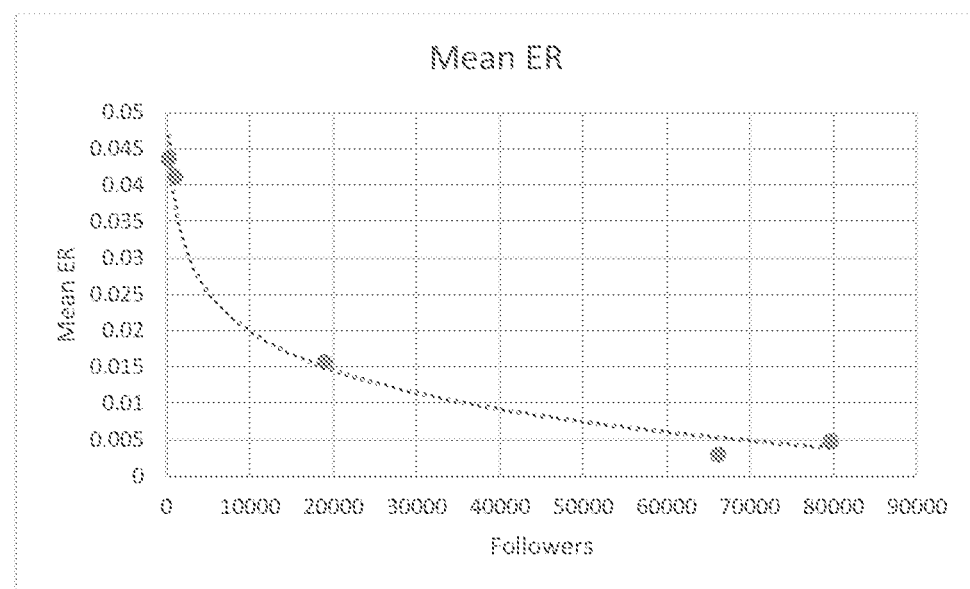

As demonstrated utilizing aspects of some embodiments of the present invention, there is an inverse relationship between followers and mean engagement rate, such that the mean engagement rate generally decreases as the number of followers increase. The best fit equation to describe the relationship between mean engagement rate and the number of followers on Instagram is a logarithmic regression equation, as shown below. In this data set, the $R^2$, or coefficient of determination, associated with the logarithmic regression model is 0.98, indicating that the number of followers explains approximately 98 percent of the variance in mean engagement rate. A Mean ER is illustrated in FIG. 28.

In this embodiment of the invention, as a first step in calculating the Followers Coefficient (FC), the program code takes the result of the logarithmic regression equation where F represents the number of followers on an Instagram account. This equation takes the form:

$$FC=C_1\ln(F)+C_2$$

where:

FC=Followers Coefficient $C_1$=coefficient from a logarithmic regression equation ln(F)=the natural logarithm of F F=the number of followers on the Instagram account where the content will be posted $C_2$=constant from a logarithmic regression equation Example $$FC=-0.008\ln(F)+0.0912$$

$$FC=-0.008\ln(500)+0.0912$$

$$FC=-0.008(6.2146)-0.0912$$

$$FC=0.04148$$

Next, the program code takes the product of the Followers coefficient and the $R^2$, or coefficient of determination of the logarithmic equation that yields the Followers Coefficient.

$$PER_2=FC\times R^2_4$$

$$PER_2=0.04148\times 0.98$$

$$PER_2=0.04065$$

where:

$PER_2$=Predicted Engagement Rate (option 2)

Figure 8:
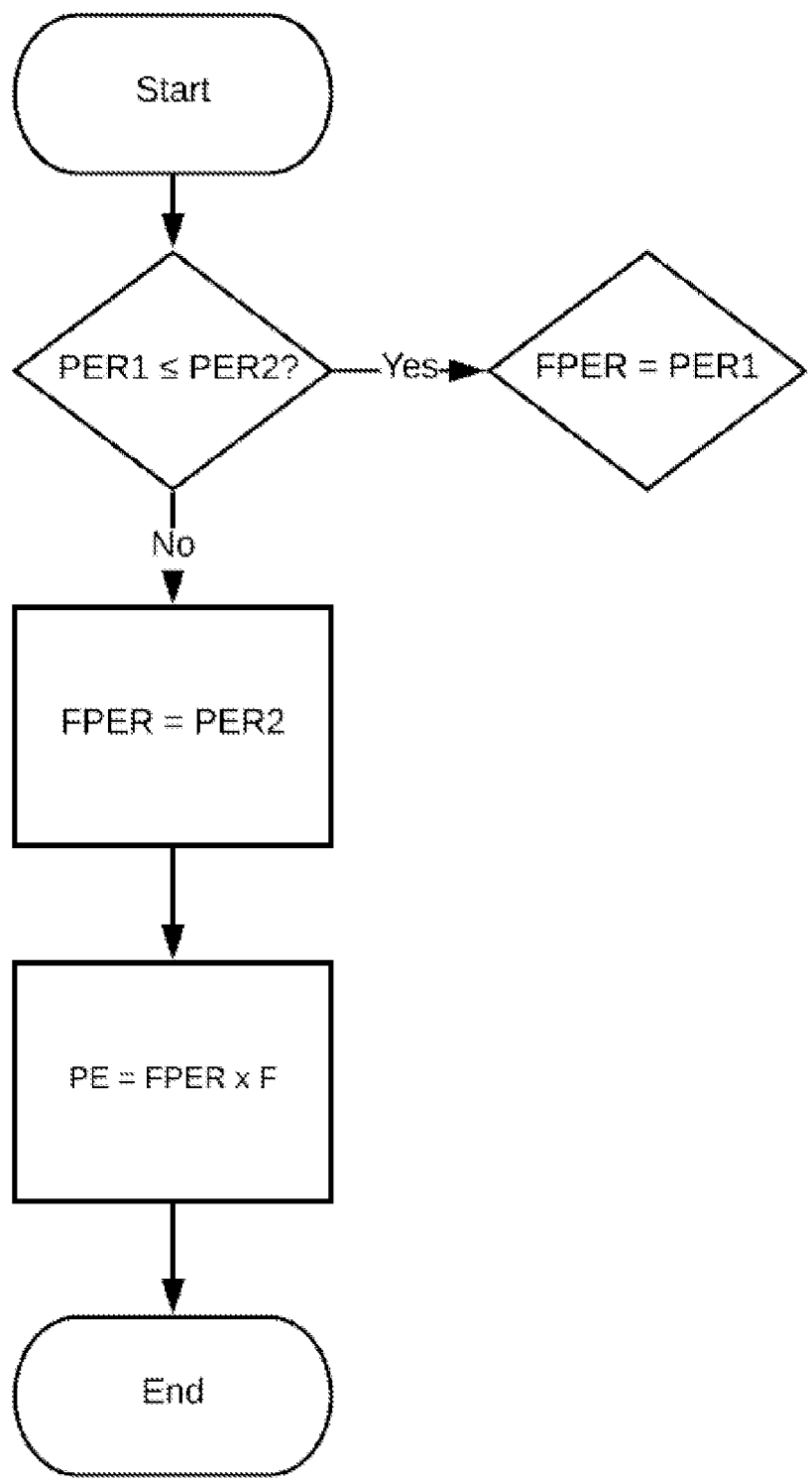
FIG. 8 is a workflow that depicts various aspects of some embodiments of the present invention.

FC=Followers Coefficient $R^2_4$=Coefficient of determination of logarithmic regression The next step in this embodiment of the invention (FIG. 8) is to select one engagement rate from the results of the "n" number of equations used to predict engagement rate—in this case, $PER_1$ or $PER_2$, and convert that engagement rate into Predicted Engagement (PE), expressed as a positive whole number, for the proposed Instagram post by taking the product of either $PER_1$ or $PER_2$ and F, the number of followers on the Instagram account where the content will be posted, as depicted below:

$$PE=(PER_1 \| PER_2)\times F$$

The process for selecting the predicted engagement rate includes comparing the results from the "n" number of equations using a series of logical conditions such that the program code selects the lowest positive value for the Final Predicted Engagement Rate (FPER), as shown below:

Condition one. If the predicted engagement rate from equation #1 ($PER_1$) is less than or equal to the predicted engagement rate from equation #2 ($PER_2$), the program code selects $PER_1$ as Final Predicted Engagement Rate (FPER).

$$PER_1 \leq PER_2 \rightarrow FPER=PER_1$$

In this instance, $PER_1$ (0.062819) is not less than or equal to $PER_2$ (0.04065) so condition one is not satisfied.

Condition two. If the predicted engagement rate from equation #2 ($PER_2$) is less than the predicted engagement rate from equation #1 ($PER_1$), the program code selects $PER_2$ as Final Predicted Engagement Rate (FPER).

$$PER_2 < PER_1 \rightarrow FPER=PER_2$$

Condition two is satisfied because $PER_2$ is less than $PER_1$.

The program code therefore selects the result from equation #2 ($PER_2$) as the Final Predicted Engagement Rate (FPER). Thus, taking the product of $PER_2$ and the number of followers on the Instagram account where the content will be posted (F), yields the following predicted engagement:

$$PE=FPER\times F$$

$$PE=0.04065\times 500$$

$$PE=20$$

Figure 8A:
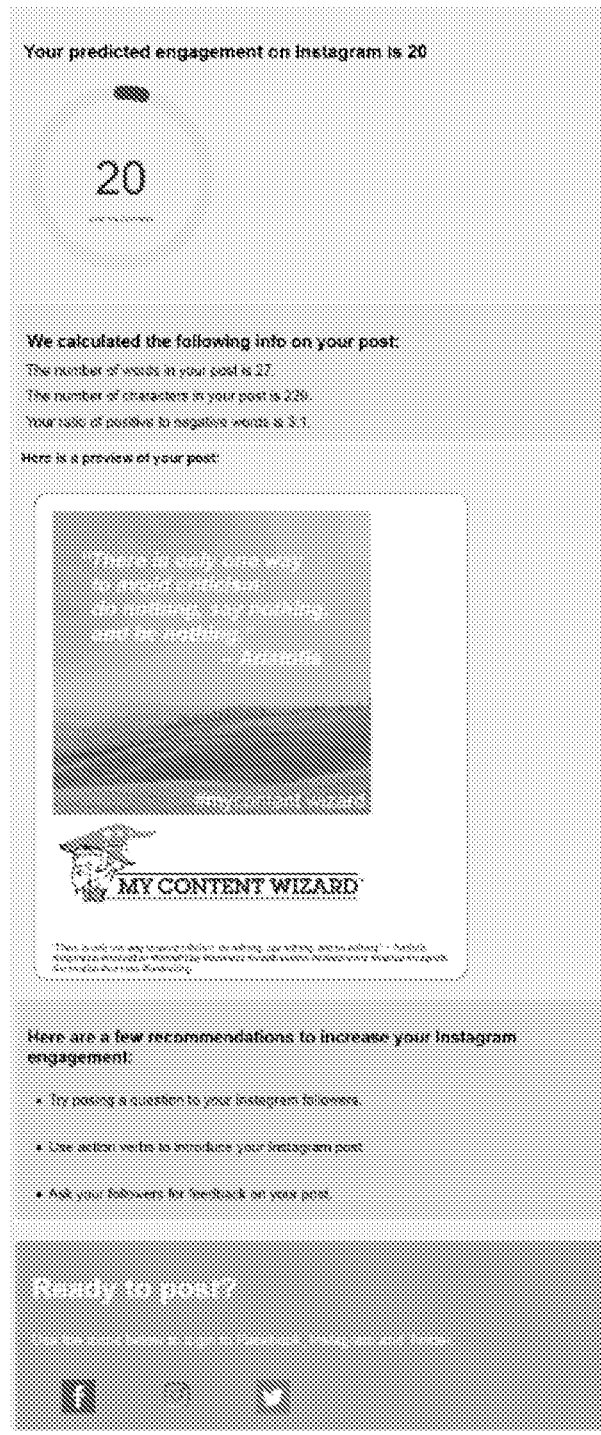
FIG. 8A is an example of a graphical user interface displaying various aspects of some embodiments of the present invention.

In this manner, some embodiments of the present invention predict that the proposed content will receive a total of 20 likes, comments, etc. when posted on an Instagram account with 500 followers. In the event the equation for PE were to yield a negative number, the program code converts that number to zero. In this embodiment, the application would display 20 as the predicted number of likes, comments, etc. for a proposed Instagram post (FIG. 8a).

Predicting Engagement on Twitter

Twitter is a microblogging platform that allows users to send short messages, or "tweets," to followers. Like other social media platforms, Twitter allows users to include a text component, a multimedia/visual component and a hashtag subcomponent in a tweet. Twitter limits users to a set number of characters. As of July 2019, the character limit for a tweet was 260.

The process for predicting engagement begins with the analysis of the characteristics of a dataset of pre-existing tweets (FIG. 1). The analysis identifies whether the tweets in the dataset include the presence of certain characteristics that are known to result in user engagement or interaction. Such characteristics include but are not limited to: a seasonal component, the provision of tips or advice in a specific content area, a hyperlink, the posing of a question, a call-to-action, positive sentiment, a connection to a current news item, simplicity (brief, readable or easy to understand), and a multimedia/visual component. There may be more characteristics proven to increase engagement on Twitter. For each tweet in the dataset, the program code determines actual engagement, then calculates the engagement rate for that post based on the number of followers on the Twitter account where the content was posted.

Different predictive models for Twitter will yield better predictions based on the content characteristics of the proposed tweet and the number of followers on an account. Thus, various embodiments of the present invention include program code that incorporates several different predictive models as part of some embodiments of the present invention to take into account the unique circumstances for each tweet and increase the predictive value in utilizing these embodiments.

Therefore, to predict engagement on Twitter, embodiments of the present invention can apply a series of equations that take into account different combinations of characteristics of a proposed tweet and select the most accurate predictive model. Thus, some embodiments of the present invention could yield "n" number of equations that produce "n" number of estimates of predicted engagement for each tweet.

Figure 9:
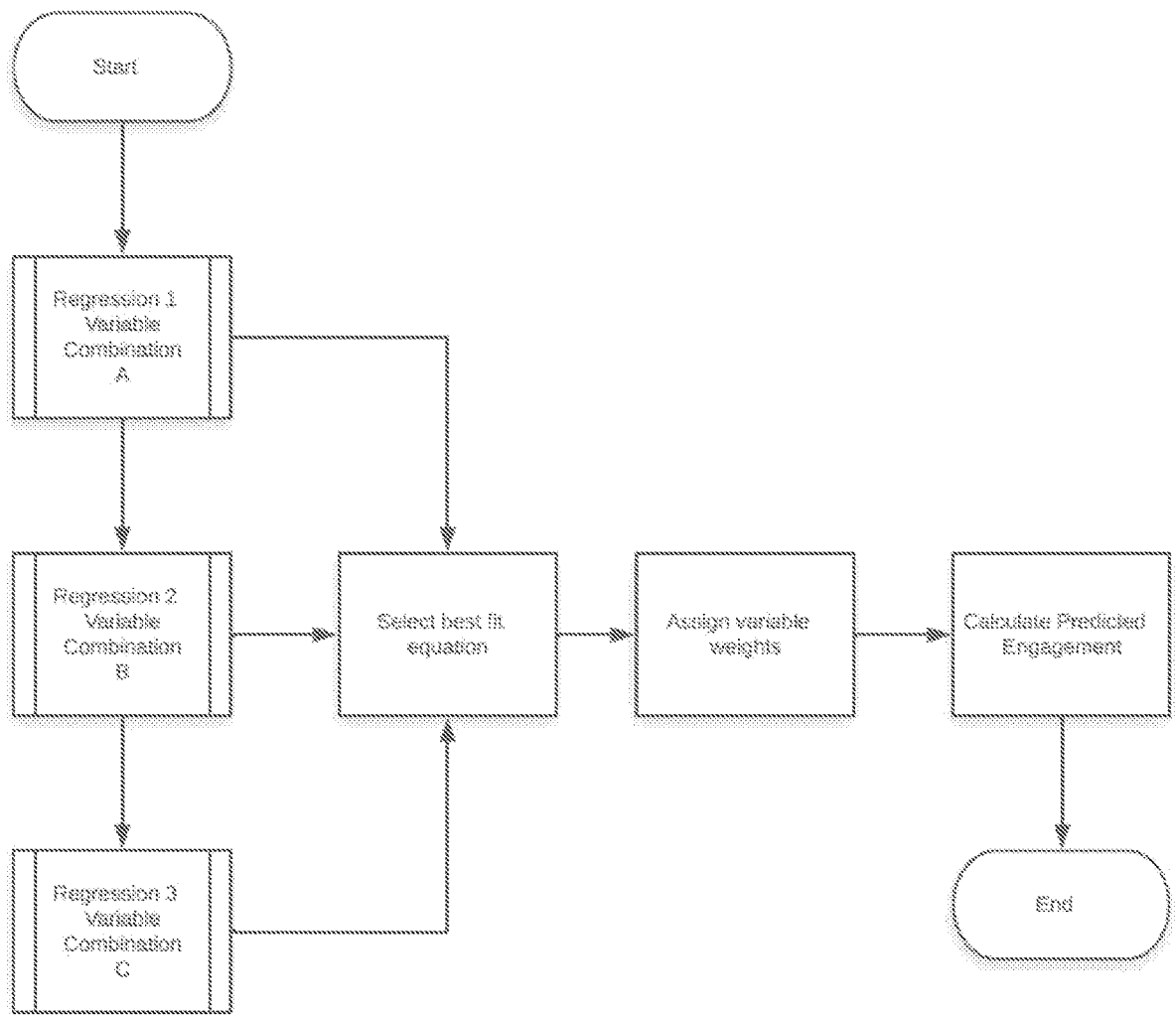
FIG. 9 is a workflow that depicts various aspects of some embodiments of the present invention.

In one embodiment of the invention, the program code uses four equations for determining the predicted engagement of a tweet. Equation #1 (FIG. 9) is based on a best fit combination of variables that predict engagement on Twitter. In order to determine which characteristics are most associated with engagement on Twitter, the program code runs a series of multiple linear regression analyses using different text characteristics, the number of followers, and the multimedia/visual component as independent variables in order to find the best fit model, which is defined as the model with the highest coefficient of determination $R^2$ and the highest number of statistically significant unstandardized coefficients. Thus, in this implementation, equation #1 is based on a regression analysis where engagement is the dependent variable and the best fit content characteristics are independent variables.

For example, suppose a series of linear regressions yields five variables that are significant predictors of engagement on Twitter: the number of FOLLOWERS one has on the account from which the tweet will be sent, SEASONAL items, current NEWS items, positive SENTIMENT, and the inclusion of a MULTIMEDIA/VISUAL attribute.

In this instance, the program code or a user utilizing a user interface sets the constant or intercept (A) from the best fit regression equation at 2.653 and assigns the numerical values associated with the statistically significant unstandardized coefficients to each of the variables in the equation—Followers, Seasonal, News, Sentiment, and Multimedia/Visual, such that equation #1 thus takes the form:

$$PE_1 = A + (Y \times F) + \sum_{i=1}^{n} x_i$$

where:
$PE_1$=Predicted Engagement (option 1)
A=Intercept/Constant
Y=Followers multiplier, used to weight the number of followers on a Twitter account
F=Number of followers on Twitter account from which a tweet will be sent
$X_1$=Seasonal
$X_2$=News
$X_3$=Sentiment
$X_4$=Multimedia Thus, if a proposed tweet from a Twitter account with 1104 Followers included a seasonal characteristic, a news characteristic, positive sentiment and a multimedia/visual component, the final form of equation #1 might look like the following, using the values for each variable identified below:

A=2.653
$Y=8.541\times10^{-5}$
F=1104
$X_1$=3.810
$X_2$=3.646
$X_3$=2.526
$X_4$=1.959
$PE_1$=2.653+(0.00008541×1104)+3.810+3.646+2.526+ 1.959
$PE_1$=14.688

If the program code rounds $PE_1$ to the nearest positive whole number (which it can be configured to do in some embodiments of the present invention), the program code, by utilizing this equation, would predict that the proposed tweet will obtain a total of 15 likes, re-tweets, replies and/or comments when posted on Twitter.

Another implementation for predicting engagement on Twitter, equation #2, is based on a multiple linear regression in which Engagement is the dependent variable and all possible characteristics of the proposed post—Simplicity or Readability, Sentiment, Question, Tips, Call-to-Action, Link, News, Seasonal and Multimedia/Visual and the like—are independent variables, as well as the number of Followers on the account from which the proposed tweet will be sent.

Figure 10:
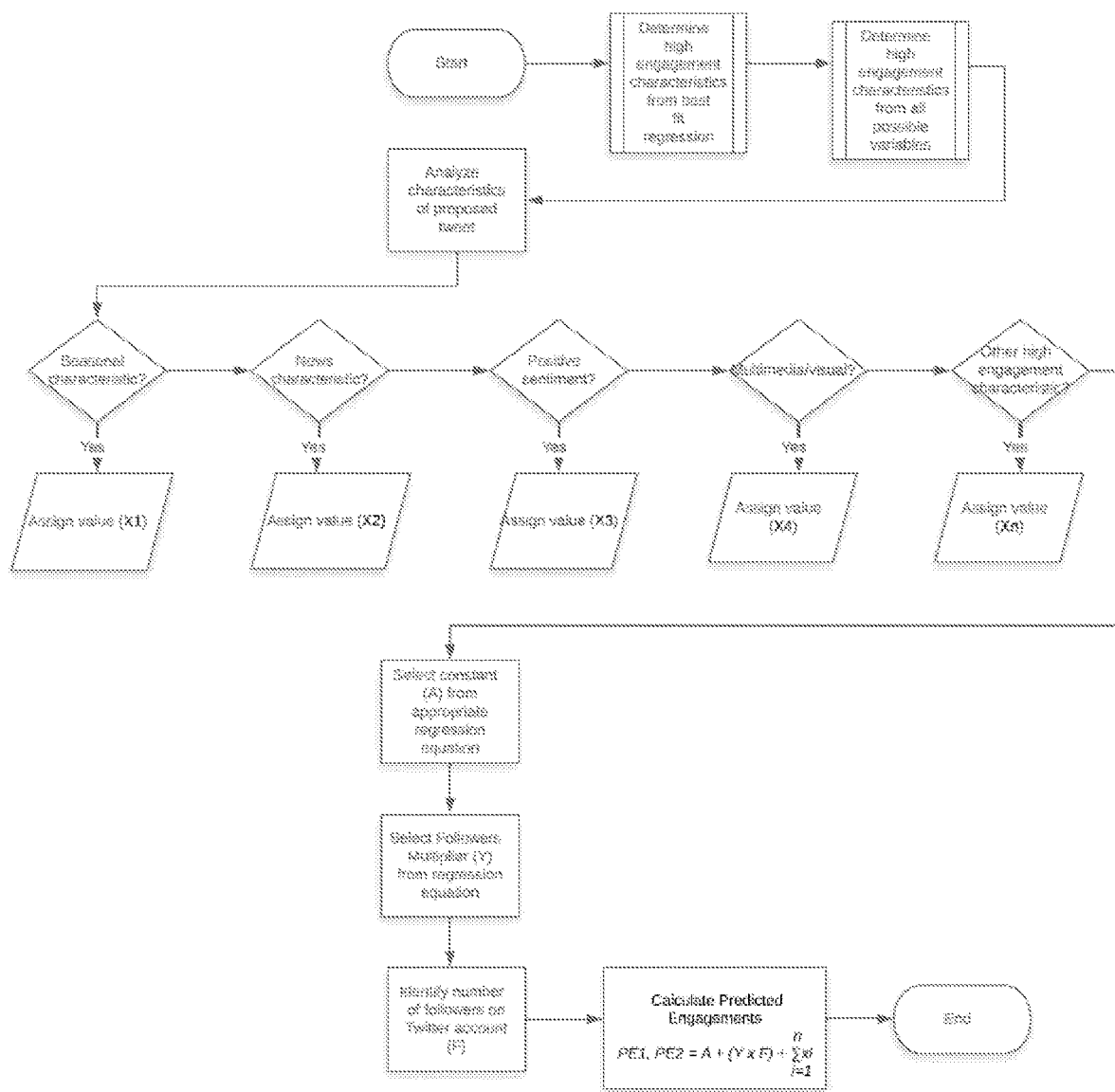
FIGS. 10-10A are workflows that depict various aspects of some embodiments of the present invention.

While taking the same form as equation #1, the basis for this implementation differs from the equation #1 best fit model in that the program code includes all possible content characteristics of the post are included in the regression analysis, rather than running a series of multiple linear regression analyses using different content characteristics as independent variables, and then selecting the model with the highest coefficient of determination ($R^2$ and the highest number of statistically significant unstandardized coefficients (FIG. 10).

In this implementation, equation #2, the program code runs one regression analysis with the full pool of content characteristics and selects only those characteristics that have a positive and significant association with engagement as measured by a statistically significant unstandardized coefficient. For example, if the regression reveals that two characteristics of the proposed tweet, SEASONAL and NEWS, along with the number of FOLLOWERS on an account has a positive and significant association with engagement, the program code or a user utilizing an interface assigns numerical values in the predictive model only to the Seasonal and News characteristics based on the presence or absence of these characteristics in the proposed tweet.

In this instance, the program code or a user sets the constant or intercept (A) from the best fit regression equation at 4.840 and assigns numerical values associated with the positive and statistically significant unstandardized coefficients to Seasonal, News, and Followers as follows:

Y (Followers multiplier)=$1.338 \times 10^{-4}$
$X_1$ (Seasonal)=3.381
$X_2$ (News)=4.297

The followers multiplier "Y", in this instance $1.338 \times 10^{-4}$, is used to appropriately weight the impact of the number of followers on engagement relative to the other variables in the equation. Thus, if a proposed tweet from a Twitter account with 1104 Followers included a seasonal characteristic and a news characteristic, the final form of equation #2 would look like the following, where $PE_2$ is equal to Predicted Engagement (option 2):

$PE_2$=4.840+(0.0001338×1104)+3.381+4.297

$PE_2$=12.666

If the program code in an embodiments of the present invention rounds $PE_2$ to the nearest positive whole number, the program code has utilized this equation to predict that the proposed tweet will obtain a total of 13 likes, re-tweets, replies and/or comments when posted on Twitter.

An alternative method for predicting engagement on Twitter, equation #3 (FIG. 10a), is to base the prediction solely on the number of followers on a Twitter account. In this implementation, the program code can utilize three variables, the number of followers (F), as well as a followers multiplier (Y) and the intercept or constant (A) from a linear regression equation in which engagement is the dependent variable and the number of followers is the independent variable.

Program code in some embodiments of the present invention obtains the intercept from the equation and assigns a numerical value to the unstandardized coefficient for followers:

A=Intercept/Constant
Y=Followers multiplier, used to weight the number of followers on a Twitter account
F=Number of followers on the Twitter account from which a tweet will be sent
$PE_3$=A+(Y×F)

Thus, if the Twitter account from which a proposed tweet would be sent had 1104 Followers, the final form of equation #3 might look like the following, using the values for each variable identified below:

$PE_3$=Predicted Engagement (option 3)
A=4.323
Y=$9.882 \times 10^{-5}$ (or Y=0.00009882)
F=1104
$PE_3$=4.323+(0.00009882×1104)

$PE_3$=4.432

If the program code in an embodiments of the present invention rounds $PE_3$ to the nearest whole number, the program code has utilized this equation to predict that the proposed tweet will obtain a total of 4 likes, re-tweets, replies and/or comments when posted on Twitter.

Figure 11:
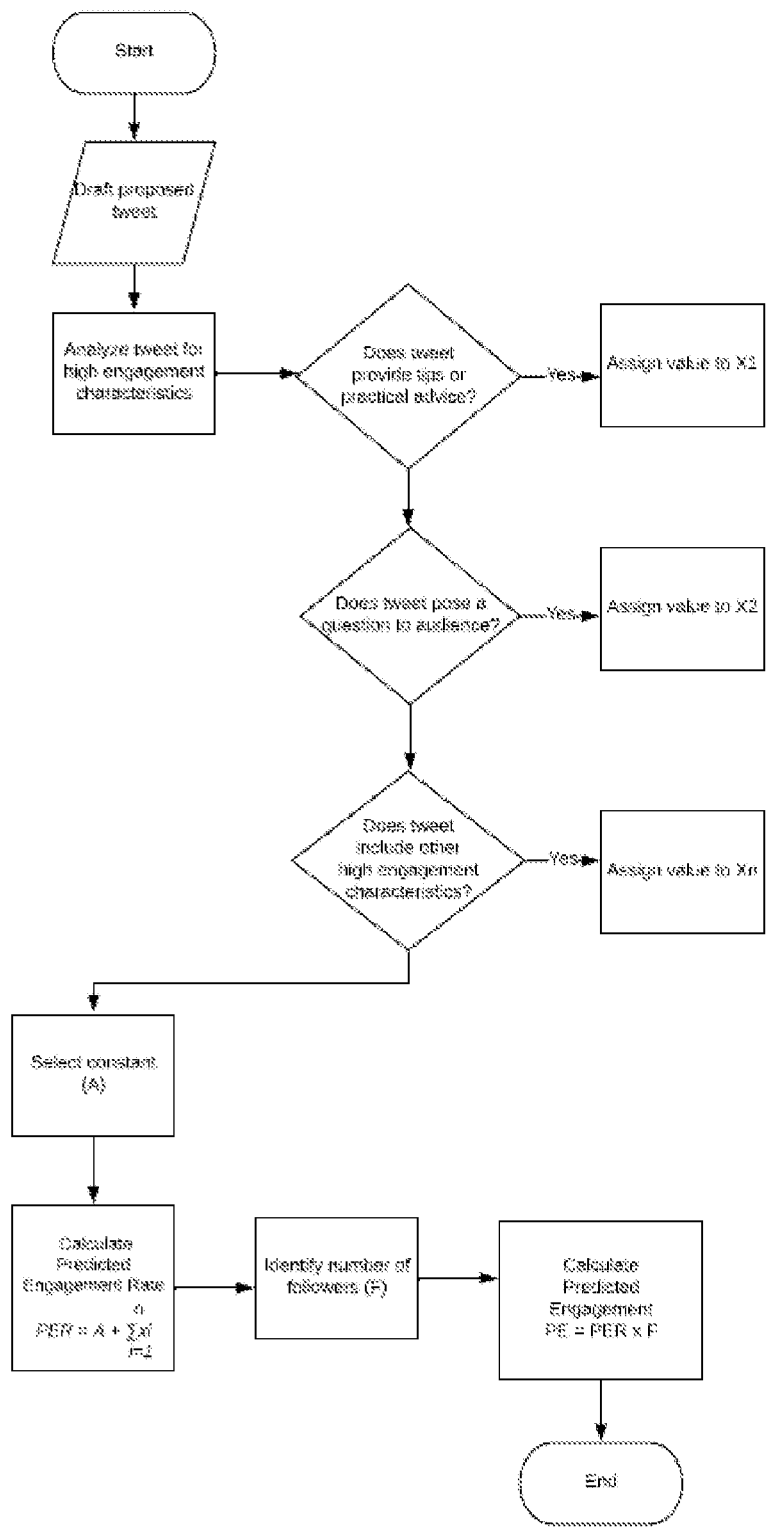
FIG. 11 is a workflow that depicts various aspects of some embodiments of the present invention.

Another implementation for predicting engagement on Twitter, equation #4 (FIG. 11), is to base the prediction solely on the characteristics of the tweet itself, without regard to the number of followers on the Twitter account from which the tweet will be sent. Whereas predictions derived from equation #1 and equation #2 are based on both the content characteristics of a proposed tweet as well as the number of followers, and predictions derived from equation #3 are based solely on the number of followers without regard to content characteristics, predictions derived from equation #4 are based only on the content characteristics of a proposed tweet. In addition, while both equation #1, equation #2 and equation #3 are based on linear regressions in which engagement is the dependent variable, equation #4 is based on a regression in which the engagement rate is the dependent variable.

Equation #4 takes the form:

$$PER = A + \sum_{i=1}^{n} x_i$$

where:
PER=Predicted Engagement Rate
A=Intercept/Constant
$X_i$=Statistically significant content characteristics
n=Number of statistically significant content characteristics For example, in this implementation, if the program code determines that three content characteristics, the presence of a SEASONAL element ($X_1$), a connection to a current NEWS story ($X_2$), and the inclusion of a MULTIMEDIA/VISUAL ($X_3$), component, are associated with higher engagement rates, the equation applied by the program code to the data for predicting the engagement rate for a proposed tweet could be as follows:

A=0.005
$X_1$=0.003 (Seasonal)
$X_2$=0.004 (News)
$X_3$=0.002 (Multimedia/Visual)
PER=0.005 0.003 0.004+0.002
PER=0.014

Because equation #4 calculates the Predicted Engagement Rate (PER), or the percentage of one's Twitter followers who will likely engage with the tweet, embodiments of the present invention can convert the engagement rate to actual Predicted Engagement ($PE_4$), based on the number of followers on the account from which the tweet will be sent. To do this, in some embodiments of the present invention, the program code multiplies PER times the number of followers on the Twitter account from which the proposed tweet will be sent (F). If the number of followers (F) is 1104, the program code determines $PE_4$ as follows:

$PE_4$=PER×F $PE_4$=0.014×1104

$PE_4$=15.456

If the program code rounds $PE_4$ to the nearest whole number, this equation would predict that the proposed tweet will obtain a total of 16 likes, re-tweets, replies and/or comments when posted on Twitter.

Figure 12A:
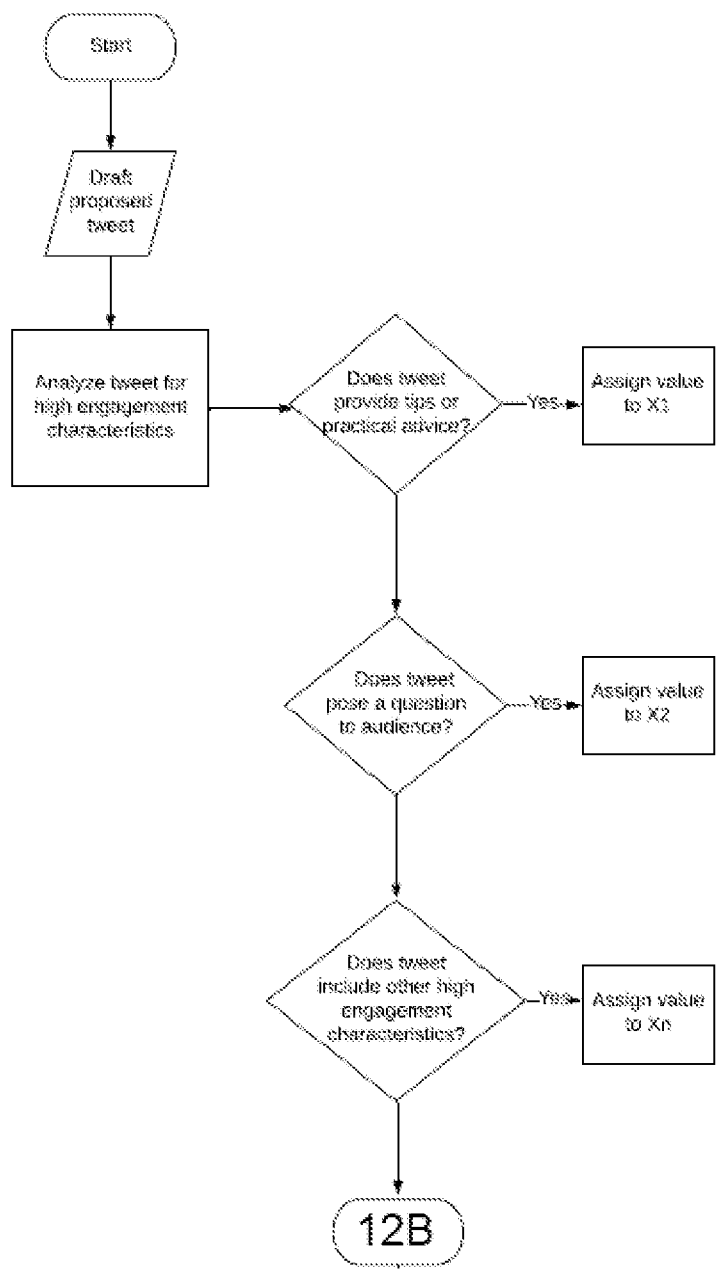
FIGS. 12A-12B are workflows that depict various aspects of some embodiments of the present invention.
Figure 12B:
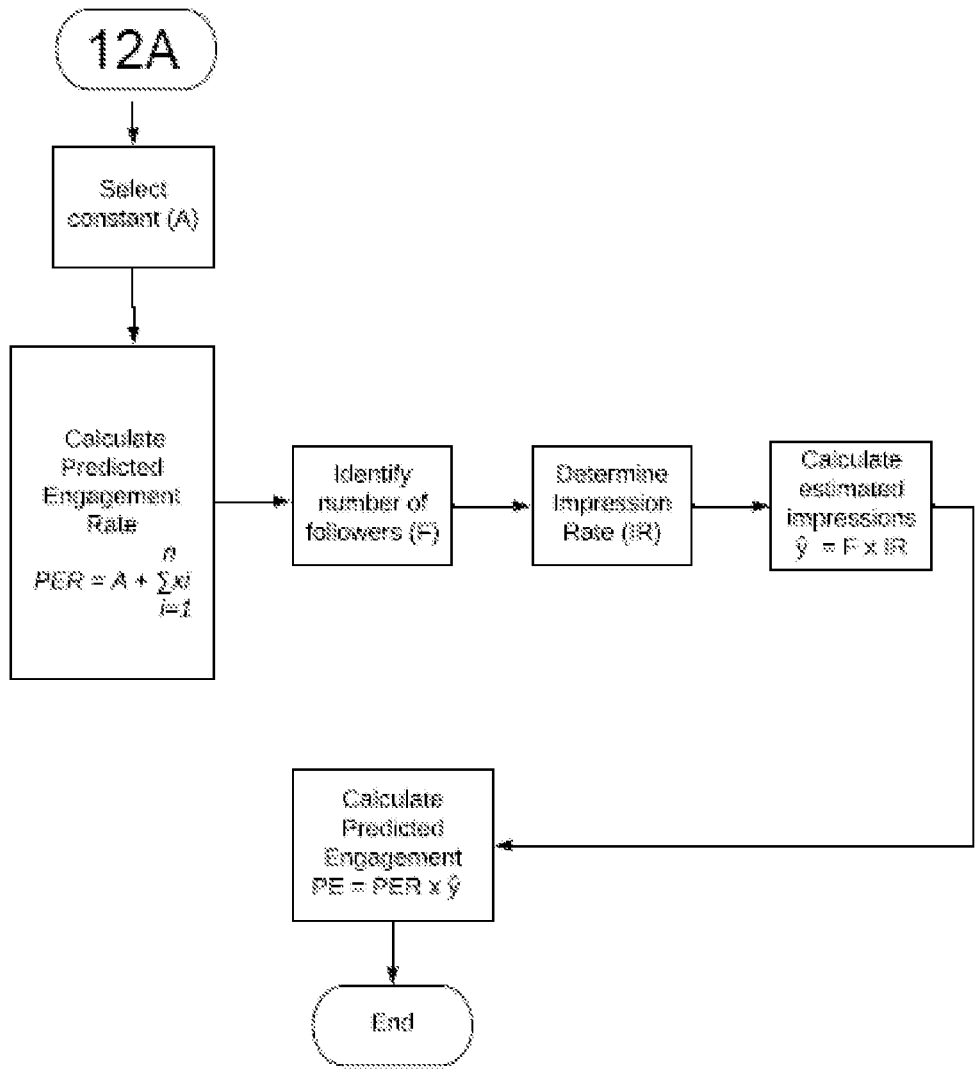

In another embodiment of the invention (FIGS. 12A-12B), the program code may take an intermediate step before calculating predicted engagement and estimate the impression rate, or how many of one's Twitter followers are likely to see a proposed tweet.

As of August 2019, Twitter allows users of its platform to view tweets presented by an algorithm (i.e., "top Tweets first") or in reverse-chronological order. Due to a number of factors such as Twitter's algorithm, the large quantity of tweets posted every day, and the amount of time one spends on Twitter each day, it is unlikely that a Twitter user will see every tweet from every account that individual is following. For example, if account A is following account B, account A may only see a percentage, but not all, of the tweets sent from account B. There are other factors beyond the impression rate that could limit one's ability to see a specific tweet sent from an account she/he is following, even if the tweet did appear in their timeline. Among these factors is the timing of when the tweet was posted, the number of other Twitter accounts one is following, the number of tweets posted by those other accounts during the same time period, etc.

For example, suppose account A is following account B on Twitter. However, account A is also following 10,000 other Twitter accounts. If account A posts a tweet on Monday morning, but account B does not check Twitter until two days later, account B may never see the tweet because, by that time account B checks Twitter, too many of account B's other followers have tweeted, pushing the tweet in question further down account A's timeline because tweets may be presented in a chronological and time sensitive manner, as in the most recent tweets can appear at the top of one's timeline. Or, Tweets may be presented based on Twitter's ranking algorithm.

Thus, for every tweet, there are three audience levels—potential audience (all followers), those who actually see the post in their Twitter timeline (impressions), and those who actually interact with the tweet (engagement). In order to predict engagement, the program code can first estimate the number of impressions for a tweet and then predict how many from that group will engage with the tweet. Of those, only some will engage with the post. The IMPRESSION RATE for a tweet can be calculated by dividing the number of followers or individuals who actually see a tweet by the total number of followers on that account. The impression rate will be expressed as a decimal, typically representing a percentage in the single digits such as 0.01 to 0.09, based on metrics provided by Twitter for a given account.

In this embodiment, the program code can estimate the impression rate to be 0.03, or three percent of followers on the account from which the tweet will be sent will actually see the tweet. Thus, if the number of followers (F) is 250,000 and the estimated impression rate (represented as IR) for the proposed tweet is 0.03, then the program code can calculate the estimated impressions expressed as a whole number ($\hat{y}$) as follows:

$\hat{y} = F \times IR$ $\hat{y} = 250,000 \times 0.03$ $\hat{y} = 7,500$

The program code would then calculate Predicted Engagement (PE) by taking the product of the Predicted Engagement Rate (PER) and the estimated impressions ($\hat{y}$) such that:

$PE = PER \times \hat{y}$ $PE = 0.014 \times 7,500$ $PE = 105$

In the current implementation described above, the invention (program code executing on one or more processors) will execute a series of equations, such that "n" number of equations will produce "n" number of estimates of predicted engagement for each tweet. There could be fewer equations as well as additional equations that take into account other combinations of variables proven to increase engagement on Twitter.

Figure 13:
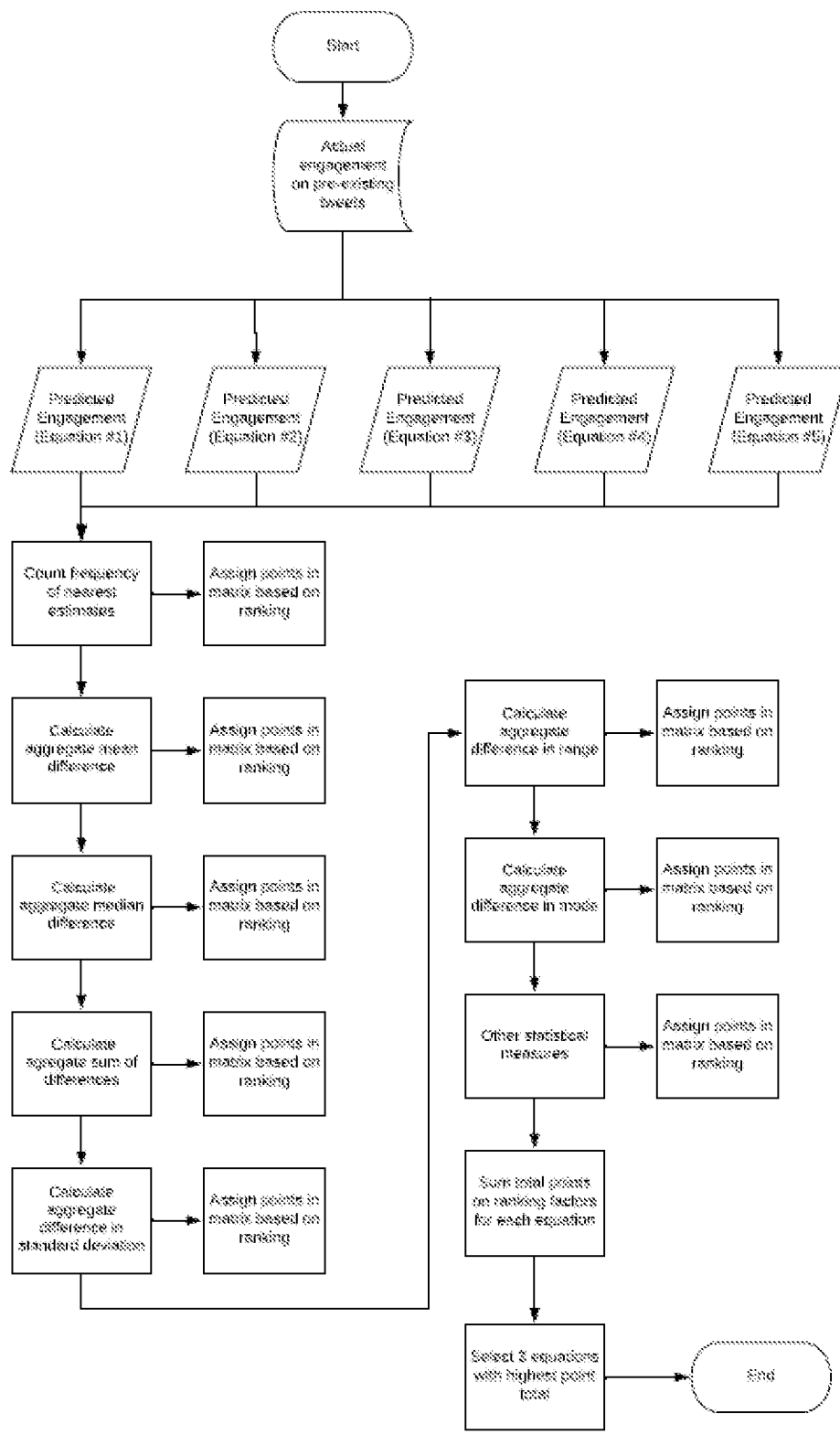
FIG. 13 is a workflow that depicts various aspects of some embodiments of the present invention.

In this embodiment, the program code uses four equations for predicting engagement which yield the following results:
$PE_1 = 15$
$PE_2 = 13$
$PE_3 = 4$
$PE_4 = 16$ The process for selecting the most accurate predictive model (FIG. 13) includes processing these "n" number of equations on pre-existing tweets on the account from which the tweet will be sent, comparing the "n" number of predicted engagements with actual engagement for a series of tweets, and selecting the three equations that provide the best estimates of engagement. For the purposes of this invention, the program code determines the three equations that offer the best estimates of engagement by identifying the equations that meet the highest number of the following criteria:

provide the nearest estimates to actual engagement most frequently for the pre-existing tweets studied, based on the absolute value of the difference between predicted engagement and actual engagement for each tweet;

produce the value closest to zero, either positive or negative, in aggregate mean difference from actual engagement for the pre-existing tweets studied;

produce the value closest to zero, either positive or negative, in aggregate median difference from actual engagement for the pre-existing tweets studied;

generate the value closest to zero, either positive or negative, in the aggregate sum of differences between predicted engagement and actual engagement for the pre-existing tweets studied;

produce the value closest to zero, either positive or negative, in aggregate standard deviation from actual engagement for the pre-existing tweets studied;

produce the value closest to zero, either positive or negative, in aggregate variance from actual engagement for the pre-existing tweets studied;

produce the value closest to zero, either positive or negative, in aggregate range from actual engagement for the pre-existing tweets studied;

produce the value closest to zero, either positive or negative, in aggregate mode from actual engagement for the pre-existing tweets studied; and perform well on other statistical comparison measures in that there are not significant differences between predicted engagement and actual engagement.

To select the most accurate equations, the program code rates the "n" number of equations in the analysis on factors (i) through (ix) in a matrix by assigning each equation points based on its respective order in the ranking. For example, suppose n=4. For each of the four equations, the program code compares predicted engagement to actual engagement on 265 actual tweets on the Twitter account from which the tweet will be sent, or from a database of tweets, such that the program code determines:

Equation #1 provides the nearest estimate to actual engagement for 105 tweets.
Equation #2 provides the nearest estimate to actual engagement for 55 tweets.
Equation #3 provides the nearest estimate to actual engagement for 50 tweets.
Equation #4 provides the nearest estimate to actual engagement for 55 tweets.

In this instance, equation #1 most frequently provides the nearest estimate to actual engagement (105). The program code assigns points to equations 1, 2, 3 and 4, such that the equation with the highest ranking receives the most points. In this instance, equation #1 receives the most points on this metric. The highest ranking receives a score of n−1, where n equals the number of equations being compared in the selection factor matrix, the next highest ranking receives a score of n−2, the third highest ranking receives points of n−3 and the program code continues this pattern, n−4, n−5, etc. until the program code reaches the conclusion of the equations, n−n. If two equations are equal on any given metric, such as equations 2 and 4 in the instance above, the program code assigns both of those equations the same number of points based on their order in the matrix (i.e., n−1 points each for the highest ranking, n−2 points each for the next highest ranking, n−3 points each for the third highest ranking, and so on). In situations where one or more equations score the same on any given metric, for the next lowest equation in the ranking, the program code skips the next descending number and assigns that equation the number of points two digits down. For example, as shown below, equations 2 and 4 both receive 2 points based on their second place ranking on this metric. The program code then skips the next descending number (1) in the ranking and assigns equation #3 zero points, as shown below:

Equation #1: 3 points
Equation #2: 2 points
Equation #3: 0 points
Equation #4 2 points In addition, the program code can also look at how close the estimates produced by the n number of equations are to actual engagement received by the pre-existing tweets studied. For any given equation, predicted engagement may be higher or lower than actual engagement based on the specific combination of variables used in the equation, the characteristics of the post, the number of followers, the impression rate and other factors. As a result, an equation may overestimate or underestimate expected engagement. Therefore, we base our final choice of which predictive equation to use on a number of measures.

In order to select the most accurate predictive model, the next step in the process is to analyze the overall size and distribution of the difference between predicted and actual engagement for each equation. For this the program code calculates statistical measures of central tendency (median, mean, mode, etc.) and dispersion (standard deviation, variance, range, etc.) for the difference between predicted and actual engagement for each of the n number of equations. Taken together, these measures indicate how large a difference there is between what level of engagement an equation predicted that a sample of pre-existing tweets would get, compared to the actual level of engagement the tweets received. Equations that produce smaller overall differences in absolute value between predicted and actual engagement on these measures of central tendency and dispersion represent better predictive models. Since the program code is measuring differences between predicted and actual engagement, we want those differences to be as close to zero as possible. Larger positive or negative values, respectively, for differences in mean, median and the like indicate that an equation may have overestimated or underestimated engagement more frequently compared to the other equations. Theoretically, we would want the values on these measures of central tendency and dispersion to be zero, indicating that there is no difference between predicted and actual engagement. The program code therefore takes the value closest to zero, whether positive or negative, on these measures for each equation, as shown in Table 3 below:

TABLE 3

| Descriptive Statistics | | | | |
|---|---|---|---|---|
| | Predict-Actual EQ #1 | Predict-Actual EQ #2 | Predict-Actual EQ #3 | Predict-Actual EQ #4 |
| Valid | 265 | 265 | 265 | 265 |
| Missing | 0 | 0 | 0 | 0 |
| Mean | −0.0004908 | 1.582 | −0.0004017 | −4.617 |
| Median | 0.7473 | 2.903 | 1.432 | −2.945 |
| Mode | 0.7473 | 2.988 | 2.432 | −1.945 |
| Std. Deviation | 4.848 | 5.05 | 5.335 | 5.276 |
| Variance | 23.5 | 25.5 | 28.46 | 27.84 |
| Range | 35.34 | 35.64 | 34 | 33.65 |
| Minimum | −26.15 | −25.78 | −27.19 | −31.47 |
| Maximum | 9.188 | 9.86 | 6.811 | 2.177 |
| Sum | −0.1301 | 419.3 | −0.1064 | −1224 |
| Nearest Estimate | 105 | 55 | 50 | 55 |

Equations #3 ($\bar{x}$=−0.0004017) and #1 ($\bar{x}$=−0.0004908), respectively, provide the value closest to zero on the mean difference in aggregate predicted engagement compared to actual engagement for the dataset of 265 pre-existing tweets. Equation #1 produces the value closest to zero on standard deviation (s=4.848) in differences between predicted engagement and actual engagement. The sum of all differences between predicted engagement and actual engagement on each post is closest to zero with equation #3 (−0.1064) and equation #1 (−0.1301). The program code assigns points in a matrix to the various equations based on their ranking on these measures and predictive accuracy, such that the highest ranking receives a score of n−1, where n equals the number of equations being compared in the selection factor matrix, the next highest ranking receives a score of n−2, the third highest ranking receives points of n−3 and the program code continues this pattern, n−4, n−5 until the program code reaches the conclusion of the equations, n−n, as shown in the Table 4 below:

TABLE 4

| Selection Factor Matrix | | | | |
|---|---|---|---|---|
| | Predict-Actual EQ#1 | Predict-Actual EQ #2 | Predict-Actual EQ #3 | Predict-Actual EQ #4 |
| Mean | 2 | 1 | 3 | 0 |
| Median | 3 | 1 | 2 | 0 |
| Mode | 3 | 0 | 1 | 2 |
| Std. Deviation | 3 | 2 | 0 | 1 |
| Variance | 3 | 2 | 0 | 1 |
| Range | 1 | 0 | 2 | 3 |

TABLE 4-continued

Selection Factor Matrix

|  | Predict-Actual EQ#1 | Predict-Actual EQ #2 | Predict-Actual EQ #3 | Predict-Actual EQ #4 |
|---|---|---|---|---|
| Sum | 2 | 1 | 3 | 0 |
| Nearest | 3 | 2 | 0 | 2 |
| Estimate Total | 20 | 9 | 11 | 9 |

Ranking the selection factors for the four equations shows that equations #1 and #3 provide the best predictive models in this instance.

In this embodiment of the invention, the program code can conduct an additional step to assess the predictive accuracy of the equations. The program code can apply a Chi Square goodness-of-fit test where the actual distribution of points among equation #1, equation #2, equation #3, and equation #4 in the selection factor matrix (20, 9, 11 and 9 points, respectively) is compared to an expected equal distribution of points (12.25, 12.25, 12.25 and 12.25, respectively). The program code conducts this test to determine if there is a significant difference in the allocation of points for the predictive equations on the selection factors (i) through (ix). In this instance, the Chi Square goodness-of-fit test shows that the difference between the actual distribution of points in the selection matrix and the expected distribution of points among the predictive equations is not significant $\chi^2(3, N=4)=6.755, p=0.080$. Therefore, we conclude that no one equation performs significantly better or worse than expected in the selection factor matrix. However, because equation #2 and equation #4 earned an equal number of total points in the selection factor matrix, the program code can remove one of these equations from further analysis. In this instance, the program code removes equation #4 from the analysis and proceeds with three predictions, as shown below:

$PE_1=15$
$PE_2=13$
$PE_3=4$

Figure 14:
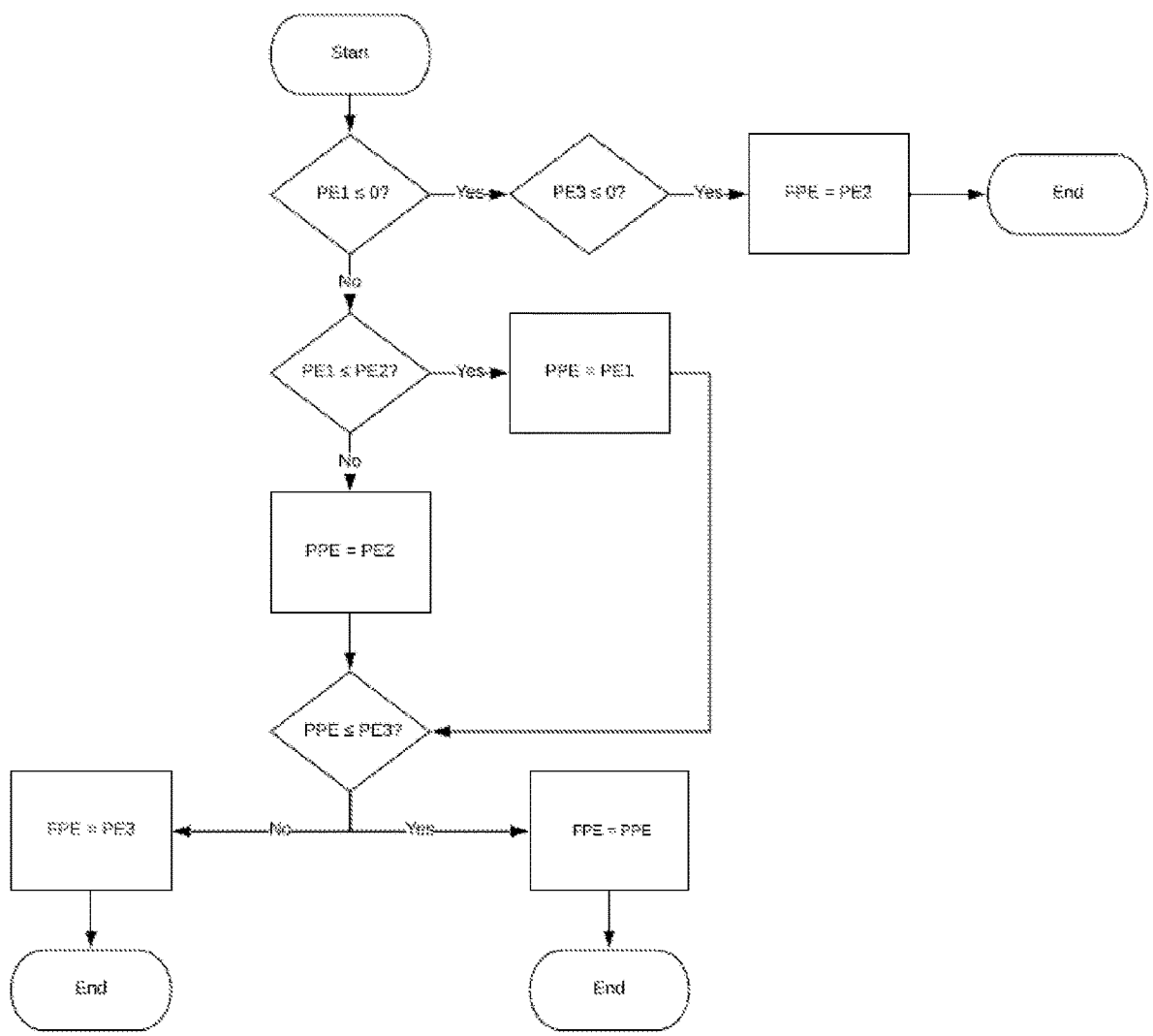
FIG. 14 is a workflow that depicts various aspects of some embodiments of the present invention.

The program code can now select one final predictive equation and display the result (FIG. 14). The program code do this by passing the results from the three equations through a series of logical conditions such that the program code selects the lowest value for predicted engagement.

First, the program code checks to see if equation #1 ($PE_1$) and equation #3 ($PE_3$) both yield predictions of zero engagement. If this condition is met, the program code selects equation #2 ($PE_2$) as Final Predicted Engagement (FPE), as shown below:

$(PE_1 \leq 0) \& (PE_3 \leq 0) \rightarrow FPE=PE_2$

If this condition is not met, the program code then compares the results of equation #1 and equation #2 and names the lowest result Preliminary Predicted Engagement (PPE). In this manner, if the result of equation #1 is less than or equal to the result of equation #2, the program code names (provides, displays, transmits, etc.) the result of equation #1 as PPE. Otherwise, the program code names (provides, displays, transmits, etc.) the result of equation #2 as PPE.

$(PE_1 \leq PE_2) \rightarrow PPE=PE_1$ $(PE_1 > PE_2) \rightarrow PPE=PE_2$

The program code can now compare Preliminary Predicted Engagement (PPE) with the result of equation #3 and select the lowest value. If the value of PPE is less than or equal to the value of $PE_3$, then the program code selects PPE as Final Predicted Engagement (FPE).

$(PPE \leq PE_3) \rightarrow FPE=PPE$

Otherwise, the program code selects $PE_3$ as Final Predicted Engagement:

$(PPE > PE_3) \rightarrow FPE=PE_3$

Thus, working through the results of equations #1, #2 and #3 produces the following result:

Condition one. Compare the results of equation #1 and equation #3.

$(PE_1 \leq 0) \& (PE_3 \leq 0) \rightarrow FPE=PE_2$

In this instance, both $PE_1$ (15) and $PE_3$ (4) are not equal to or less than zero, so the first logical condition is not satisfied.

Condition two. Compare the results of equation #1 and equation #2.

$(PE_1 \leq PE_2) \rightarrow PPE=PE_1$ $(PE_1 > PE_2) \rightarrow PPE=PE_2$

In this instance, $PE_1$ (15) is greater than $PE_2$ (13), so the program code assigns the value of $PE_2$ to Preliminary Predicted Engagement: PPE=13.

Condition three. Compare the results of Preliminary Predicted Engagement (PPE) and equation #3 ($PE_3$).

$(PPE \leq PE_3) \rightarrow FPE=PPE$ $(PPE > PE_3) \rightarrow FPE=PE_3$

Figure 14A:
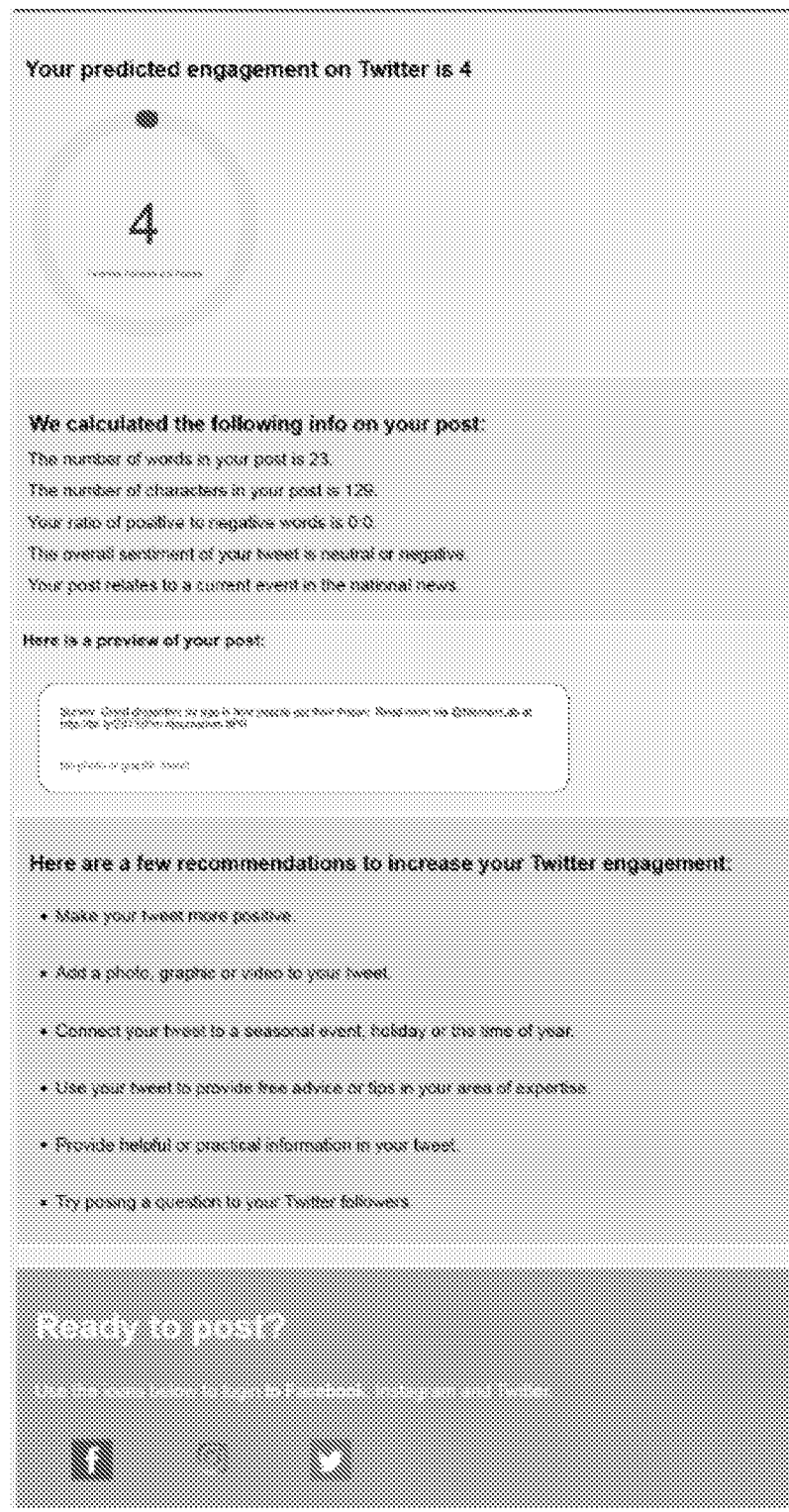
FIG. 14A is an example of a graphical user interface displaying various aspects of some embodiments of the present invention.

In this instance, PPE (13) is greater than $PE_3$ (4), so Final Predicted Engagement is $PE_3$, or 4. The program code executing on one or more processors in this embodiment of the present invention would display 4 as the predicted number of likes, favorites, retweets, etc. for a proposed tweet (FIG. 14A).

Figure 14B:
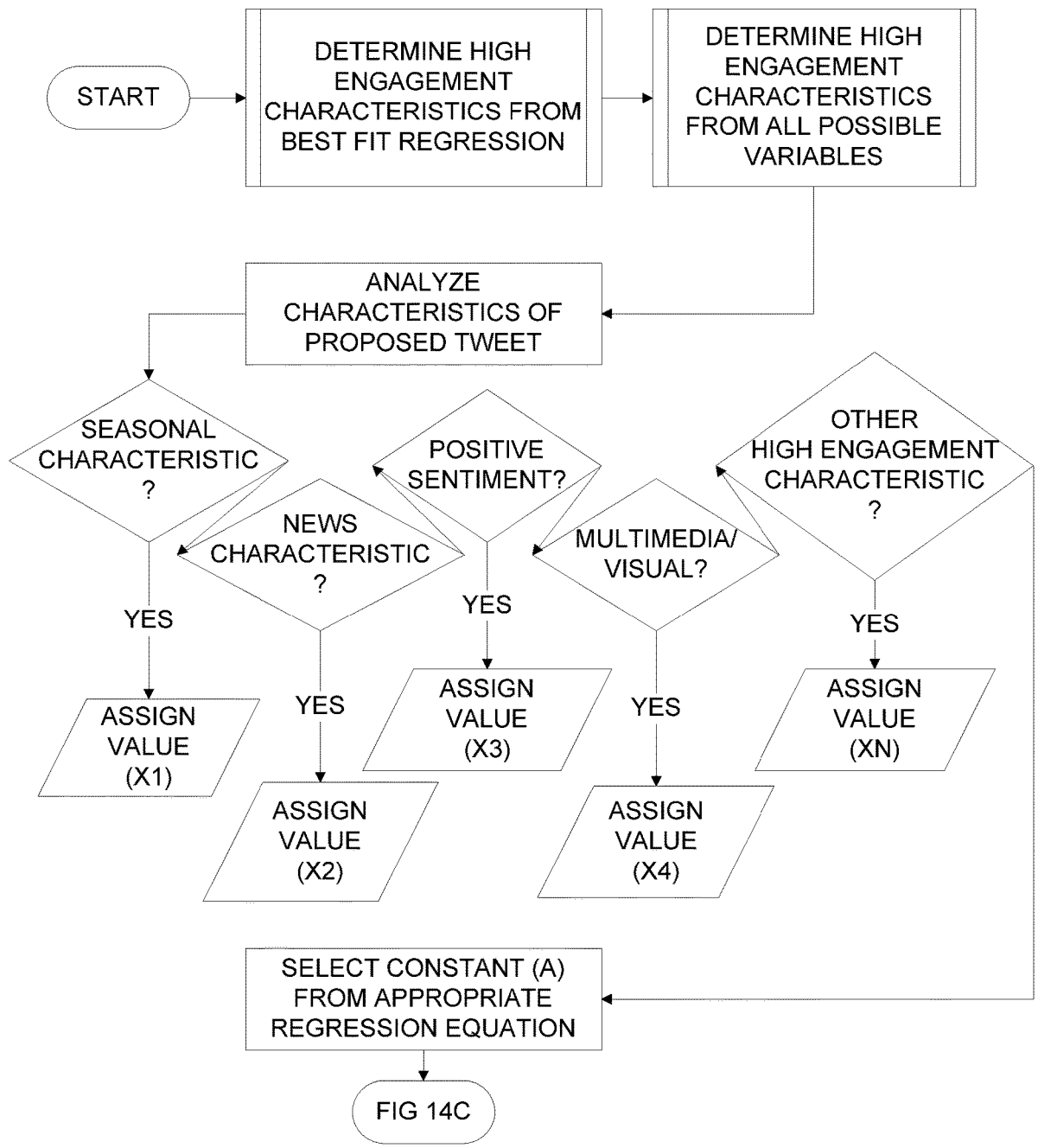
FIGS. 14B-14C are a workflow that depicts various aspects of some embodiments of the present invention.
Figure 14C:
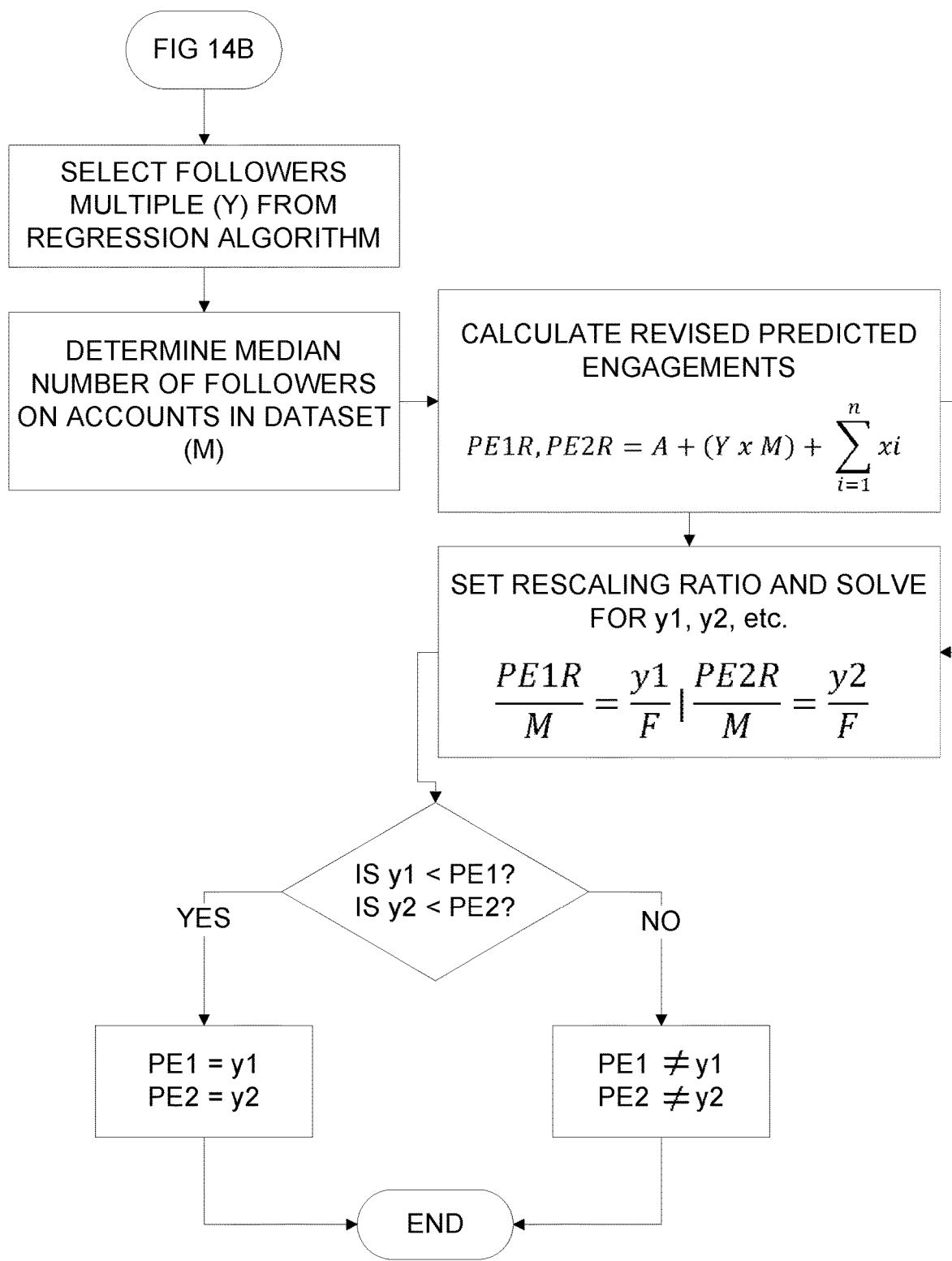

In some cases, the application may need to adjust the predicted engagement on Twitter in order to make it proportional to the number of followers on the account from which the post will be published. For example, for equations that directly predict engagement without first determining engagement rate, the number of followers on the accounts in the dataset of pre-existing tweets used to develop the series of equations will likely differ from the number of followers entered into the application interface by the user. In such instances, the system would recalculate and scale the predicted engagement in order to make it proportional to the number of followers entered into the application by the user, or on the Twitter account where the post will be published (FIG. 14B). Thus, in certain embodiments of the invention, when predicting engagement on Twitter the system would substitute the number of followers entered into the application interface by the user (F) with the median number of followers in the dataset used to generate the predictive equations.

The first step in the scaling process is to recalculate predicted engagement based on the median number of followers in the dataset of pre-existing tweets, rather than the number of followers entered into the application by the user. When executing these equations, the system would substitute the value of F in the equation with the value of M, the median number of followers in the dataset of pre-existing tweets used to generate the predictive equation. For example, in equation #1 ($PE_1$) for predicting engagement on Twitter, F has been replaced with M, as shown below. The system, executing the equation below, will produce a revised predicted engagement, $PE_{1R}$, that will be scaled to the number of users entered into the application and compared to the initial $PE_1$ to determine the lowest value:

$$PE_{1R} = \left( A + (Y \times M) + \sum_{i=1}^{n} x_i \right)$$

Using the initial equation #1 for predicting engagement on Twitter, where the system calculated $PE_1$ based on the number of followers entered into the application by the user, the system produced an initial predicted engagement ($PE_1$) of 15 interactions (rounded to the nearest whole number) with 1,104 followers. In this intermediate step, the number of followers entered into the application by the user (F) of 1,412 is replaced with the median number of followers in the dataset of pre-existing tweets (M) of 2,696. Using the revised equation #1, where M replaces F, the system executes and generates a revised predicted engagement ($PE_{1R}$), also of 15 interactions, rounded to the nearest whole number:

PE1R=2.653+(0.00008541×2696)+3.810+3.646+ 2.526+1.959

PE1R=15

In the second step to make this prediction proportionate to the number of followers entered into the application by the user, the system can set (i) the ratio of the revised predicted engagement ($PE_{1R}$) to the median number of followers in the dataset of pre-existing tweets that generated the equation used to make the prediction (or $PE_{1R}$:M, where M equals the median), equal to the ratio of $y_1$, an unknown representing the scaled version of predicted engagement, to the number of followers (F) entered into the application interface by the user (or $y_i$:F). In notation, we can assign the subscript "1" to y (as in $y_1$) in this instance to signify that $y_1$ represents a rescaled version of predicted engagement for equation #1. The system may rescale other equations such as equation #2, equation #3, etc. and assign the appropriate subscript such as $y_2$, $y_3$, etc. to distinguish the rescaled predicted engagement from the initial predicted engagement ($PE_2$, $PE_3$, etc.) generated by equation #2, equation #3, etc. In the example below, the revised predicted engagement ($PE_{1R}$) of 15 interactions, developed from a dataset of pre-existing tweets where the median number of followers across all accounts used to generate the predictive model is 2,696, is adjusted to predict engagement on a Twitter account with 1,104 followers:

$$\frac{15}{2696} = \frac{y1}{1104}$$

$16,560 = 2696 y_1$ $y_1 = 6$

Thus, in this instance, the system produces a scaled predicted engagement, $y_1$, that is proportional to the number of followers on the user's Twitter account. The system could calculate $PE_1$ and $y_1$, then execute a conditional statement to compare the values of the initial $PE_1$ (15) and the rescaled predicted engagement for this equation, $y_1$ (6), and select the lower of the two values, such that:

$y_1 < PE_1 \rightarrow PE_1 = y_1$

Otherwise, the value of $PE_1$ remains the same. In this example, the system would replace the initial $PE_1$ of 15 interactions with the rescaled predicted engagement, $y_1$ of 6 interactions, rounded to the nearest whole number, for a Twitter account with 1,104 followers. Thus, the system would replace the initial predicted engagement generated by Twitter equation #1, $PE_1$, with the value of the rescaled predicted engagement $y_1$, during the process of selecting equations described above. $Y_1$ would become $PE_1$ in the selection factor matrix and the series of conditional statements.

Predicting Engagement on Facebook

Facebook is a social networking platform that allows users to post text and multimedia content in order to share that content with others who have "liked" or "followed" their Facebook page or those with whom they have become "friends" on Facebook, hereinafter referred to as followers. Typically, when someone posts content on Facebook, the content appears on their page "timeline" as well as in the "news feed" of their followers. Facebook also allows users to join groups and post content to other members of those groups.

Because the process of predicting engagement on Facebook is complex and can involve many factors such as the content characteristics of the post, the number of followers on a Facebook page, the time of day of the post, the number of posts, etc., the program code therefore uses multiple variables and multiple predictive models in order to select the model that yields the best prediction of engagement on Facebook. In addition, the specific characteristics of what drives engagement on Facebook may differ from what drives engagement on other social media platforms such as Instagram and Twitter. Therefore, the program code may use different variables, different combinations of variables, or different numerical values for variables in the predictive models for Facebook compared to the predictive models for other social networking platforms.

In one embodiment of the invention, the program code focuses on the content characteristics of a proposed Facebook post, the number of followers, and the percentage of followers who will likely see a post. To predict engagement on Facebook the program code first determines the predicted engagement rate for a proposed Facebook post based on the content characteristics or qualities of the post. The program code then takes the product of the predicted engagement rate and the number of followers on the Facebook page or members of the group where the content will be posted.

Figure 15:
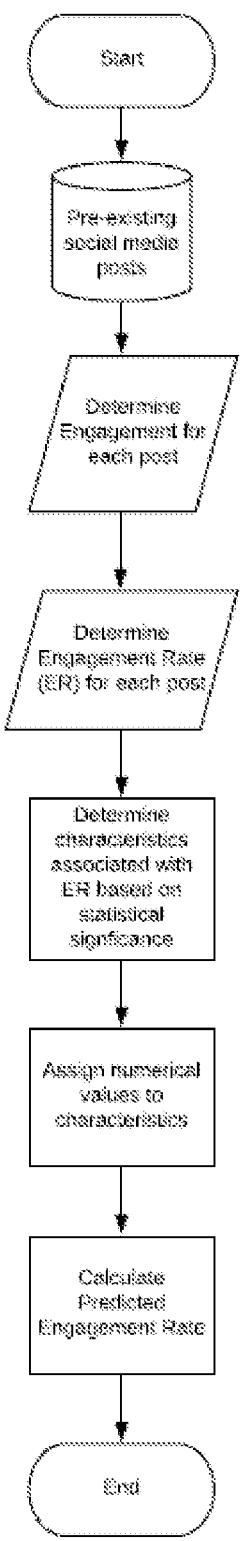
FIG. 15 is a workflow that depicts various aspects of some embodiments of the present invention.

In this embodiment, the process for predicting engagement begins with the analysis of the characteristics of a dataset of pre-existing Facebook posts (FIG. 15). The analysis identifies whether the posts in the dataset include the presence of certain characteristics that are known to result in user engagement or interaction. Such characteristics include but are not limited to: a seasonal component, the provision of tips or advice in a specific content area, a hyperlink, the posing of a question, a call-to-action, positive sentiment, a connection to a current news item, simplicity (brief, readable or easy to understand), and a multimedia/visual component. There may be more characteristics proven to increase engagement on Facebook. For each post in the dataset, the program code determines actual engagement, then calculates the engagement rate for that post based on the number of followers on the Facebook page where the content was posted. The program code then correlates the engagement rate with the known engagement characteristics in a correlation matrix to determine which characteristics are most significantly and positively associated with engagement.

Next, to determine the specific numerical values to assign to content characteristics in a predictive model, the program code conducts a multiple linear regression analysis using the following parameters:

independent variables include only those content characteristics that have a positive and significant correlation coefficient with engagement rate, where the alpha level, or p value associated with the correlation coefficient is less than 0.001; and the dependent variable is engagement rate.

The next step in the process is to calculate the Predicted Engagement Rate (PER), which is equal to the sum of the sum of the statistically significant unstandardized coefficients ($X_1, X_2, \ldots X_n$) from the multiple linear regression equation and the intercept or constant from the regression equation (A), as shown below:

$$PER_1 = \left(A + \sum_{i=1}^{n} x_i\right)$$

where:
$PER_1$=Predicted Engagement Rate (option 1)
A=Intercept or Constant from linear regression equation
$X_1$=Content characteristic 1
$X_2$=Content characteristic 2
$X_n$=Content characteristic n For example, suppose a correlation matrix reveals that the content characteristic SENTIMENT has a significant correlation with engagement rate on Facebook, based on the pre-existing dataset. The program code then uses that characteristic as an independent variable and engagement rate as the dependent variable in a linear regression analysis to confirm this association with engagement rate and determine appropriate weightings for that characteristic in a predictive model. In one instance of this equation, the program code can assign values to these variables, such that:

$PER_1$=Predicted Engagement Rate (option 1)
A=0.002
$X_1$=0.002 (Sentiment)
In this instance:

$PER_1$=0.002+0.002

$PER_1$=0.004

Because equation #1 calculates the Predicted Engagement Rate (PER), or the percentage of one's Facebook followers who will engage (i.e., like, share, comment, etc.) with a post, the program code can eventually convert the PER to actual predicted engagement, based on the number of followers on the Facebook page where the content will be posted. To convert the Predicted Engagement Rate ($PER_1$) into Predicted Engagement (PE), the program code takes the product of $PER_1$ and F, the number of followers on the Facebook page on which the content will be posted:

$PE_1 = PER_1 \times F$ $PE_1$=0.004×1412

$PE_1$=5.648

Figure 16:
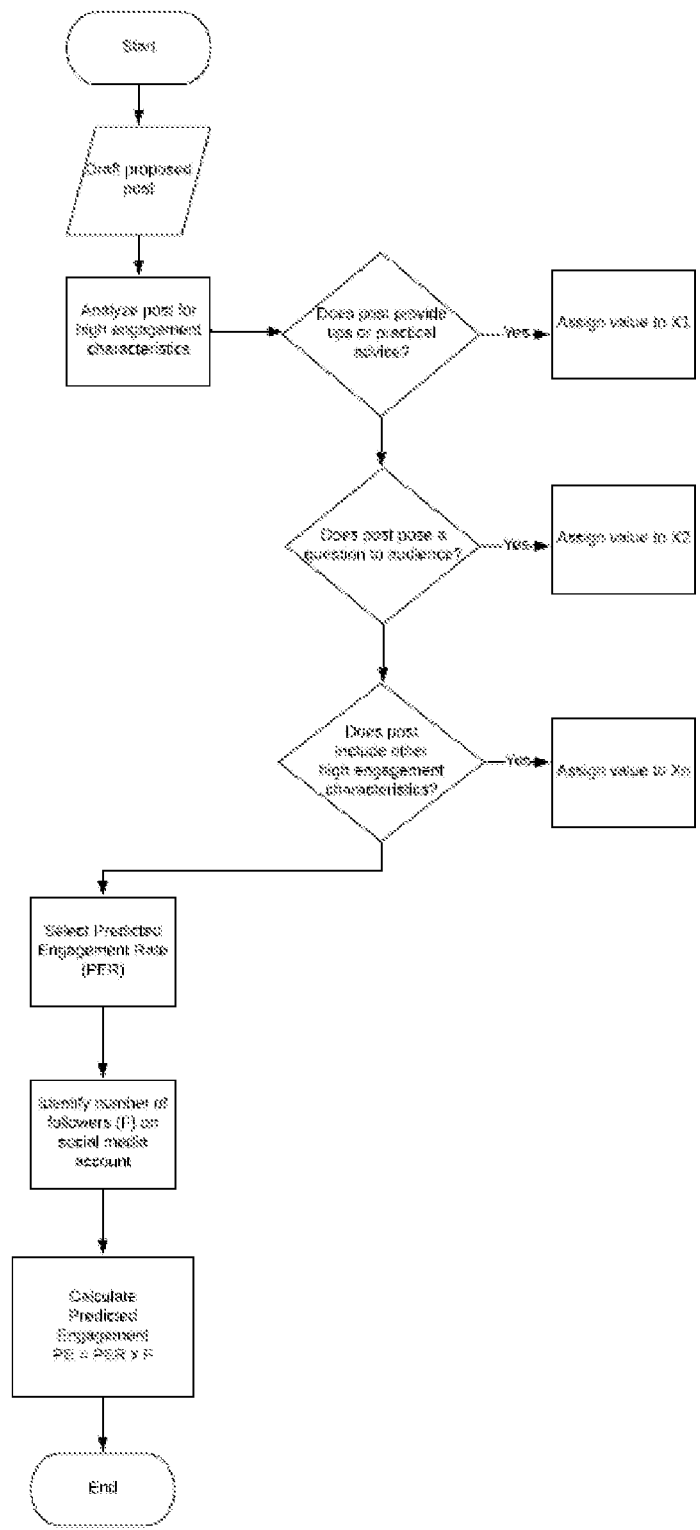
FIG. 16 is a workflow that depicts various aspects of some embodiments of the present invention.

If the program code rounds $PE_1$ to the nearest positive whole number, equation #1 in this instance would predict that the proposed post will obtain a total of 6 likes, shares, comments, etc. when posted on Facebook. FIG. 16 provides an overview of this process.

Figure 17:
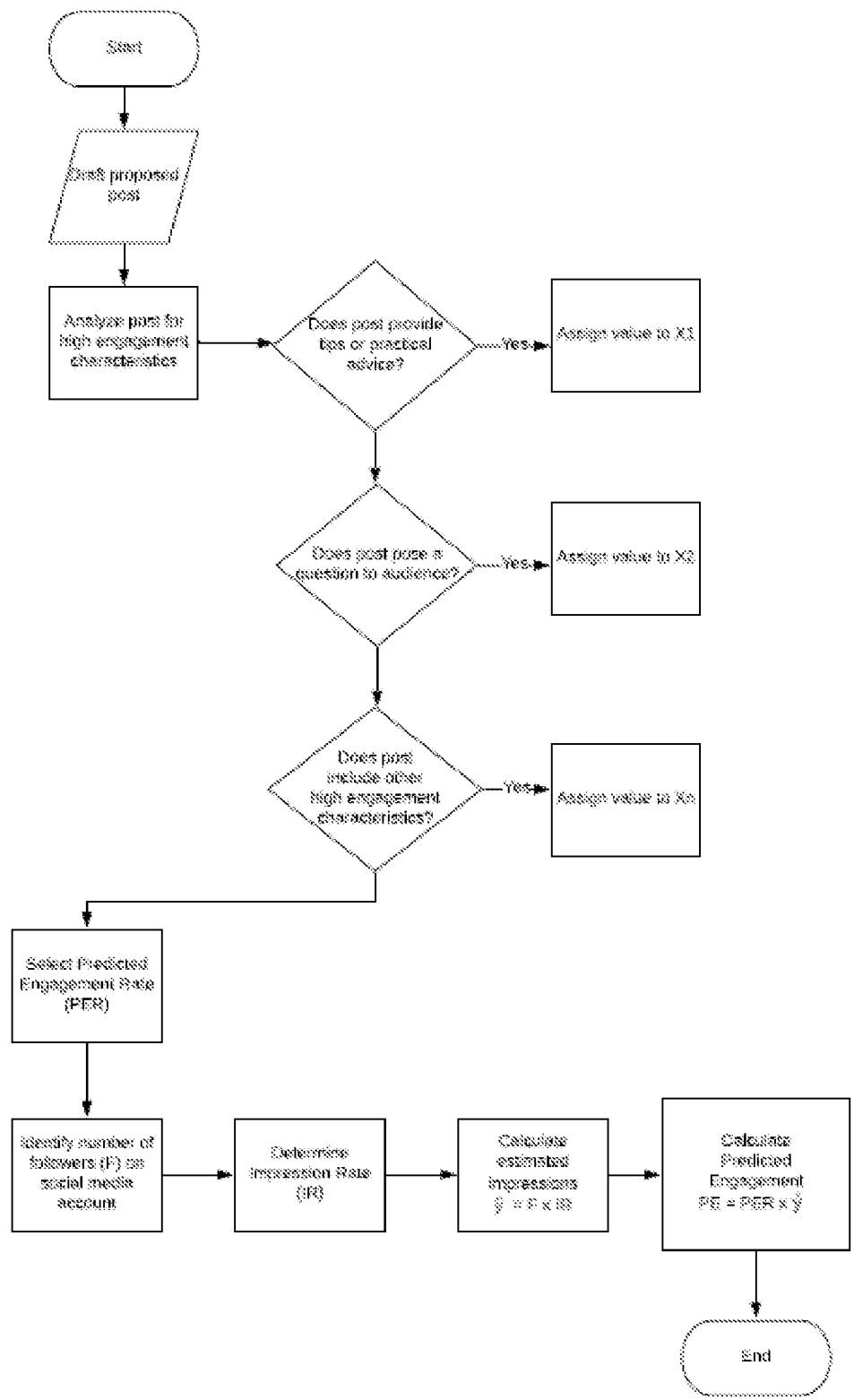
FIG. 17 is a workflow that depicts various aspects of some embodiments of the present invention.

In this embodiment of the invention, the program code could conduct an additional step in the analysis and estimate the impression rate, or how many of one's Facebook followers will actually see a proposed post (FIG. 17). Facebook's algorithm may not show all content posted on a page to every person who is following that page. Certain circumstances, such as how often one has interacted or engaged with posts from the same account in the past, the amount of content posted on the Facebook pages an individual is following and one's interaction level with that content, can affect how many of one's followers actually see a given post. Thus, an individual following a specific Facebook page may only see a percentage, but not all, of the posts from that page. The number of individuals who had a page's posts on their screen is currently identified as "reach" by Facebook. In this instance, the term reach refers to organic reach, as opposed to paid reach where an individual pays to have his/her post promoted, "boosted" or advertised on Facebook.

The program code determines the impression rate (IR), expressed as a decimal, for a proposed Facebook post by taking the quotient of reach (R), which represents the number of individuals expected to see the post, divided by the total number of followers on the Facebook page where the content will be posted (F), as shown below:

IR=R+F

The program code can estimate the expected reach (R) for a proposed Facebook post using any number of methods, including but not limited to taking historical data provided by Facebook and calculating the average reach for a series of pre-existing posts for the specific Facebook account from which the content will be posted, using data from a social media industry report that calculates average reach for Facebook, and the like.

The impression rate will be expressed as a decimal, typically representing a percentage in the single digits such as 0.01 to 0.09. For example, if the average reach for posts, or a subset of posts, on a Facebook page with 1412 followers is 33, the program code could use an impression rate of 0.023, or 2.3 percent when expressed as a percentage, to determine predicted engagement, as shown below:

IR=33+1412

IR=0.023

Thus, the program code can expect that approximately 2.3 percent of followers on the Facebook page will see the proposed post.

In this embodiment, the program code could also use data from an industry study or report to estimate the impression rate. For example, if an industry study concludes based on research that the average reach for a post on Facebook across all industries, or for a specific industry such as fashion, is 3.5 percent, then the program code can use 0.035 as the impression rate in the process for predicting engagement on Facebook.

The program code can apply the impression rate (IR) in the determination of predicted engagement for a proposed social media post by converting IR into actual estimated impressions ($\hat{y}$), expressed as a positive whole number. To convert the impression rate (IR) into an actual number of estimated impressions ($\hat{y}$), the program code multiplies IR, expressed in decimal format, by the number of followers (F) on the account, as depicted below:

$$\hat{y} = F \times IR$$

where ŷ equals estimated impressions, expressed as a whole number; F equals the total number of followers, fans, page likes, etc. on a Facebook page; and IR equals the impression rate, expressed as a decimal.

In this manner, if a Facebook page has 50,000 followers or page likes, etc., and the estimated impression rate for a proposed post is 0.035, then the program code determines estimated impressions as follows:

$$\hat{y} = 50,000 \times 0.035$$

$$\hat{y} = 1,750$$

The program code do this by multiplying the estimated number of impressions (ŷ) and the Predicted Engagement Rate (PER).

To determine predicted engagement ($PE_1$) for a proposed Facebook post, in this instance the program code takes the product of the estimated number of impressions (ŷ) and the Predicted Engagement Rate (PER) from equation #1:

$$PE_1 = PER \times \hat{y}$$

$$PE_1 = 0.004 \times 1,750$$

$$PE_1 = 7$$

Thus, equation #1 in this embodiment would predict that the proposed post will obtain 7 likes, shares, comments, etc. when posted on Facebook.

Figure 10A:
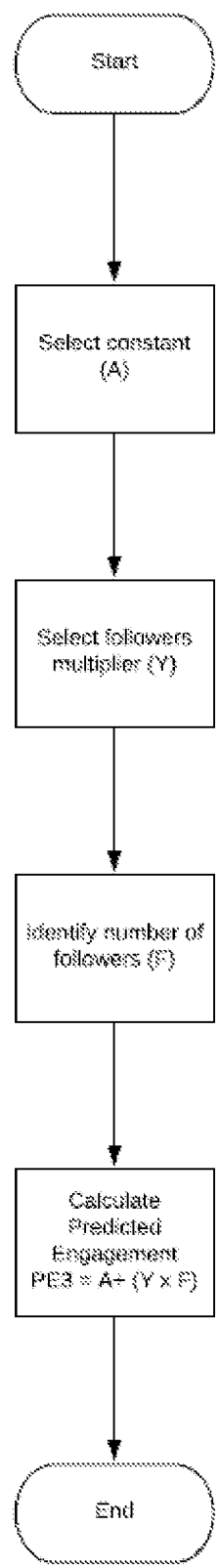

Another embodiment of the invention, equation #2, is to determine the expected engagement for a post on Facebook by the number of people who have "liked" or followed the Facebook page from which the post originated (FIG. 10a)

In this embodiment, the program code takes the sum of (i) the constant in the multiple regression equation in which engagement is the dependent variable and the number of followers is the independent variable and (ii) the product of the followers multiplier (the value of the statistically significant unstandardized coefficient for followers in the regression equation) and the number of followers (F), as in below:

$$PE_2 = A + (Y \times F)$$

where:
A=Intercept/Constant
Y=Followers multiplier, used to weight the number of followers, page likes, fans, or friends on a Facebook page
F=Number of followers, page likes, fans, or friends on the Facebook page where the content will be posted If the program code assigns values to each variable, the program code can calculate Predicted Engagement using equation #2 ($PE_2$) for a proposed Facebook post:
A=10.694
Y=0.0007138
F=1412
$PE_2$=10.694+(0.0007138×1412)
$PE_2$=11.702

If the program code rounds $PE_2$ to the nearest whole number, equation #2 would predict that the proposed post will obtain a total of 12 likes, shares, comments, etc. when posted on Facebook.

Figure 18:
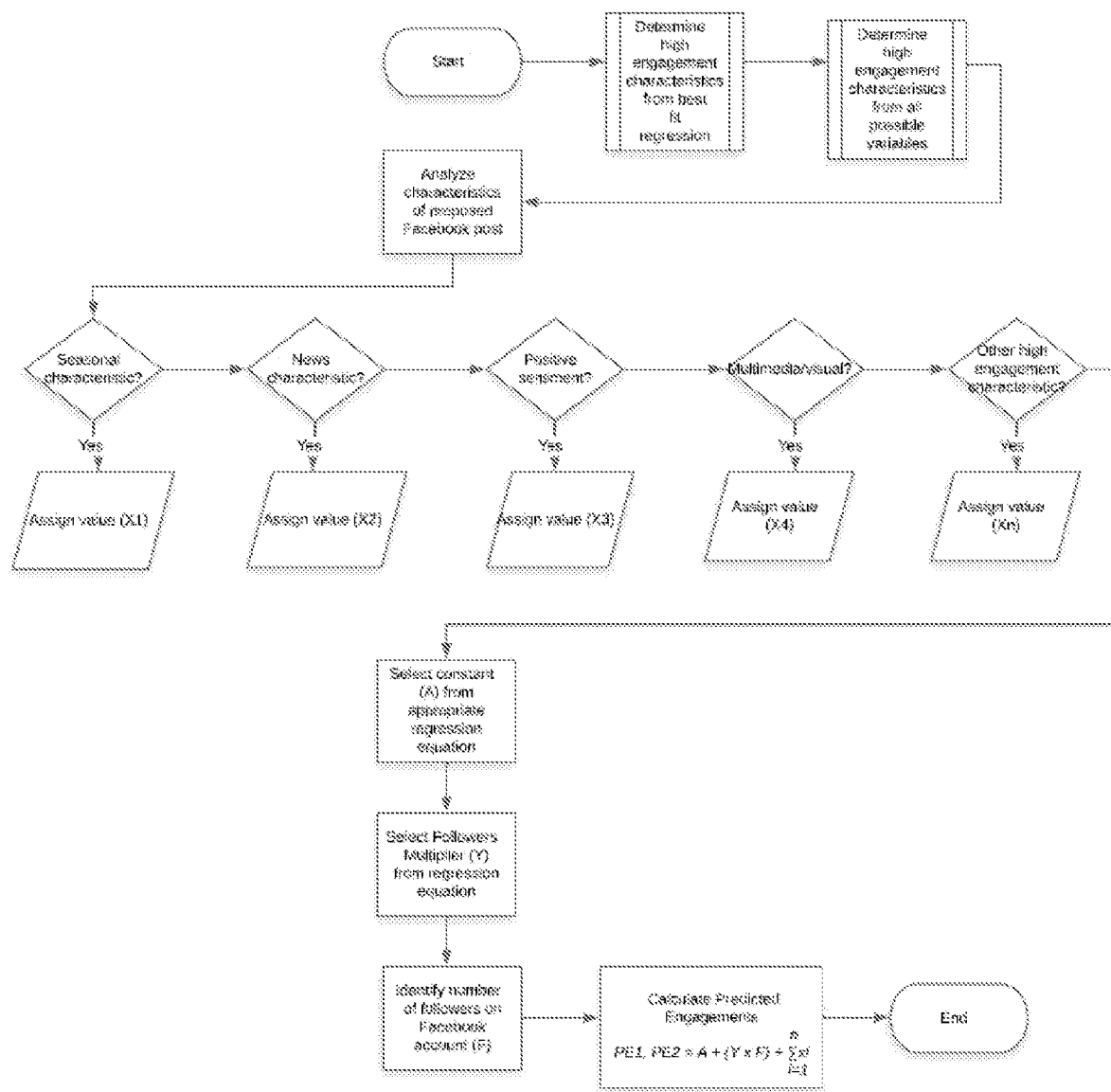
FIG. 18-18B are workflows that depict various aspects of some embodiments of the present invention.

Another embodiment of the invention for predicting engagement for a Facebook post is to calculate engagement based on the characteristics or qualities of the proposed content (FIG. 18). In this embodiment, equation #3, the program code uses all of the characteristics associated with high levels of engagement and the number of followers on a Facebook page as independent variables, and engagement as the dependent variable in a multiple linear regression analysis. The program code then uses only those characteristics that are positively and significantly associated with engagement in the final equation for predicting engagement.

More specifically, the program code assigns numerical values to the characteristics based on the values of the statistically significant unstandardized coefficients in the regression equation.

The equation takes the form:

$$PE_3 = \left( A + (Y \times F) + \sum_{i=1}^{n} x_i \right)$$

where:
$PE_3$=Predicted Engagement Rate (option 3)
A=Intercept or Constant from multiple linear regression equation
Y=Followers multiplier, used to weight the number of followers, page likes, fans or friends on a Facebook page
F=Number of followers, page likes, fans or friends on the Facebook page where the content will be posted
$X_1$=Content characteristic 1
$X_2$=Content characteristic 2
$X_n$=Content characteristic n For example, suppose out of all possible content characteristics, positive SENTIMENT, connection to a current NEWS item, and the number of FOLLOWERS show the strongest association with engagement on Facebook. The program code assigns values from the regression equation to each variable in equation #3 as follows:
A=0.901
Y=6.657×10$^{-4}$
F=1412
$X_1$=11.118 (Sentiment)
$X_2$=13.162 (News)
$PE_3$=0.901 (0.0006657×1412)+11.118+13.162
$PE_3$=26.121

If the program code rounds $PE_3$ to the nearest whole number, equation #3 would predict that the proposed post will obtain a total of 26 likes, shares, comments, etc. when posted on Facebook.

In the current implementation described above, the invention will execute a series of equations, such that "n" number of equations will produce "n" number of estimates of predicted engagement for each proposed Facebook post. There could be fewer equations as well as additional equations that take into account other combinations of variables proven to increase engagement on Facebook.

In this embodiment, the program code uses three equations for predicting engagement on Facebook which yield the following results:
$PE_1$=6 likes, comments, shares, etc.
$PE_2$=12 likes, comments, shares, etc.
$PE_3$=26 likes, comments, shares, etc.

The process for selecting the most accurate predictive model includes processing these "n" number of equations on pre-existing Facebook posts from the Facebook page on which the proposed content will be posted, comparing the "n" number of predicted engagements with actual engagement for a series of pre-existing Facebook posts, and selecting the equations that provide the best estimates of engagement. For the purposes of this invention, the program code determines the equations that offer the best estimates of engagement by identifying the equations that meet the highest number of the following criteria:

provide the nearest estimates to actual engagement most frequently for the pre-existing Facebook posts studied, based on the absolute value of the difference between predicted engagement and actual engagement for each post;

produce the value closest to zero, either positive or negative, in aggregate mean difference from actual engagement for the pre-existing Facebook posts studied;

produce the value closest to zero, either positive or negative, in aggregate median difference from actual engagement for the pre-existing Facebook posts studied;

generate the value closest to zero, either positive or negative, in aggregate sum of differences between predicted engagement and actual engagement for the pre-existing Facebook posts studied;

produce the value closest to zero, either positive or negative, in aggregate standard deviation from actual engagement for the pre-existing Facebook posts studied;

produce the value closest to zero, either positive or negative, in aggregate variance from actual engagement for the pre-existing Facebook posts studied;

produce the value closest to zero, either positive or negative, in aggregate range from actual engagement for the pre-existing Facebook posts studied;

produce the value closest to zero, either positive or negative, in aggregate mode from actual engagement for the pre-existing Facebook posts studied; and perform well on other statistical comparison measures in that there are not significant differences between predicted engagement and actual engagement.

To select the most accurate equations, the program code rates each equation on factors (i) through (ix) in a matrix by assigning each equation points based on its respective order in the ranking. For example, suppose n=3. For each of the four equations, the program code compares predicted engagement to actual engagement on 311 pre-existing Facebook posts, such that:

Equation #1 provides the nearest estimate to actual engagement for 144 posts.

Equation #2 provides the nearest estimate to actual engagement for 62 posts.

Equation #3 provides the nearest estimate to actual engagement for 105 posts.

In this instance, equations #1 and #3 most frequently provide the nearest estimate to actual engagement on the sample of pre-existing posts (144 and 105, respectively), based on the absolute value of the difference between predicted engagement and actual engagement for each post, so the program code assigns those equations points, such that the equation with the highest ranking gets the most points. The highest ranking receives a score of n−1, where n equals the number of equations being compared in the selection factor matrix, the next highest ranking receives a score of n−2, and the program code continues this pattern until the program code reaches the conclusion of the equations, n−n. In this instance, the program code assigns points to the equations as follows:

Equation #1: 2 points
Equation #3: 1 point
Equation #2: 0 points

While equation #1 most often provided the nearest estimate to actual engagement for the pre-existing Facebook posts studied, the program code can also take into consideration how close those estimates are to actual engagement. For any given equation, predicted engagement may be higher or lower than actual engagement based on the specific combination of variables used in the equation, the characteristics of the post, the number of followers, the impression rate and other factors. As a result, an equation may overestimate or underestimate expected engagement and the program code can base its final choice of which predictive equation to use on a number of measures (in certain embodiments of the present invention).

Therefore, in order to select the most accurate predictive model, the next step in the process is to analyze the overall size and distribution of the difference between predicted and actual engagement for each equation. For this the program code calculates statistical measures of central tendency (median, mean, mode, etc.) and dispersion (standard deviation, variance, range, etc.) for the difference between predicted and actual engagement for each of the "n" number of equations. Taken together, these measures indicate how large a difference there is between what level of engagement an equation predicted a sample of pre-existing posts would get, compared to the actual level of engagement the posts received. Equations that produce smaller overall differences in absolute value between predicted and actual engagement on these measures of central tendency and dispersion represent better predictive models. Since the program code is measuring differences between predicted and actual engagement, the differences are desired to be as close to zero as possible. Larger positive or negative values, respectively, for differences in mean, median and the like indicate that an equation may have overestimated or underestimated engagement more frequently compared to the other equations. Theoretically, these measures of central tendency and dispersion could be zero, indicating that there is no difference between predicted and actual engagement. The program code therefore takes the value closest to zero on these measures for each equation, as shown in the Table 5 below:

TABLE 5

|  | Predict-Actual Equation #1 | Predict-Actual Equation #2 | Predict-Actual Equation #3 |
|---|---|---|---|
| Valid | 311 | 311 | 311 |
| Missing | 0 | 0 | 0 |
| Mean | 18.66 | −0.00013 | −6.155 |
| Median | 0.362 | 7.618 | −1.155 |
| Mode | 0.836 | 9.706 | −0.155 |
| Std. Deviation | 65.54 | 37.62 | 37.16 |
| Variance | 4296 | 1415 | 1381 |
| Range | 522.5 | 382 | 382.1 |
| Minimum | −244.5 | −324.2 | −324.2 |
| Maximum | 278 | 57.84 | 57.95 |
| Sum | 5803 | −0.04079 | −1914 |
| Nearest Est | 144 | 62 | 105 |

Equation #1 most frequently provided the nearest estimate to actual engagement for the sample of 311 pre-existing Facebook posts. However, the mean difference between predicted engagement and actual engagement is closest to zero for equation #2 ($\bar{x}$=−0.00013) compared to equation #1 ($\bar{x}$=18.66). The sum of all differences between predicted engagement and actual engagement on each post is closest to zero with equation #2 (−0.04079). In this instance, equation #1 and equation #3 may have more often overestimated and underestimated engagement on posts, or overestimated or underestimated engagement on some posts by a wider margin compared to equation #2. However, equation #3 and equation #2 yield a smaller standard deviation in differences from predicted engagement to actual engagement ($s=37.16$ and $s=37.62$, respectively) compared to the other equation, indicating that predicted engagement based on equation #3 and equation #2 have less variability from the mean and may be more reliable than equation #1.

The program code assigns points in a matrix to the "n" number of equations based on their ranking on these statistical measures and predictive accuracy. The equation closest to zero on each measure gets the highest ranking and receives the most points, n−1 (where n equals the number of equations being compared in the selection factor matrix). The next highest ranking receives a score of n−2, the third highest ranking receives points of n−3 and the program code continues this pattern of assigning points, n−4, n−5, etc. until the program code reaches the conclusion of the equations and assigns a value of zero, n−n, to the equation with the largest difference in absolute value on each specific measure, as shown in the table below.

If two equations are equal on any given metric, the program code assigns both of those equations the same number of points based on their order in the matrix (i.e., n−1 points each for the highest ranking, n−2 points each for the next highest ranking, n−3 points each for the third highest ranking, and so on). In situations where one or more equations score the same on any given metric, for the next lowest equation in the ranking, the program code skips the next descending number and assigns that equation the number of points two digits down. For example, if there were three equations and two of those equations ranked in second place on a given metric, then the two equations with the equal ranking would both receive 2 points in the matrix on that metric. The program code would then skip the next descending number (1) in the ranking and assign the equation with the next highest ranking zero points. This is illustrated in Table 6 below.

TABLE 6

Selection Factor Matrix

| | Predict-Actual Equation #1 | Predict-Actual Equation #2 | Predict-Actual Equation #3 |
|---|---|---|---|
| Mean | 1 | 3 | 2 |
| Median | 3 | 1 | 2 |
| Mode | 2 | 1 | 3 |
| Std. Deviation | 1 | 2 | 3 |
| Variance | 1 | 2 | 3 |
| Range | 1 | 3 | 2 |
| Sum | 1 | 3 | 2 |
| Nearest Est | 3 | 1 | 2 |
| Total | 13 | 16 | 19 |

The program code can use the Selection Factor Matrix to reduce the number of equations and select only the best predictive models to advance in the analysis. In the example shown above, ranking each equation on the selection factors shows that equation #3 and equation #2, respectively, perform best when analyzed on these statistical measures. Equation #1 receives the lowest point score.

In this embodiment of the invention, the program code can conduct an additional step to assess the predictive accuracy of the equations. The program code applies a Chi Square goodness-of-fit test where the actual distribution of points among equation #1, equation #2, and equation #3 in the selection factor matrix (13, 16, and 19 points, respectively) is compared to an expected equal distribution of points (16, 16, and 16 respectively). The program code conducts this test to determine if there is a significant difference in the allocation of points for the predictive equations on the selection factors (i) through (ix). In this instance, the Chi Square goodness-of-fit test shows that the difference between the actual distribution of points in the selection matrix and the expected distribution of points among the predictive equations is not significant $\chi^2(2, N=3)=1.125, p=0.570$. Therefore, in this embodiments of the present invention, the result from the program code is that no one equation performs significantly better or worse than expected in the selection factor matrix.

The program code can now select one final equation for predicting engagement on Facebook and display the result. The program code does this by passing the results from the three equations through a series of logical conditions such that the program code selects the lowest positive value for predicted engagement. First, the program code checks to see if equation #1 ($PE_1$) and equation #3 ($PE_3$) both yield predictions of zero engagement, or less than zero. If this condition is met, the program code selects equation #2 ($PE_2$) as Final Predicted Engagement (FPE), as shown below:

$$(PE_1 \leq 0) \& (PE_3 \leq 0) \rightarrow FPE = PE_2$$

If this condition is not met, the program code then compares the results of equation #1 and equation #2 and names the lowest result Preliminary Predicted Engagement (PPE). In this manner, if the result of equation #1 is less than or equal to the result of equation #2, the program code (or a user as a pre-configuration) names the result of equation #1 as PPE. Otherwise, the program code names the result of equation #2 as PPE.

$$(PE_1 \leq PE_2) \rightarrow PPE = PE_1$$

$$(PE_1 > PE_2) \rightarrow PPE = PE_2$$

The program code can now compare Preliminary Predicted Engagement (PPE) with the result of equation #3 and select the lowest value. If the value of PPE is less than or equal to the value of $PE_3$, then the program code selects PPE as Final Predicted Engagement $$(PPE \leq PE_3) \rightarrow FPE = PPE$$

Otherwise, the program code selects $PE_3$ as Final Predicted Engagement:

$$(PPE > PE_3) \rightarrow FPE = PE_3$$

If, after executing this series of logical conditions, Final Predicted Engagement (FPE) is a negative number, the program code assigns a value of zero to FPE.

Thus, working through the conditional statements produces the following result:

Condition one. Compare the results of equation #1 and equation #3.

$$(PE_1 \leq 0) \& (PE_3 \leq 0) \rightarrow FPE = PE_2$$

In this instance, both $PE_1$ (6) and $PE_3$ (26) are not equal to or less than zero, so the first logical condition is not satisfied.

Condition two. Compare the results of equation #1 and equation #2.

$$(PE_1 \leq PE_2) \rightarrow PPE = PE_1$$

$$(PE_1 > PE_2) \rightarrow PPE = PE_2$$

In this instance, PE$_1$ (6) is less than PE$_2$ (12), so the program code assigns the value of PE$_1$ to Preliminary Predicted Engagement: PPE=6.

Condition three. Compare the results of Preliminary Predicted Engagement (PPE) and equation #3 (PE$_3$)·(PPE≤ PE$_3$)→FPE=PPE (PPE>PE$_3$)→FPE=PE$_3$ In this instance, PPE (6) is less than PE$_3$ (26), so Final Predicted Engagement is PPE, or 6.

Figure 18A:
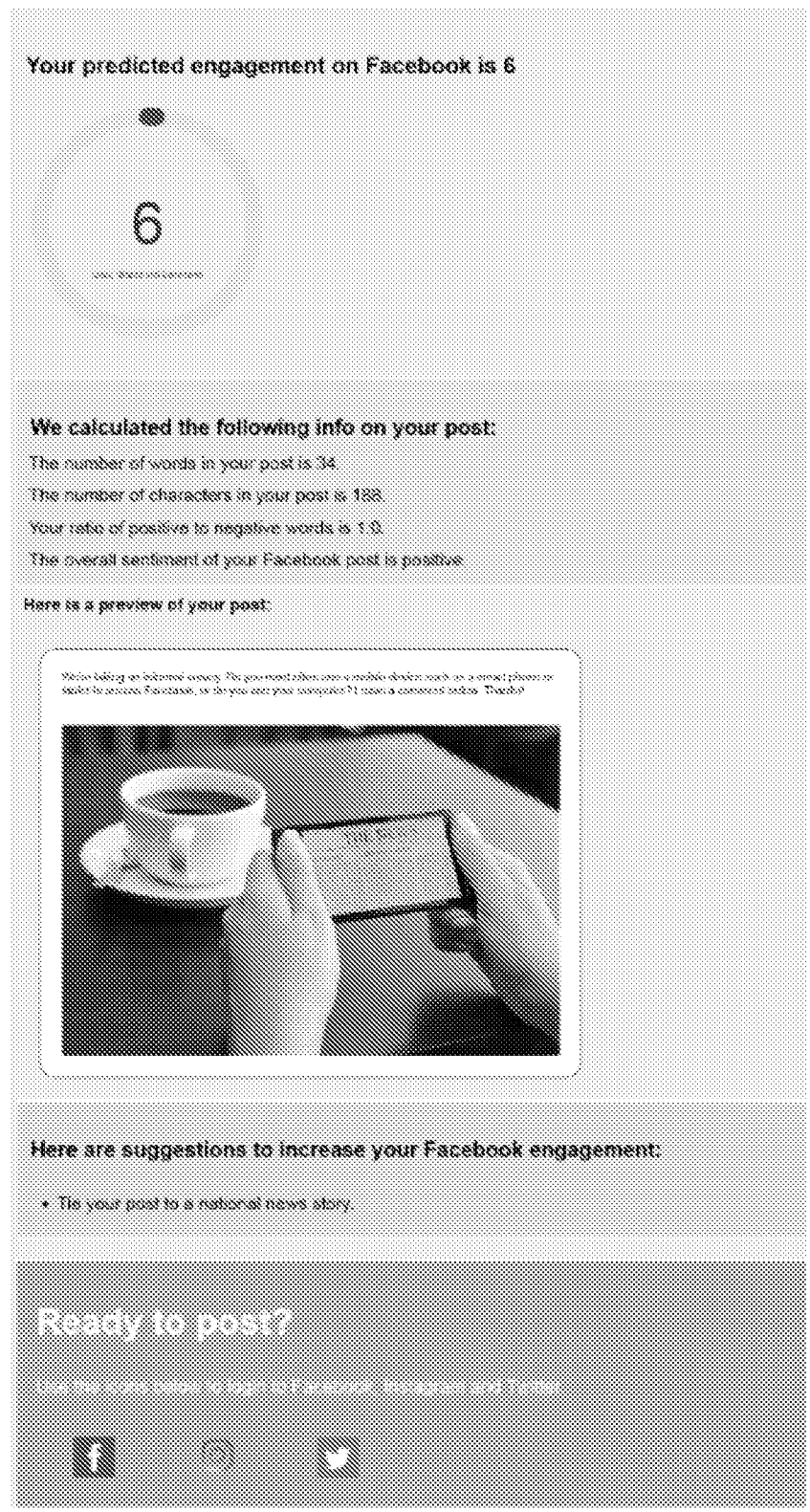
FIG. 18A is an example of a graphical user interface displaying various aspects of some embodiments of the present invention.

Thus, in this embodiment, the invention would predict that the proposed Facebook post would receive 6 likes, loves, comments, shares, etc. The invention would then display a predicted engagement of 6 likes, shares, comments, etc. for the proposed Facebook post (FIG. 18A).

Figure 18B:
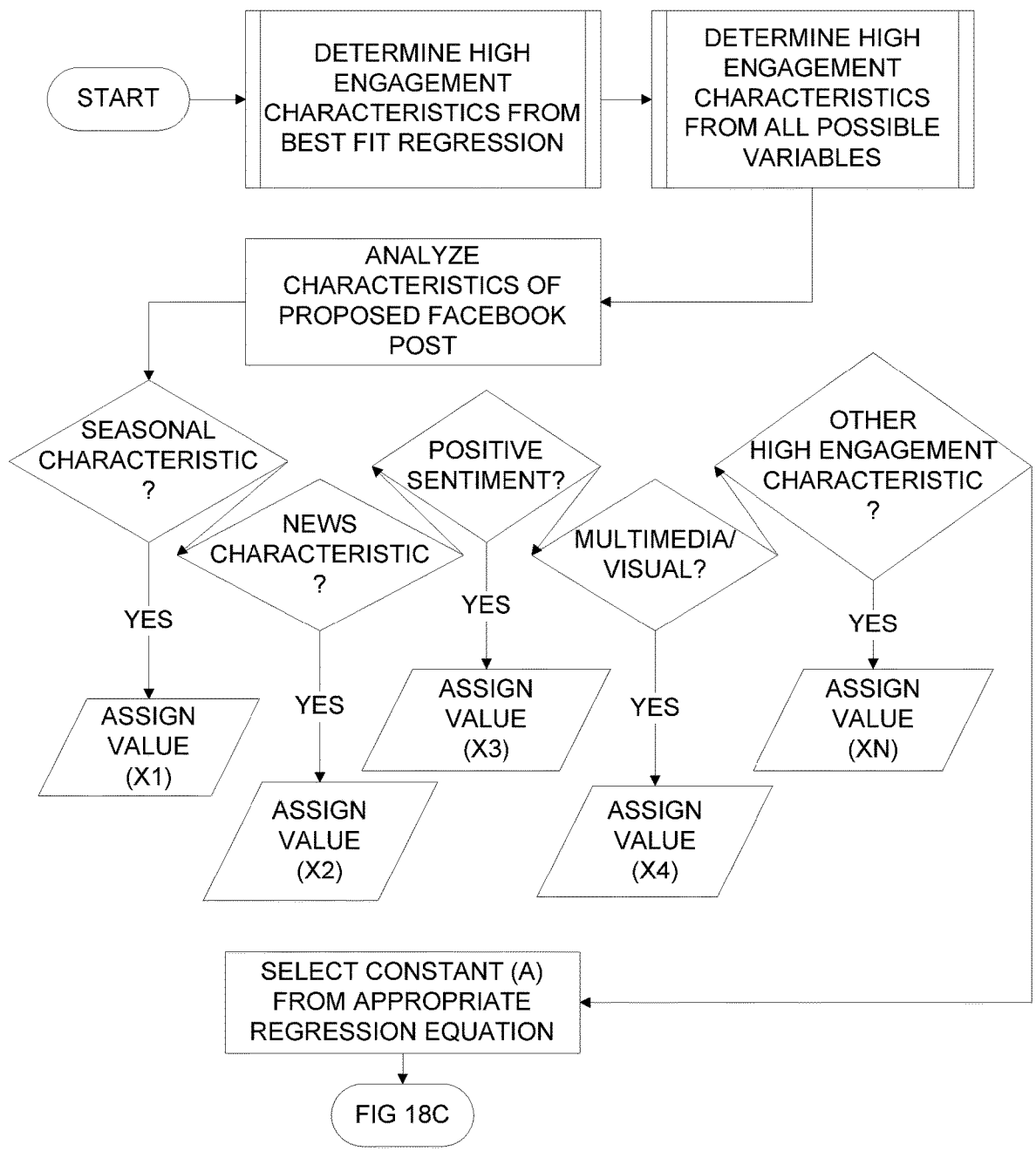
Figure 18C:
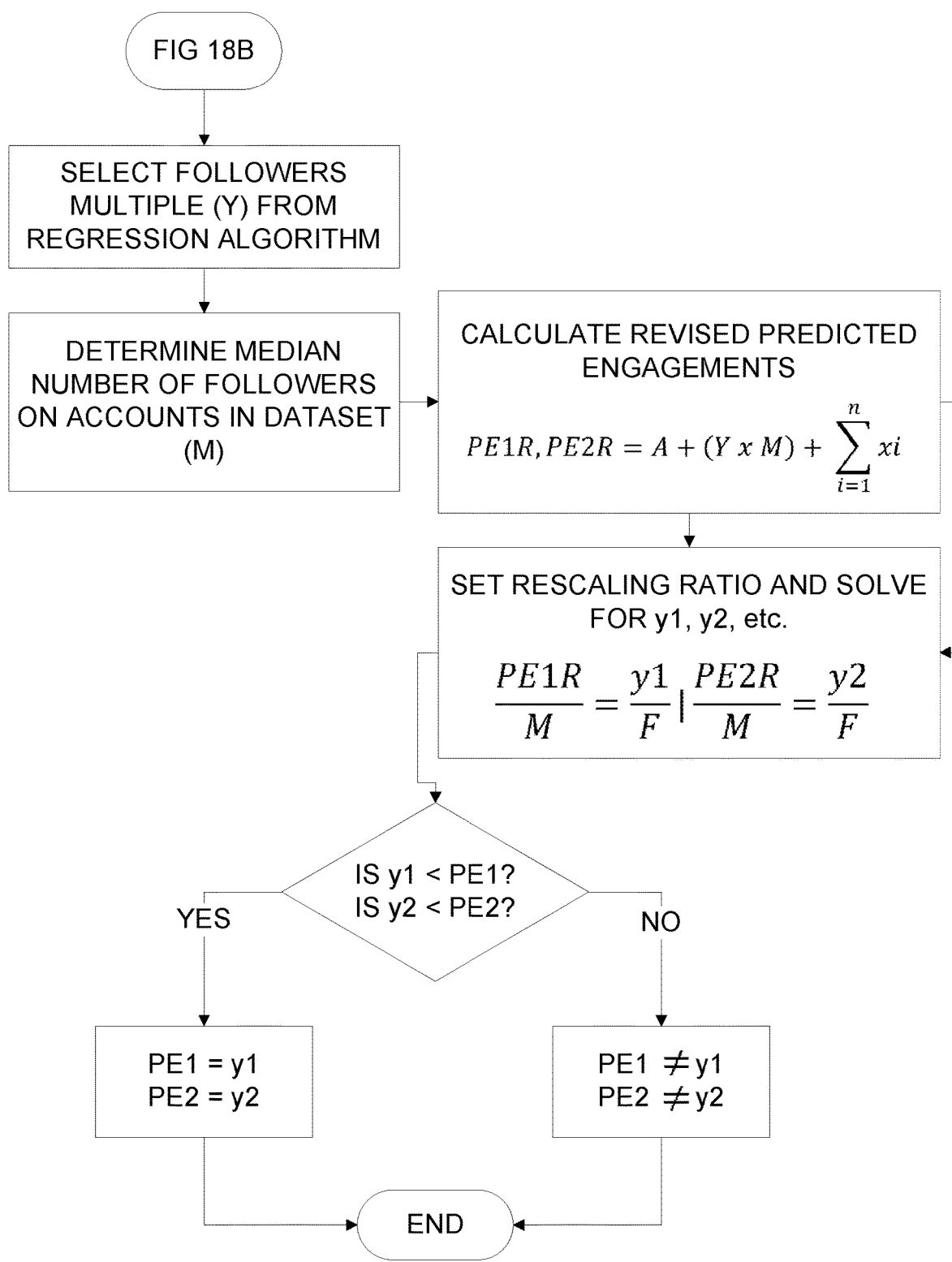

In some cases, the application may need to adjust the predicted engagement in order to make it proportional to the number of followers on the Facebook account from which the post will be published. For example, for equations that directly predict engagement without first determining engagement rate, the number of followers on the accounts in the dataset of pre-existing Facebook posts used to develop the series of equations will likely differ from the number of followers entered into the application interface by the user. In such instances, the system would recalculate and scale the predicted engagement in order to make it proportional to the number of followers entered into the application by the user, or on the Facebook account where the post will be published (FIG. 18B). Thus, in certain embodiments of the invention, when predicting engagement on Facebook, the system would substitute the number of followers entered into the application interface by the user (F) with the median number of followers in the dataset of pre-existing Facebook posts used to generate the equations.

The first step in the scaling process is to recalculate predicted engagement based on the median number of followers in the dataset of pre-existing Facebook posts, rather than the number of followers entered into the application by the user. When executing these equations, the system would substitute the value of F in the equation with the value of M, the median number of followers in the dataset of pre-existing Facebook posts used to generate the predictive equation. For example, in equation #3 for predicting engagement on Facebook, F has been replaced with M, as shown below. The system, executing the equation below, will produce a revised predicted engagement, PE$_{3R}$ that will be scaled to the number of users entered into the application and compared to the initial PE$_3$ to determine the lowest value:

$$PE_{3R} = \left(A + (Y \times M) + \sum_{i=1}^{n} x_i\right)$$

Using the initial equation #3 for predicting engagement on Facebook, where the system calculated PE$_3$ based on the number of followers entered into the application by the user, the system produced an initial predicted engagement (PE$_3$) of 26 interactions (rounded to the nearest whole number) with 1,412 followers. In this intermediate step, the number of followers entered into the application by the user (F) of 1,412 is replaced with the median number of followers in the dataset of pre-existing Facebook posts (M) of 2,696. Using the revised equation #3, where M replaces F, generates a revised predicted engagement (PE$_{3R}$) of 27 interactions, rounded to the nearest whole number:

PE3R=(0.901+(0.0006657×2696)+11.118+13.162)

PE3R=27

In the second step to make this prediction proportionate to the number of followers entered into the application by the user, the system can set (i) the ratio of the revised predicted engagement (PE$_{3R}$) to the median number of followers in the dataset of pre-existing Facebook posts that generated the equation used to make the prediction (or PE$_{3R}$:M, where M equals the median), equal to the ratio of y$_3$, an unknown representing the scaled version of predicted engagement, to the number of followers (F) entered into the application interface by the user (or y$_3$:F). In notation, we can assign the subscript "3" toy (as in y$_3$) in this instance to signify that y$_3$ represents a rescaled version of predicted engagement for equation #3. The system may rescale other equations such as equation #2 and assign the appropriate subscript such as y$_2$ to distinguish the rescaled predicted engagement from the initial predicted engagement (PE$_2$) generated by equation #2. In the example below, the revised predicted engagement (PE$_{3R}$) of 27 interactions, developed from a dataset of pre-existing Facebook posts where the median number of followers across all accounts used to generate the predictive model is 2,696, is adjusted to predict engagement on a Facebook account with 1,412 followers:

$$\frac{27}{2696} = \frac{y3}{1412}$$

38,124=2696y$_3$ y$_3$=14

Thus, in this instance, the system produces a scaled predicted engagement y$_3$ that is proportional to the number of followers on the user's Facebook account. The system could calculate PE$_3$ and y$_3$, then execute a conditional statement to compare the values of the initial PE$_3$ (26) and the rescaled predicted engagement for this equation, y$_3$ (14), and select the lower of the two values, such that:

y$_3$<PE$_3$→PE$_3$=y$_3$

Otherwise, the value of PE$_3$ remains the same. In this example, the system would replace the initial PE$_3$ of 26 interactions with the rescaled predicted engagement, y$_3$ of 14 interactions, rounded to the nearest whole number, for a Facebook account with 1,412 followers. Thus, the system would replace the initial predicted engagement of 26 generated by equation #3 with the value of the rescaled predicted engagement y$_3$, or 14, during the process of selecting equations described in [00493] through [00538]. Y$_3$ would become PE$_3$ in the selection factor matrix and the series of conditional statements.

In certain situations, equation #1, equation #2 and equation #3 may not consistently yield an accurate prediction of engagement for a proposed Facebook post. For example, in Table 5 above, the measures of dispersion for the difference between predicted engagement and actual engagement for each of the three equations is relatively large, indicating that in some cases there may be a large discrepancy between the predicted engagement and actual engagement. In such circumstances where (i) the standard deviation or variance in the difference between predicted engagement and actual engagement is large for one or more equations, or (ii) the range in the difference between predicted engagement and actual engagement is large, or (iii) the minimum difference and/or the maximum difference between predicted engagement and actual engagement is large, the system may use an alternate methodology for predicting engagement on Facebook (equation #4 below). During the process for selecting the most accurate predictive model, we can set a maximum value, or threshold value, for certain selection criteria such as the standard deviation for the difference between predicted engagement and actual engagement for an equation, the range in the difference between predicted engagement and actual engagement for an equation, the minimum difference between predicted engagement and actual engagement for an equation and/or the maximum difference between predicted engagement and actual engagement for an equation such that if an equation exceeds the threshold value, the system may use an alternative methodology for predicting engagement on Facebook such as the embodiment described below.

Figure 19A:
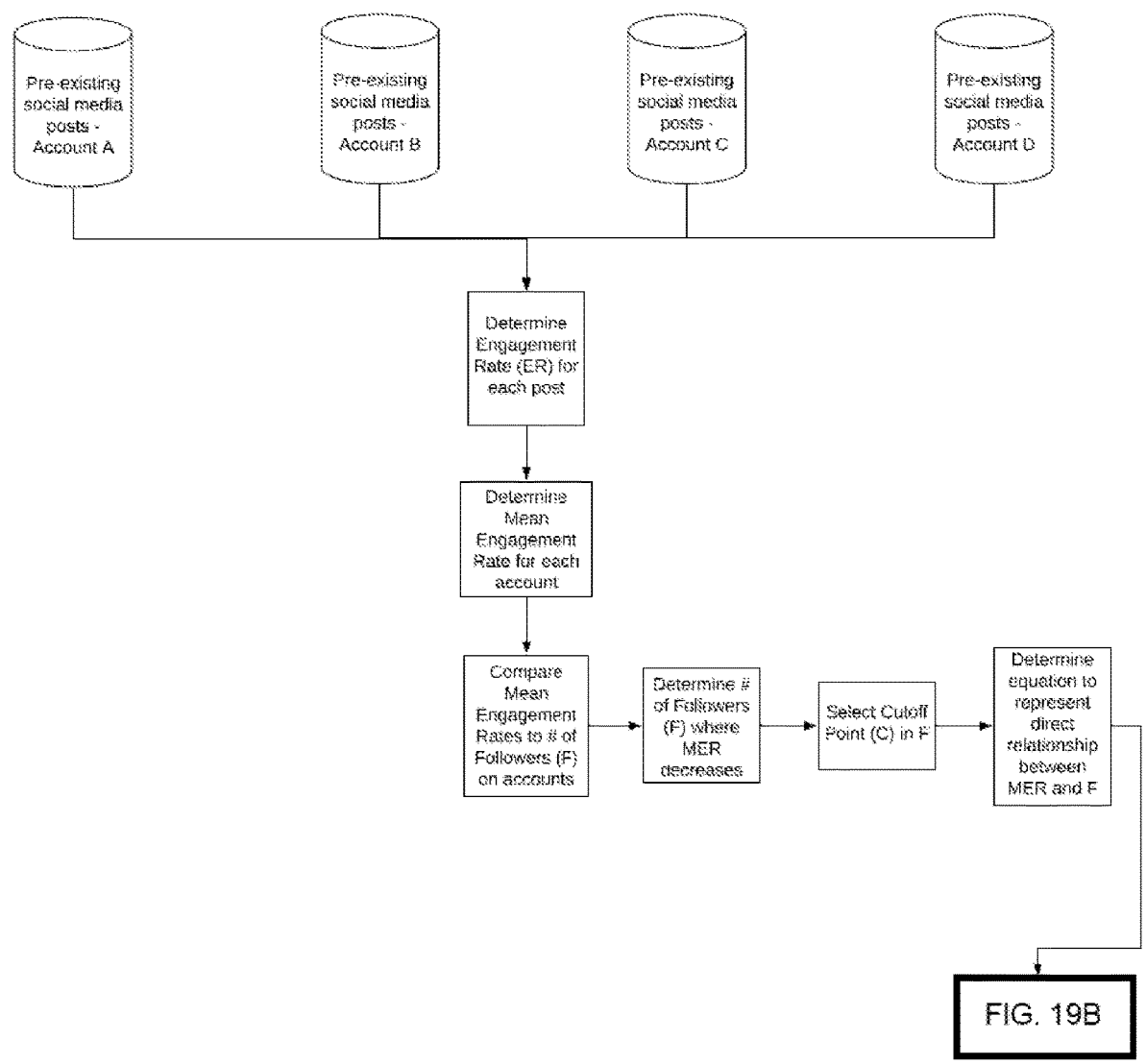
FIGS. 19A-19B are workflows that depict various aspects of some embodiments of the present invention.
Figure 19B:
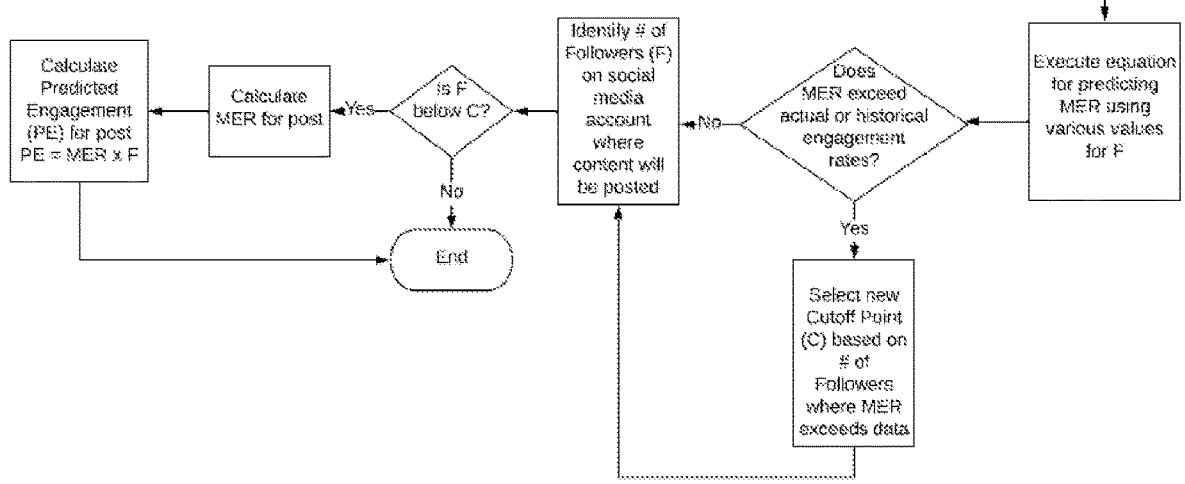

In another embodiment of the invention (FIGS. 19A-19B), the program code may determine the appropriate equation for calculating the predicted engagement rate based on the number of followers on a Facebook account. In this embodiment, to determine the predicted engagement rate for a proposed Facebook post, the program code estimates the percent of followers that will engage with a post based on the number of followers on the account from which the content will be posted.

The procedure for estimating the percent of followers that will engage with a post is as follows: Start by taking a dataset of pre-existing Facebook posts from "n" number of accounts where "n" equals a positive whole number such as 1, 2, 3, etc. Second, the program code determines the ENGAGEMENT RATE for each single post within the "n" number of accounts by summing all of the "likes", "loves", "comments", "shares", etc. (i.e., engagement) received by that post, then dividing engagement for each post by the number of followers on the account. Next, for each account in the dataset the program code calculates the average percentage of followers who engaged with all of the pre-existing posts on that account, hereinafter referred to as MEAN ENGAGEMENT RATE, by taking the sum of all the engagement rates for each individual post and dividing the sum by the number of posts for that account, such that the program code can generate a table as shown below as Table 7, where in this instance n=4 Facebook accounts:

TABLE 7

| Account | Number of Followers | Mean Engagement Rate |
|---|---|---|
| 1 | 1418 | 0.002821 |
| 2 | 2696 | 0.003006 |
| 3 | 7181 | 0.004614 |
| 4 | 70252 | 0.000842 |

Figure 27:
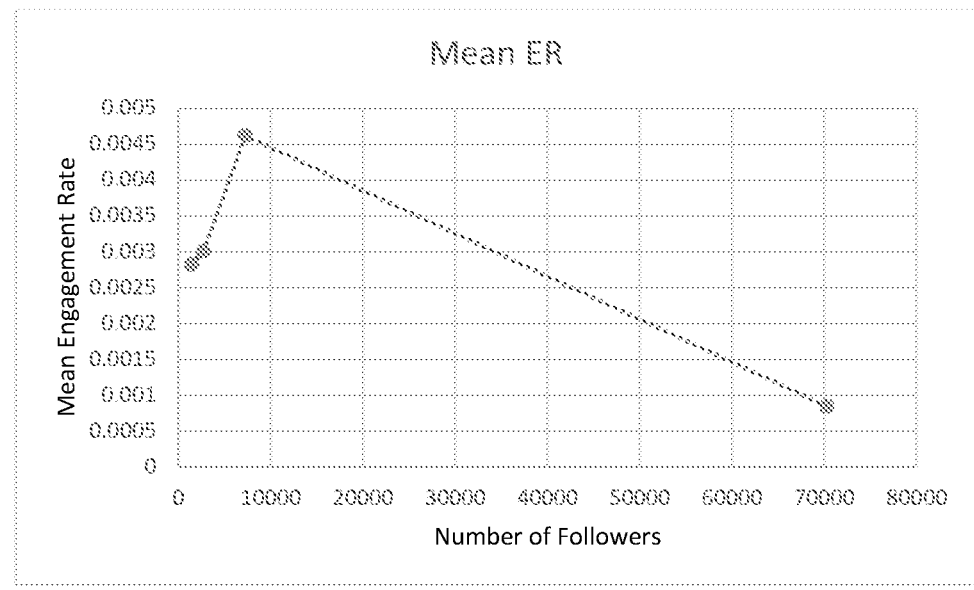

For this dataset, the table above illustrates that the mean engagement rate increases for each Facebook account as the number of followers increase, except that as the number of followers continues to increase, there is a point at which the mean engagement rate decreases. For example, the mean engagement rate on posts increases for Account #1, Account #2 and Account #3 as the number of followers increases, up until Account #4, the account with the highest number of followers, at which point the mean engagement rate on posts decreases. The program code can graph this relationship, as shown in FIG. 27.

Figure 20:
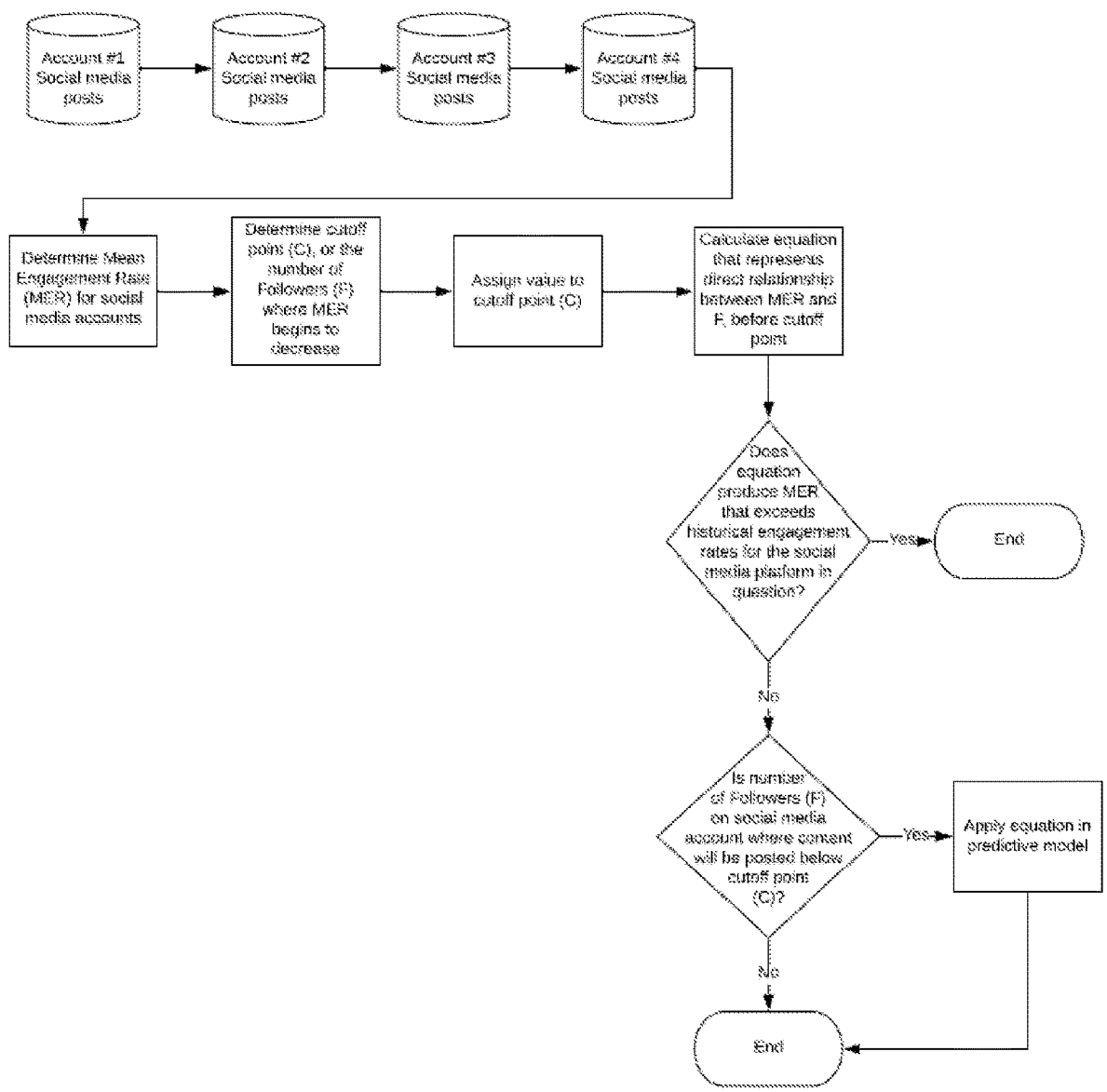
FIG. 20 is a workflow that depicts various aspects of some embodiments of the present invention.

In this embodiment of the invention, the program code may use one or more linear, exponential or logarithmic regression equations to represent the relationship between mean engagement rate and the number of followers. The program code would then predict engagement for a proposed Facebook post based on the predicted mean engagement rate for a given number of followers on the Facebook account from which the content will be posted. For example, in the table above, the relationship between mean engagement rate (MER) and the number of followers (F) while both variables are simultaneously increasing (the portion of the graph represented by the bold dotted line near the y-axis) can be expressed by an exponential regression equation that takes the form:

$$MER = Ae^{(FC)F}$$

where:
MER=Mean Engagement Rate
A=coefficient from regression equation
e=the mathematical constant represented by 2.71828182845
FC=Followers Coefficient
F=number of followers, fans or page likes, etc. on a Facebook account However, as shown in the graph above, there may be a limited range in the number of followers for which such equation may apply (FIG. 20). In the event the relationship between MER and F becomes an inverse relationship, where mean engagement rate decreases while the number of followers increase, such as with Account 4, in this embodiment the program code would determine the appropriate number of followers at which the mean engagement rate is expected to decrease, or the cutoff point (C). The cutoff point for the use of this equation to predict engagement is therefore the number of followers at which a decrease in mean engagement rate occurs, or the point at which the inverse relationship begins. In the example above, the number of followers at which the mean engagement rate decreases is approximately 10,000 followers. The program code could then set the cutoff point for using this equation to predict engagement at 10,000 followers, in the manner shown below:

$$F < 10,000 \rightarrow MER = Ae^{(FC)F}$$

Figure 26:
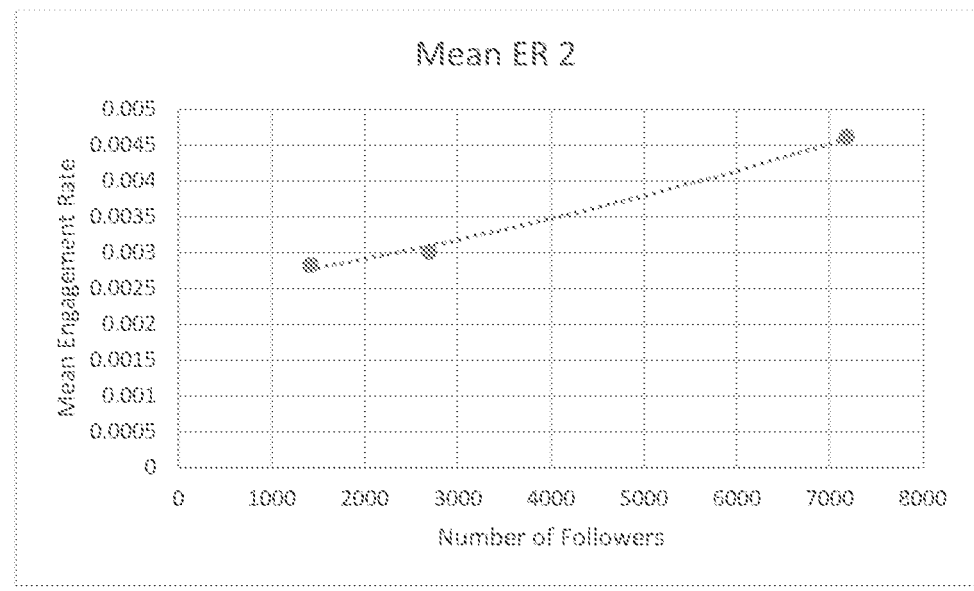
FIGS. 26-28 demonstrate various aspects of some embodiments of the present invention.

In this specific example, the relationship for predicting Mean Engagement Rate (MER) when the number of followers or page likes on a Facebook account is less than 10,000 can be represented as:

$$MER = 0.0024 e^{(9 \times 10^{-5})F}$$

where:
e=the mathematical constant represented by 2.71828182845
F=number of followers, fans or page likes, etc. on a Facebook account The graph for the dotted portion of the line in the figure above which represents the range in the number of followers where the mean engagement rate can be expected to increase as the number of followers or page likes on a Facebook account increase can be depicted in FIG. 26.

Applying the equation to accounts A, B and C, which are all below the cutoff point of 10,000 followers, demonstrates that the program code can be utilized to estimate mean engagement rate with a high degree of accuracy—more specifically, to within nine hundred-thousandths, five hundred-thousandths and three hundred-thousandths, respectively, as shown in Table 8 below:

TABLE 8

| Followers | Actual Mean Engagement Rate | Predicted Mean Engagement Rate | Predict minus actual |
|---|---|---|---|
| 1418 | 0.002821 | 0.002727 | −0.000094 |
| 2696 | 0.003006 | 0.003059 | 0.000053 |
| 7181 | 0.004614 | 0.004580 | −0.000034 |

In addition, the program code can conduct one additional test to determine the appropriate cutoff point in the number of followers at which to use this equation to predict engagement. There could be a number of followers at which the equation will produce a mean engagement rate that exceeds actual or historical Facebook engagement rate data. Therefore, the program code can determine at what number of followers, if any, the equation will produce a predicted engagement rate that exceeds actual or historical Facebook engagement rate data. If this point is lower than the previously set cutoff point, the program code (or an administrator) would lower the cutoff point for the use of this equation to predict engagement. Otherwise, the program code may use the existing cutoff point—in this instance, 10,000 followers.

Actual or historical mean engagement rate data for Facebook could include posts from "n" number of randomly selected accounts on Facebook, accounts in a particular industry, a sample of posts from the specific Facebook account on which the proposed content will be posted, data from social media industry research reports, and the like. The purpose is to get a benchmark engagement rate from which to compare the engagement rate produced by the equation, taking into account the fact that Facebook and/or research reports may define or calculate engagement and engagement rate using slightly different metrics than the invention. For example, according to a 2018 industry report, the average engagement rate for Facebook posts was 3.91 percent, or 0.0391 expressed as a decimal. The program code therefore compares the predicted mean engagement rate produced by the equation at various numbers of followers to actual or historical Facebook engagement rate data in order to determine if there is a number of followers at which the equation will produce a mean engagement rate that exceeds actual or historical Facebook engagement rate data, as shown in Table 9 below:

TABLE 9

| Predicted Mean Engagement Rate | Followers | Predicted Engagement | Increase in Engagement | % Increase (Engagement) |
|---|---|---|---|---|
| 0.00272669 | 1418 | 3.866447649 | 0.00000000 | |
| 0.00305906 | 2696 | 8.247234487 | 4.38078684 | 53% |
| 0.00458027 | 7181 | 32.89094482 | 24.64371033 | 75% |
| 0.00590305 | 10000 | 59.03047467 | 26.13952985 | 44% |
| 0.00925782 | 15000 | 138.8673191 | 79.83684444 | 57% |
| 0.01451915 | 20000 | 290.3830783 | 151.51575919 | 52% |
| 0.02277057 | 25000 | 569.2641502 | 278.88107189 | 49% |
| 0.03571136 | 30000 | 1071.340684 | 502.07653401 | 47% |
| 0.08783576 | 40000 | 3513.430507 | 2442.08982240 | 70% |
| 1.33695342 | 70252 | 93923.65167 | 90410.22116004 | 96% |

Table 9 above illustrates that the equation will exceed historical Facebook engagement rates when the number of followers is more than 30,000.

To determine if the program code (or a user) has set the appropriate cutoff point in the number of followers for using this equation to predict engagement, we want to ensure that before a decline in mean engagement rate occurs, the program code, when applying the equation does not produce a mean engagement rate that exceeds actual or historical Facebook engagement rate data. The program code therefore compares the number of followers at which the equation produces engagement rates above actual or historical Facebook engagement rate data ($F_1$)—in this instance 30,000 followers—to the number of followers at which mean engagement rate declines ($F_2$)—in this instance, 10,000 followers—and selects the lesser of $F_1$ and $F_2$ as the cutoff point, such that:

$$F_1 \leq F_2 \rightarrow C = F_1$$

$$F_1 > F_2 \rightarrow C = F_2$$

where:
$F_1$=number of followers at which the equation produces engagement rates above actual or historical Facebook engagement rate data
$F_2$=number of followers at which mean engagement rate declines
C=cutoff point for use of the equation to predict engagement In this instance, the number of followers at which the equation produces a mean engagement rate that exceeds actual or historical Facebook data ($F_1$) is 30,000 followers and the number of followers at which the mean engagement rate decreases ($F_2$) is 10,000. The program code would therefore select the lesser of the two ($F_2$), or 10,000 followers, as the cutoff point for use of this equation to predict engagement. When the number of followers, fans, page likes, etc. on a Facebook account exceeds the cutoff point, in some embodiments of the present invention, the program code can be configured to apply a different equation for calculating mean engagement rate, in order to reflect lower expected engagement on accounts with greater numbers of followers.

In this embodiment, the program code can apply this equation as an option in predicting engagement for a proposed Facebook post, such that (for example, an option can be offered to a user through an interface):

$$F < 10{,}000 \rightarrow \text{MER} = Ae^{(FC)F}$$

For example, on a Facebook account with 1,412 followers or page likes, etc., the program code could use the equation to predict MER as follows:

$$\text{MER} = 0.0024 e^{9 \times 10^{-5} F}$$

$$\text{MER} = 0.0024 e^{0.00009 F}$$

$$\text{MER} = 0.0024 \times 2.71828182845^{0.00009(1412)}$$

$$\text{MER} = 0.00272522$$

The program code then multiplies MER and the number of followers to determine Predicted Engagement from this equation ($PE_4$):

$$PE_4 = \text{MER} \times F$$

$$PE_4 = 0.00272522 \times 1412$$

$$PE_4 = 3.8480106$$

If the program code rounds $PE_4$ to the nearest whole number, the equation would predict that the proposed post will obtain a total of 4 likes, shares, comments, etc. when posted on Facebook. The program code could then compare this result to the previously selected Final Predicted Engagement from the "n" number of equations and select the lesser of the two predictions, such that:

$$PE_4 < FPE \rightarrow FPE_2 = PE$$

where:

FPE equals Final Predicted Engagement from the "n" number of equations; and $FPE_2$ equals updated Final Predicted Engagement.

In this instance, Final Predicted Engagement from the "n" number of equations was 6 likes, shares, comments, etc., compared to the result of $PE_4$, which predicts 4 likes, shares, comments, etc. The program code could therefore select the lesser of the two predictions and assign the value from $PE_4$ of 4 to Final Predicted Engagement.

Figure 21:
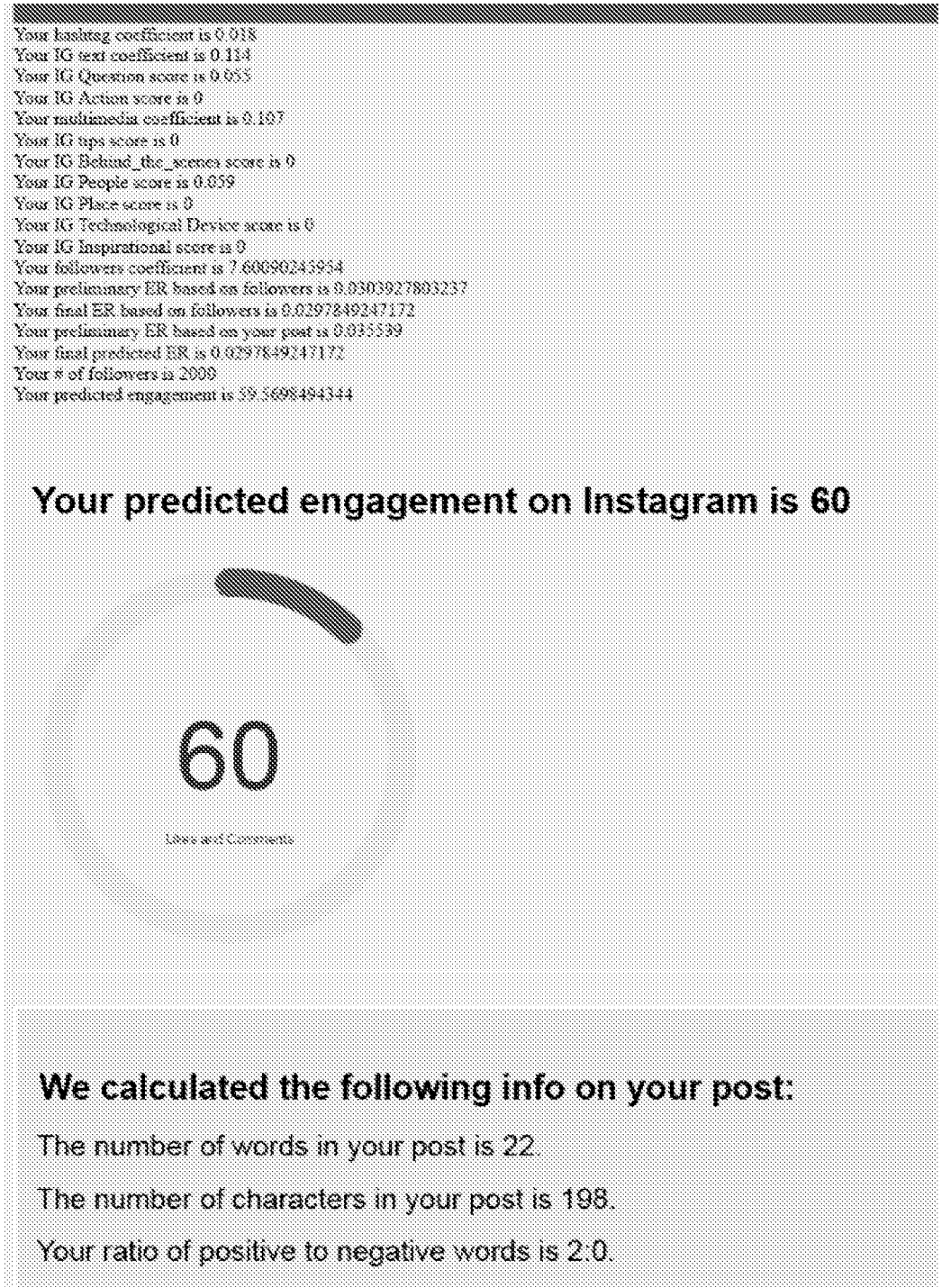
FIGS. 21-23 are example of a graphical user interface displaying various aspects of some embodiments of the present invention.
Figure 22:
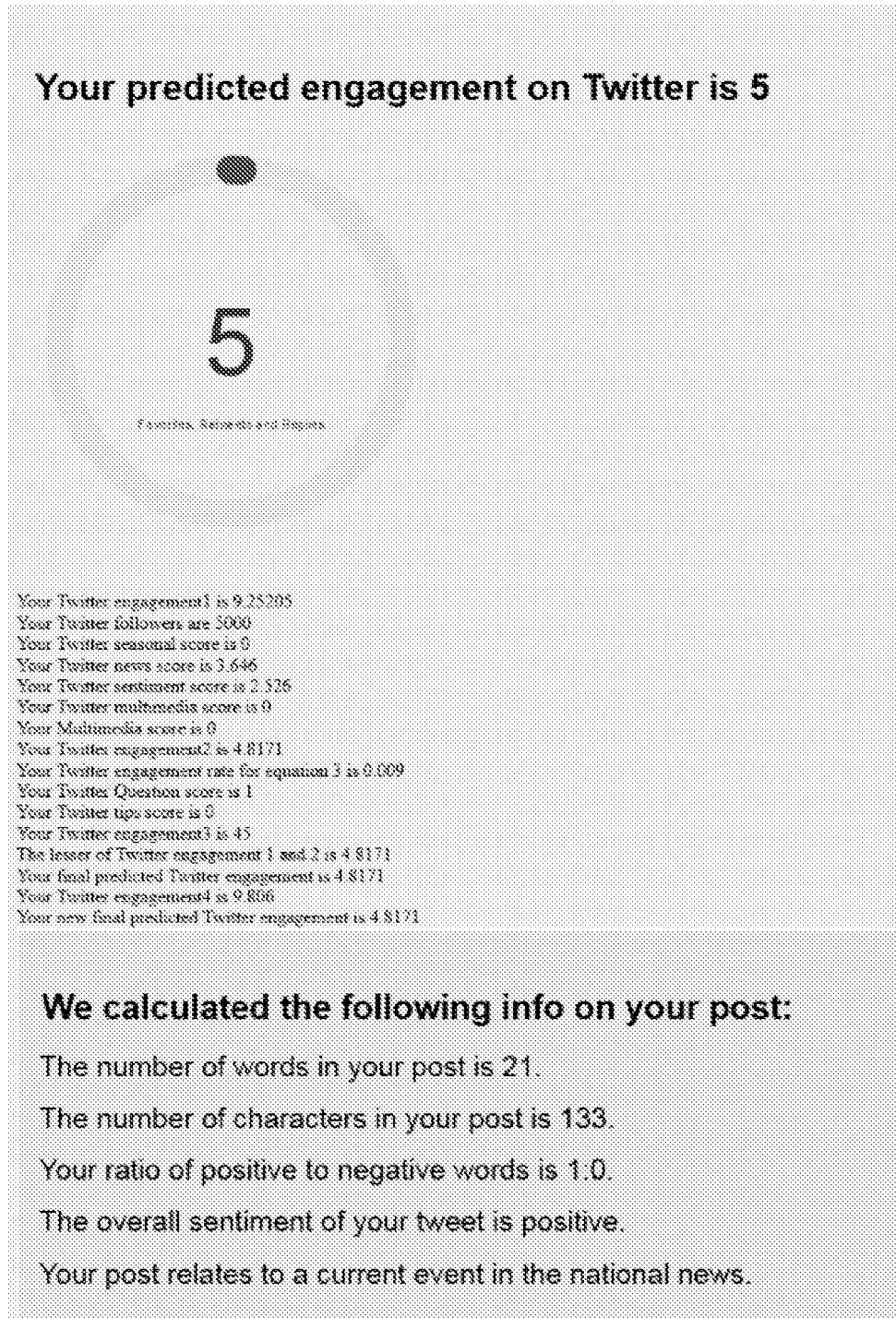
Figure 23:
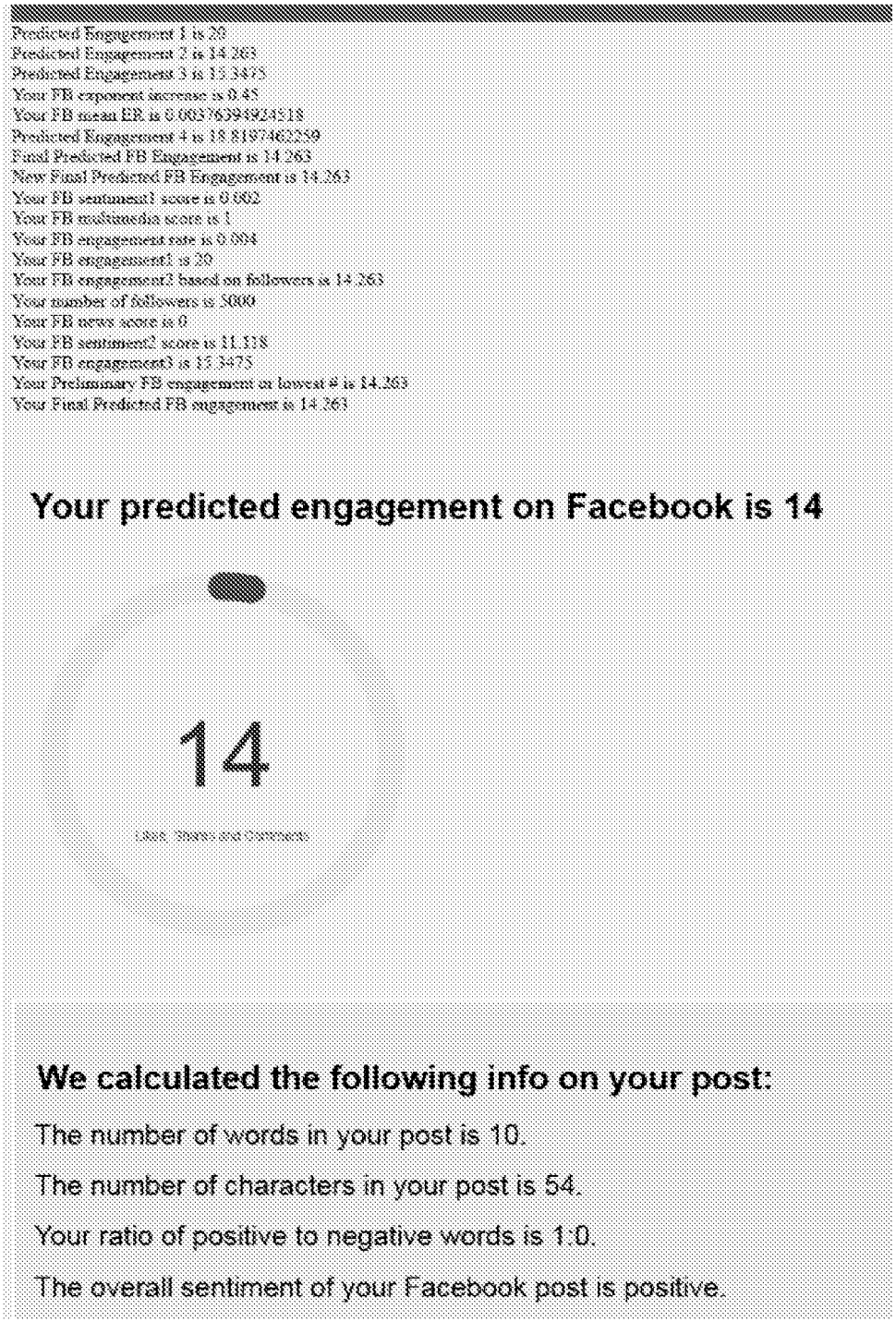

Examples of how the invention might output or display information to the end user with intermediate calculations specific to certain social media platforms are shown in FIG. 21 (Instagram), FIG. 22 (Twitter) and FIG. 23 (Facebook).

The application, encompassing a system of computer hardware such as a processor, keyboard or keypad, computer mouse or mousepad, a series of databases which reside on a computer or web server, a software application or programming code that executes instructions for implementing the invention, can be trained to predict engagement, or level of engagement, and to provide recommendations for increasing engagement on a proposed social media post using a supervised, unsupervised or reinforcement machine learning algorithm. In each such machine learning embodiment of the invention, when a new user enters data and content into the application interface for a proposed post on a given social media outlet, the system will use such supervised, unsupervised or reinforcement machine learning technique to predict engagement, or level of engagement and/or to provide recommendations to the end user on how to increase engagement for a proposed post.

Figure 29:
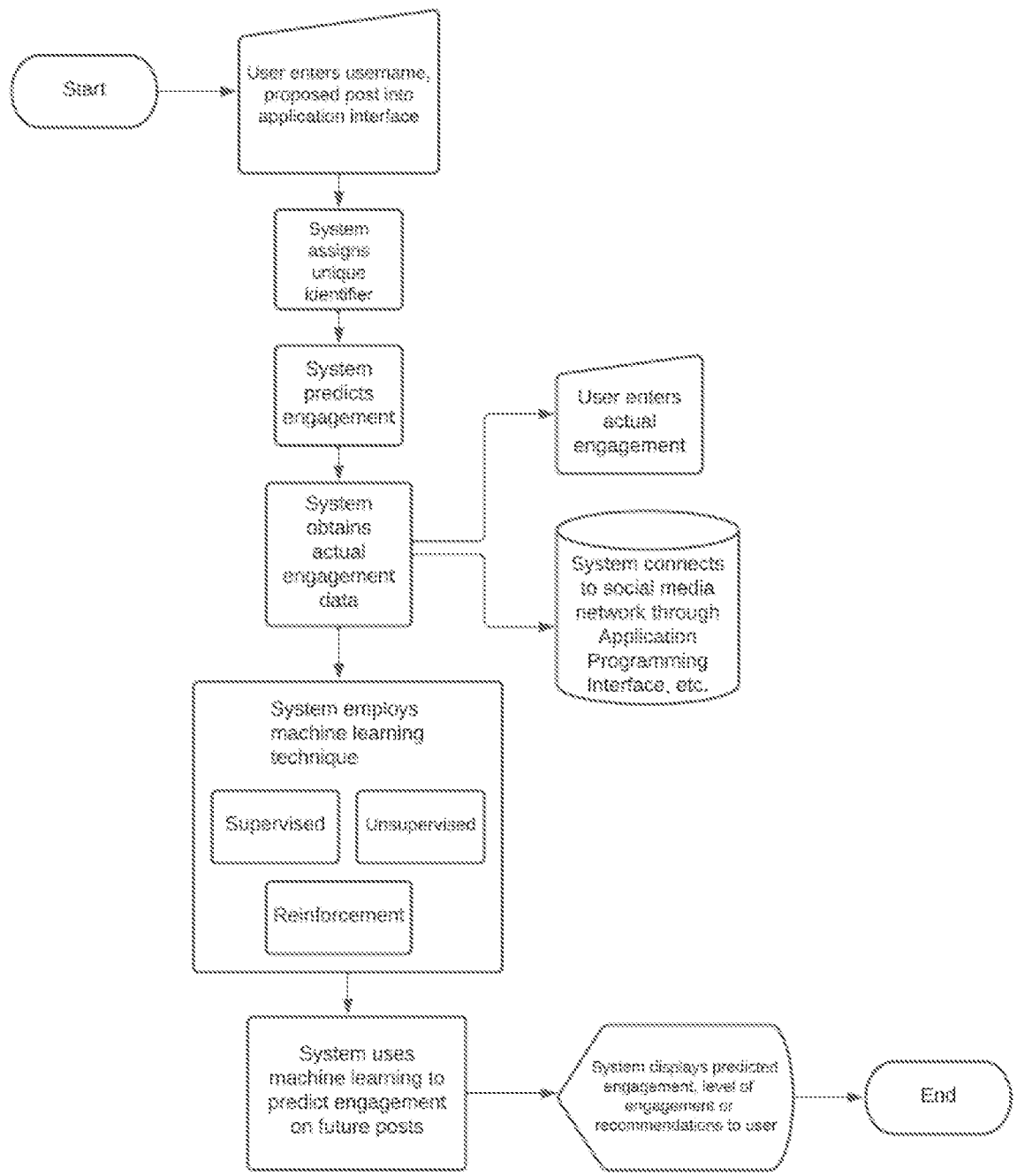
FIG. 29 is a workflow that depicts various aspects of some embodiments of the present invention.
Figure 30:
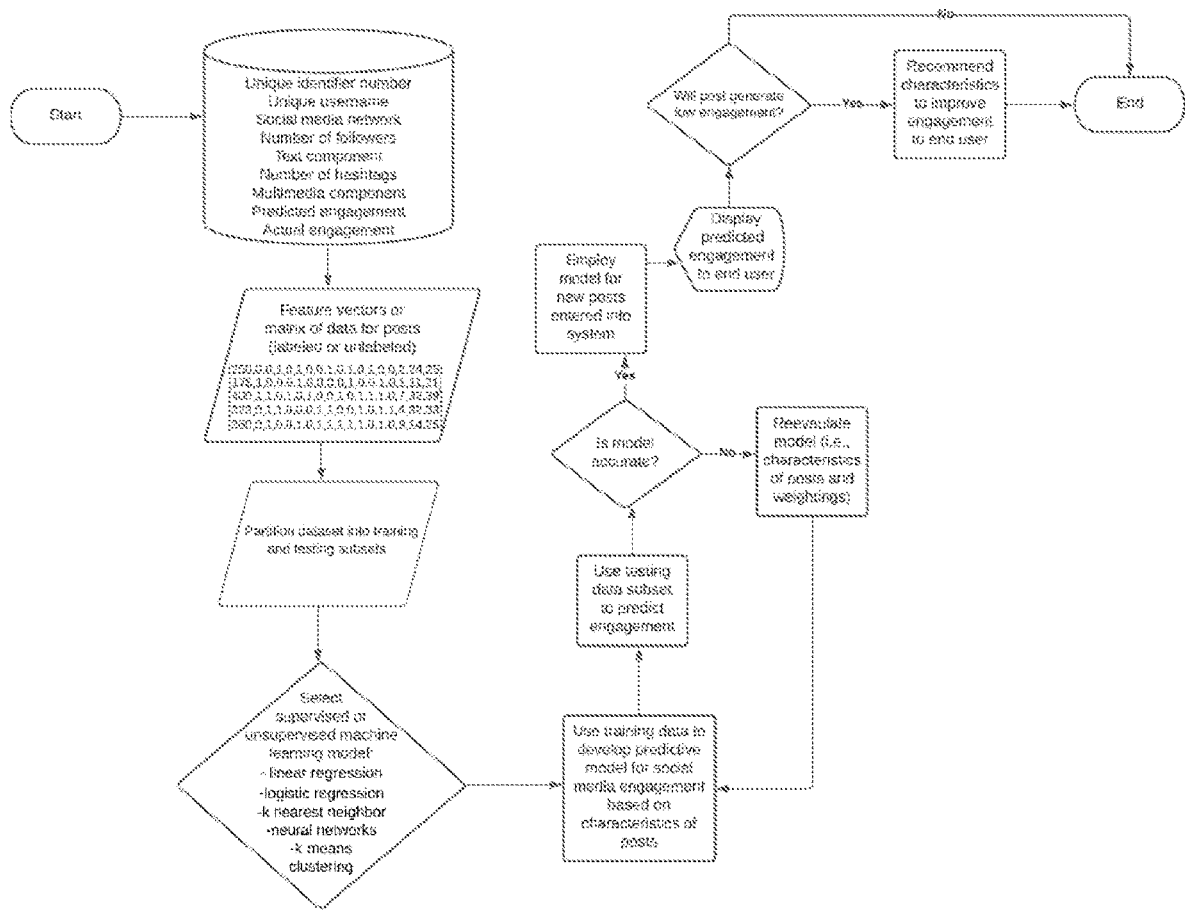
FIG. 30 is a workflow that depicts various aspects of some embodiments of the present invention.

To apply machine learning techniques to the invention, the computer system can learn how to predict engagement on various social media outlets based on a set of training data, or data that has been input into the system in the past, such as a pre-existing dataset of Instagram posts, tweets (Twitter posts), Facebook posts, or posts on other social media networks (FIG. 29, FIG. 30). For example, when a user enters the social media outlet, the number of followers, the text component of the proposed post, including the number of hashtags, and the multimedia component into the application interface, the system will render a predicted engagement for the post, expressed as a whole number. In one embodiment, the system application can include an interface or mechanism for allowing the end user to input ACTUAL ENGAGEMENT on a post after the user has posted the content on a social media outlet. Such a system would save each instance of a predicted engagement for a proposed post, including the social media outlet, the number of followers, the text characteristics, including the number of hashtags, and the multimedia characteristics of the post in a datastore as the user enters the information into the system application interface. The system would record the unique username associated with each account and assign a unique identifier number to each instance of a proposed post and its associated data or "variables" (i.e., social media outlet, number of followers, text characteristics, number of hashtags, multimedia characteristics, predicted engagement, etc.) from that account. Such a system would include a separate interface wherein for all posts published on a social media outlet, the user can return after a set time period, such as one month or six months, enter the username and the unique identifier number associated with a post and then enter the actual engagement received by that post on the social media platform identified at the time the predicted engagement was generated. Alternatively, the system can interact with a social media outlet such as Facebook, Instagram, Twitter and the like through an Application Programming Interface or similar type of interface that would allow the system to communicate with an external software or hardware component, in order to obtain actual engagement data for a post once it has been published on that outlet. Such actual engagement data will populate a field in the database. Thus, for each post entered into the application, the dataset will include the username, unique identifier, the social media outlet, the number of followers on the account, the characteristics of the text component, including the number of hashtags, the characteristics of the multimedia component, the predicted engagement, and the ACTUAL ENGAGEMENT, defined as the number of interactions such as "liking", "sharing", "replying," "commenting", "retweeting", "reposting", "favoriting" or other similar action received by each post after it had been published on the social media outlet for a set period of time such as one week, two weeks, one month or six months, etc. Over time, hundreds of thousands of posts could accumulate in the database.

Supervised Learning

In one embodiment of the invention, using a supervised learning model such as regression or classification, including such algorithms as linear regression, logistic regression, k nearest neighbor and the like, the system would include a dataset of training data composed of historical or previously published posts. In this embodiment, each instance of a social media post in the training data would be represented as a feature vector or included in a matrix wherein the number of FOLLOWERS can be represented either as an integer, as scaled or standardized data such as z-scores, or as a binary number indicating a "high" or "low" number of followers based on a set cutoff point. The presence or absence of each of the text characteristics, SIMPLICITY, SENTIMENT, QUESTION, TIPS, CALL TO ACTION, LINK, NEWS, and SEASONAL, etc., and each of the multimedia characteristics, PEOPLE, IDENTIFIABLE PLACES or LANDMARKS, TECHNOLOGICAL DEVICES, POSITIVE or INSPIRATIONAL MESSAGES, TIPS, and BEHIND-THE-SCENES ACTIVITIES and the like, can be represented with a binary value such as 1 or 0, where "1" represents the presence of a characteristic and "0" indicates the absence of such characteristic. The number of HASHTAGS, a subcomponent of the text component, can be represented either as an integer, as scaled or standardized data such as z-scores, or as a binary number indicating either the presence or absence of hashtags or a "high" or "low" number of hashtags based on a set cutoff point for determining high and low, respectively. The PREDICTED ENGAGEMENT generated by the application can be represented by either an integer, as scaled or standardized data such as z-scores and the like. The ACTUAL ENGAGEMENT for each published post in the dataset can be represented by an integer or as scaled or standardized data such as z-scores and the like. A subset of the training data can be excluded from the initial analysis and used as testing data to evaluate and refine the model's predictive power.

In one embodiment of a supervised machine learning model, the system might use a linear regression model to predict engagement on a proposed social media post based on the independent variables (i.e., the number of followers, the text characteristics, the number of hashtags, the multimedia characteristics, etc.) identified for each proposed post in the training data. In this embodiment, such training data might take the form of a matrix of proposed posts as shown below, where for each post, the number of followers is expressed as an integer, the presence or absence of each text characteristic and each multimedia characteristic is represented by a binary number (0 or 1), the number of hashtags is expressed as an integer, the predicted engagement and the actual engagement are expressed as integers:

TABLE 10

Sample matrix for posts in the training dataset

| 250 | 0 | 0 | 1 | 0 | 1 | 0 | 0 | 1 | 1 | 0 | 1 | 0 | 0 | 1 | 2 | 24 | 25 |
|---|---|---|---|---|---|---|---|---|---|---|---|---|---|---|---|---|---|
| 175 | 1 | 1 | 0 | 1 | 0 | 0 | 0 | 1 | 0 | 1 | 0 | 0 | 0 | 0 | 1 | 11 | 21 |
| 400 | 0 | 1 | 1 | 0 | 1 | 0 | 0 | 0 | 1 | 0 | 0 | 1 | 0 | 0 | 7 | 32 | 39 |
| 323 | 0 | 1 | 0 | 0 | 1 | 1 | 1 | 0 | 0 | 0 | 1 | 0 | 1 | 0 | 4 | 32 | 33 |
| 360 | 1 | 0 | 1 | 0 | 0 | 1 | 0 | 0 | 1 | 1 | 0 | 1 | 0 | 1 | 9 | 14 | 25 |
| 450 | 0 | 0 | 0 | 0 | 1 | 0 | 0 | 1 | 0 | 0 | 1 | 0 | 0 | 0 | 3 | 43 | 41 |
| 560 | 0 | 1 | 0 | 0 | 0 | 0 | 1 | 0 | 0 | 1 | 0 | 0 | 1 | 1 | 2 | 29 | 47 |
| 141 | 0 | 0 | 1 | 1 | 0 | 1 | 0 | 0 | 1 | 0 | 1 | 0 | 0 | 0 | 11 | 18 | 9 |
| 693 | 1 | 0 | 1 | 0 | 1 | 0 | 0 | 0 | 1 | 0 | 1 | 1 | 0 | 1 | 4 | 39 | 41 |
| 424 | 0 | 1 | 0 | 0 | 1 | 1 | 0 | 0 | 0 | 1 | 0 | 0 | 1 | 0 | 7 | 18 | 18 |

In such a linear regression model, using the training data, the system can use actual engagement as the dependent variable and assign a positive or negative weight to each of the independent variables (i.e., the characteristics and features of the post), where such value corresponds to how much the variable contributes to, or is associated with, actual engagement on a particular social media outlet. The system can then apply such model to a subset of the training data, i.e., the testing data, to produce a predicted engagement value for each instance of a proposed post in the testing dataset. The system can then compare the value for predicted engagement to the value for actual engagement to determine whether the predicted engagement is the same as the actual engagement, or to indicate if the predicted engagement is within a set percentage of actual engagement, based on a predetermined accuracy threshold. For example, we may classify an accurate prediction as when the predicted engagement for a proposed social media post in the training data is exactly the same as the actual engagement such post received when published on the social media outlet, rounded to the nearest whole number. Alternatively, we may set a predetermined threshold for determining if the predicted engagement is accurate. For example, we may set the predetermined accuracy threshold as any instance where the whole number for the predicted engagement for a post in the testing dataset is within two percent of the whole number for the actual engagement such post received after it was published on a social media outlet. For example, in the training data, based on the model, if the system predicts engagement for a proposed post on Facebook as "300" likes, shares, comments, etc. (rounded to the nearest whole number) and the actual engagement for the published post was "305" likes, shares, comments, etc. (rounded to the nearest whole number), then the system could classify the predicted engagement for that post as accurate. Similarly, the system could classify any post where the rounded whole number for predicted engagement is not within two percent of the rounded whole number for actual engagement, as inaccurate. In such manner, the system can learn which of the characteristics and features (i.e., independent variables) of a social media post contribute to an accurate prediction of engagement and how such variables should be weighted in the determination of predicted engagement. Thus, in this manner, the system can use the training and testing data to develop an accurate model to predict engagement for a proposed post on a specific social media outlet. In such a linear regression machine learning model, for each new proposed post entered into the application interface by the user, the system can generate a numerical value for predicted engagement based on the appropriate variables, combination of variables and variable weightings that contribute to an accurate prediction. The system would then output a predicted engagement, expressed as a whole number, to the end user.

In another embodiment of machine learning, the system can use logistic regression to learn how to classify whether a predict engagement on a proposed social media post is accurate based on a predetermined probability for determining accuracy. In this embodiment, each instance of a proposed post in the training dataset can be expressed as a feature vector containing the text and multimedia characteristics, etc. of the proposed post and paired with a corresponding outcome or label vector such as "accurate" or "inaccurate" based on a preset definition of accuracy. For example, we can define an accurate instance of predicted engagement as one where the predicted engagement is exactly the same as the actual engagement generated by that post after it was published on the target social media outlet. Or, we may define a prediction as accurate if the predicted engagement is within a set percentage, such as one percent, two percent, etc., of actual engagement, rounded to the nearest whole number. Thus, for each feature vector associated with a published post in the training data, we can assign an outcome or label vector that indicates whether the predicted engagement for that post was accurate or inaccurate based on our criteria for determining accuracy. Such a pairing of feature vectors with associated outcomes is illustrated below, where the system classifies a post as accurate if the predicted engagement is within five percent of actual engagement:

TABLE 11

Sample feature vectors and associated outcomes

Post 1 [250, 0, 0, 1, 0, 1, 0, 0, 1, 0, 1, 0, 1, 0, 0, 2, 24, 25]: Accurate
Post 2 [175, 1, 0, 0, 1, 0, 0, 0, 0, 1, 0, 0, 1, 0, 1, 11, 21]: Inaccurate
Post 3 [400, 1, 1, 0, 1, 0, 1, 0, 0, 1, 0, 1, 1, 1, 0, 7, 32, 39]: Inaccurate
Post 4 [323, 0, 1, 1, 0, 0, 0, 1, 1, 0, 0, 1, 0, 1, 1, 4, 32, 33]: Inaccurate
Post 5 [360, 0, 1, 0, 0, 1, 0, 1, 1, 1, 1, 1, 0, 1, 0, 9, 14, 25]: Inaccurate
Post 6 [450, 1, 1, 0, 0, 1, 1, 1, 1, 0, 0, 0, 1, 1, 0, 3, 43, 41]: Accurate
Post 7 [560, 1, 0, 1, 1, 1, 0, 0, 0, 1, 1, 0, 0, 0, 1, 2, 29, 47]: Inaccurate
Post 8 [141, 1, 1, 0, 0, 0, 0, 1, 1, 0, 0, 0, 1, 1, 0, 11, 18, 9]: Inaccurate
Post 9 [693, 0, 0, 0, 1, 1, 0, 0, 0, 1, 0, 1, 1, 0, 0, 4, 39, 41]: Accurate
Post 10 [424, 0, 1, 1, 1, 0, 1, 0, 1, 0, 0, 0, 0, 1, 1, 7, 18, 18]: Inaccurate Using a logistic regression machine learning model, the system can set the outcome as a binary dependent variable where "1" indicates an accurate prediction and "0" indicates an inaccurate prediction. Using the training data, the system can then assign a positive or negative weight to each of the independent variables (i.e., the characteristics and features of the post), where such value corresponds to how much the variable contributes to, or is associated with, actual engagement on a particular social media outlet. The system can then apply such model to the subset of testing data and, based on the presence or absence of various characteristics in a post, estimate the probability that a predicted engagement is accurate. In this embodiment, we can set a predetermined probability threshold, such as 0.5, such that any post in the subset of testing data where the probability of such post being accurate is equal to or greater than 0.5, or 50 percent, can be deemed "accurate" and any post where the probability of such post being accurate is below the 0.5 threshold can be deemed "inaccurate." The system can train on this dataset and adjust the features and characteristics, the combinations of features and characteristics, and/or the numerical weightings of the features and characteristics in the model to determine which features, characteristics, weightings, etc. increase the probability that a prediction is accurate on each of the various social media networks for each unique username. In this manner, the system can apply such machine learning to future posts entered into the application interface to increase the likelihood that the output provided to the end user is accurate.

In another embodiment of machine learning, the system might use logistic regression to classify a proposed social media post based on whether the post is expected to generate high engagement or low engagement. In this embodiment, for each unique username contained in the dataset, the system could define or classify a post as "high engagement" if the whole number for actual engagement on that published post is equal to or greater than the product of the mean engagement rate for that username on the target social media platform and the number of followers on that platform entered into the application interface by the user at the time the post was created. The system could define or classify a post as "low engagement" if the whole number for predicted engagement is less than the product of the mean engagement rate for that username on the intended social media platform and the number of followers on that platform entered into the application by the user at the time the post was created.

In this embodiment, the system can determine the MEAN ENGAGEMENT RATE on each social media network for each unique username in the dataset. The mean engagement rate can be represented in the dataset by a decimal such as, 0.01, 0.02, 0.001, etc. In such supervised learning system, in the training data we can pair up the feature vectors for each instance of a proposed post, including the number of followers, the characteristics of the text component, the characteristics of the multimedia component, the number of hashtags, the predicted engagement, the actual engagement, and the mean engagement rate on that social media network for the unique username associated with the proposed post, with a corresponding outcome, or label vector indicating whether the post, when published, generated "high engagement" or "low engagement" based on the definition of high and low engagement. Such a pairing of feature vectors and associated outcome or label vectors might take the following form:

| Post A | [149, 0, 0, 1, 0, 1, 0, 0, 1, 0, 1, 0, 1, 0, 0, 2, 3, 5, .030]: High Engagement |
| Post B | [600, 0, 1, 1, 0, 0, 0, 1, 1, 0, 0, 1, 0, 1, 1, 4, 6, 9, .010]: High Engagement |
| Post C | [250, 1, 1, 0, 0, 1, 1, 1, 1, 0, 0, 0, 1, 1, 0, 3, 1, 3, .021]: Low Engagement |

In such a logistic regression model, using labeled training data, for each unique username in the database, the system could identify the features or characteristics of posts that generate various levels of engagement on a social media network based on the actual engagement received by previously published posts in the dataset. The system could then apply such model to the subset of testing data to classify posts as high and low engagement, respectively, and compare such classifications to the actual engagement to determine if the system classified the level of engagement on such posts correctly. For each user, the system could then adjust the features and characteristics of posts with high and low engagement on the various social media networks. In this manner, the system can learn to determine, for each user, the probability that a new, proposed post entered into the application interface will generate high or low engagement. We can pre-set a threshold for determining the probability that a post is classified correctly as high engagement such that any instance where the probability of a proposed post generating high engagement is equal to greater than 0.5 is deemed "high engagement" and any instance where the probability of a post generating high engagement is below the threshold probability level of 0.5 is deemed "low engagement." For each new post entered into the application interface, the system can output a predicted level of engagement to the end user, in the form of "high engagement" or "low engagement" on the social media outlet on which the post will be published. In addition, the system can learn the characteristics or features of posts that result in high engagement on a respective social media network for that unique username and make recommendations to the end user on how to increase engagement. In some embodiments of the present invention, the program code automatically implements the suggestions into the posts. In some embodiments of the present invention, the program code, via a GUI, enables a user to select which suggestions to implement, and based on the user selections, implements the suggestions. Thus, the program code can automatically edit existing posts and/or generate new posts and post these posts with the implemented suggestions.

In another embodiment, using a supervised machine learning algorithm such as k-nearest neighbor, the system can identify posts that are expected to generate high engagement versus posts that are expected to generate low engagement on a particular social media network. In this embodiment, we can assign labels to each of the feature vectors in the training dataset based on whether such feature vector is associated with "high engagement" or "low engagement" on a given social media network. Within the dataset, the system can set aside a subset of testing data. The system could then classify the feature vectors in the subset of testing data into either the high engagement or the low engagement category based on similarities in the characteristics of the posts. The system would determine similarities in posts using a measure of distance between feature vectors such as Manhattan Distance, Euclidean Distance, or the like, and then classify or assign a label of "high engagement" or "low engagement" to the feature vector representing the proposed post based on the shortest distance of the proposed post to the "k" number of nearest neighbors, or the highest number of the k nearest neighbors, (where k equals a positive integer) in the dataset. We can use a confusion matrix to evaluate the system's accuracy in classifying groups in the testing data to a desired level of sensitivity and specificity, such that the predictive model minimizes the number of false negative results—i.e., the number of predictions that are incorrectly or falsely classified as inaccurate, as well as the number of posts that are incorrectly or falsely classified as low engagement (sensitivity); and minimizes the number of false positive results—i.e., classifying a prediction as accurate when it is inaccurate, or classifying a post as high engagement when it is low engagement (specificity). In this manner, for each new proposed post entered into the application by a user for a particular social media network, the system can use a type of distance measure identified above to classify the proposed post into an engagement group based on the k nearest neighbors, or the highest number of the k nearest neighbors. If the system classifies a proposed post as high engagement, the system can provide output to the user indicating that the post is expected to result in high engagement.

In some supervised machine learning embodiments, the system can identify the combinations of, or patterns in, the dataset consisting of the number of followers, the text characteristics, the number of hashtags, the multimedia characteristics and the like, that predict level of engagement, or are most important in predicting level of engagement. The predictive value of such data might differ greatly based on the social media platform. For example, the variables that most accurately predict engagement on Instagram may be different than the variables that most accurately predict engagement on Twitter. Moreover, as the characteristics of the content of social media posts change over time, and as social media platforms adjust or change the factors in their algorithms that determine which content is displayed to users, the system can learn and adapt to these changes based on the classifications of predicted engagement into the categories of "accurate" or "inaccurate", "high engagement" or "low engagement" and the like. The system can then identify changing or new characteristics or variables to predict engagement accurately, or level of engagement. In such manner, the computer system can be taught to adjust predicted engagement based on the changing nature of the post characteristics that generate engagement on various social media platforms. The system can then apply these new characteristics of social media engagement to new data entered into the application interface by the user when predicting engagement for a proposed social media post.

In another embodiment, for each social media outlet, the system can apply an unsupervised learning model such as k-means clustering to group posts into clusters based on the characteristics and features of posts in the training data. For example, the system could attempt to learn which characteristics of a Facebook post correspond to different levels of engagement in order to predict the level of engagement for a new post entered into the system. In this embodiment, the system can include a dataset consisting of unlabeled feature vectors, meaning such feature vectors include all of the characteristics of a series of Facebook posts, including the number of followers, the text characteristics, the multimedia characteristics, etc., as well as the actual engagement each post received when published on Facebook, but the feature vectors have no corresponding label that indicates whether the post received high engagement, low engagement, etc. In this embodiment, we can select the optimum number of clusters ("k") to group the dataset into based on a scatterplot of the data, the Elbow method, or a like process. Using a k-means clustering algorithm, the system could assign each feature vector in the data into one of the k number of clusters. The grouping would be based on the distance of each feature vector from the cluster centroid, with each feature vector being assigned to the closest centroid as determined by some measure of distance such as Manhattan Distance, Euclidean Distance, or a like method. The system could go through several iterations of recalculating and reassigning data to the k number of clusters based on distance from the cluster centroids until the system has converged on a final cluster grouping. In this manner, the system can seek to identify the qualities and characteristics of Facebook posts with various levels of engagement. Thus, when a user enters a new, proposed post into the application interface, the system can determine the appropriate cluster for that post using a k-means learning algorithm and output to the user a predicted level of engagement, such as high engagement or low engagement, for the proposed post as well as recommendations on how to increase engagement.

In addition to the methods identified above, there are many other machine learning embodiments, such as neural networks and reinforcement learning models, which the system can employ to predict engagement, level of engagement or to make recommendations on how to increase engagement on a proposed social media post.

Figure 24:
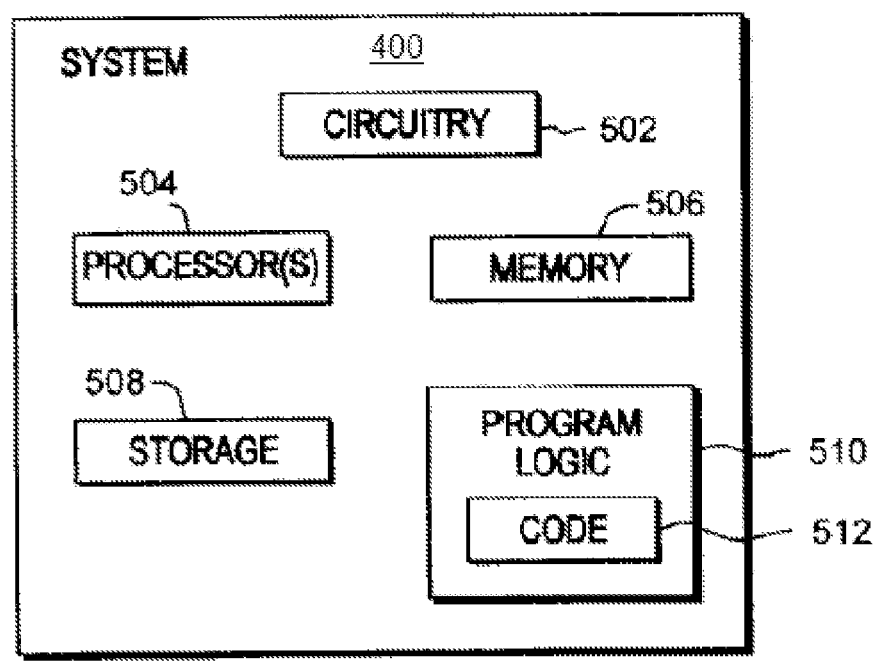
FIG. 24 depicts a computing node that can be utilized in some embodiments of the present invention and can be part of a cloud computing environment utilized in various aspects of the present invention.

FIG. 24 illustrates a block diagram of a resource 400 in computer system, such as, which is part of the technical architecture of certain embodiments of the technique. Returning to FIG. 24, the resource 400 may include a circuitry 502 that may in certain embodiments include a microprocessor 504. The computer system 400 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 24 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Figure 25:
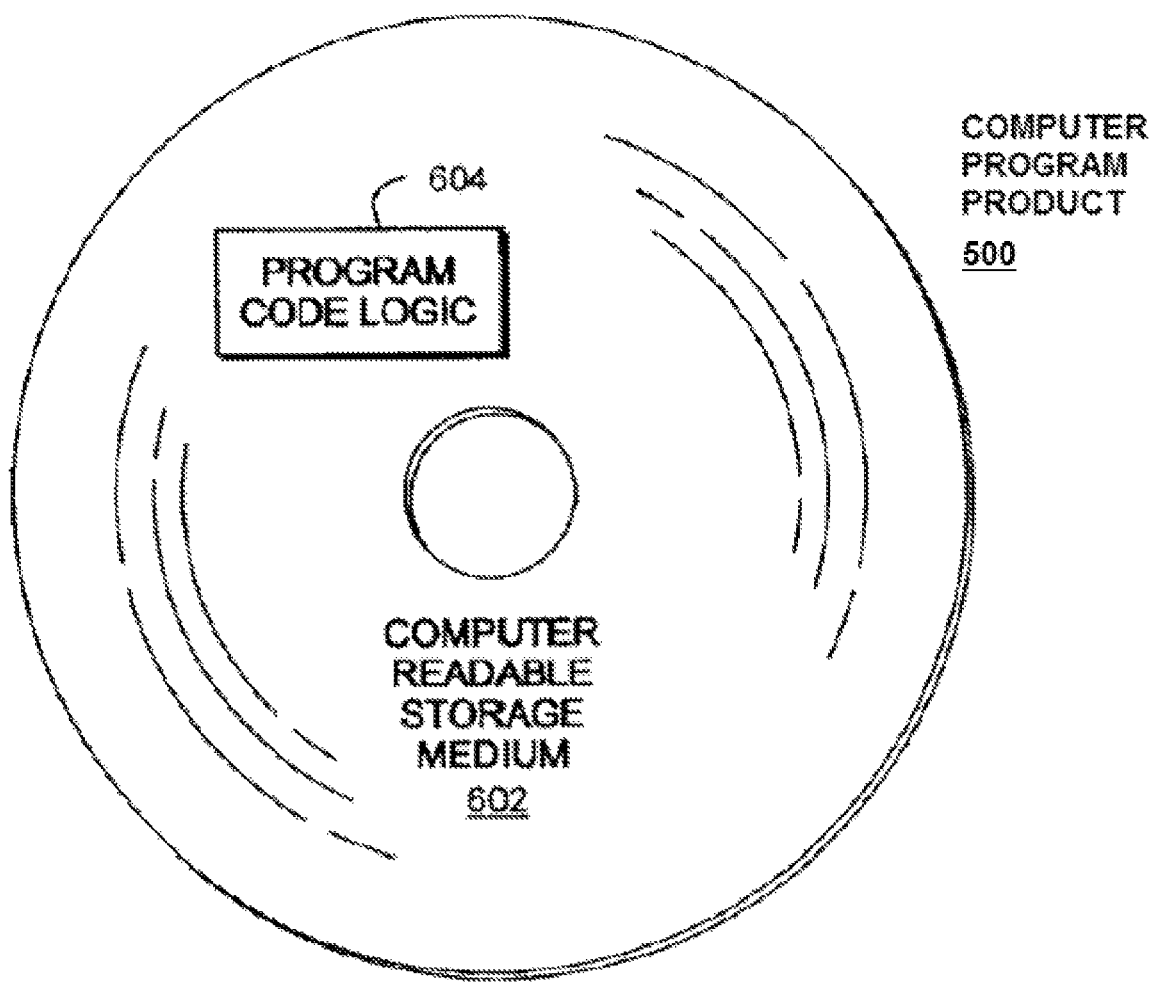
FIG. 25 depicts a computer program product that can be utilized to practice various aspects of some embodiments of the present invention.

Using the processing resources of a resource 400 to execute software, computer-readable code or instructions, does not limit where this code can be stored. Referring to FIG. 25, in one example, a computer program product 500 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages, as well as functional programming languages and languages for technical computing (e.g., Python, Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code can be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A computer-implemented method, comprising:
   training, by the one or more processors, a predictive model to determine whether predicted engagement with the proposed social media post is at a desired engagement rate, wherein an engagement rate comprises a quotient of engagement divided by number of followers;
   obtaining, by one or more processors, via a user interface, from a user, a proposed social media post, the proposed social media post comprising:
   text; and
   a number of hashtags;
   applying, by the one or more processors, the predictive model to the proposed social media post to determine whether predicted engagement with the proposed social media post is at the desired engagement rate, the predicting comprising:
     determining, by the one or more processors, if the proposed social media post comprises qualities contributing to engagement with posts on social media, wherein the qualities comprise textual qualities, wherein the textual qualities include simplicity, and readability, wherein the determining comprises:
       classifying, by the one or more processors, the text as simple if a word count or a character count of the text is below a pre-determined threshold; and
       classifying, by the one or more processors, the text as readable if based on applying a reading-level scale to the text to assess a reading level for the text the text is assessed to be at or below a pre-configured readability level;
     determining, by the one or more processors, if the sentiment of the text is positive, wherein the determining if the sentiment of the text is positive comprises:
       identifying and extracting, by the one or more processors, from the text positive words and negative words;
       comparing, by the one or more processors, based on the extracting, a number of the positive words in the text to a number of the negative words in the text; and
       determining, based on the comparing, that the sentiment is positive if the number of positive words in the text is greater than the number of negative words in the text;

determining, by the one or more processors, that the proposed social media post is not at the desired engagement rate, comprising:
  determining the proposed social media post does not comprise the qualities or that the sentiment is not positive; and
  automatically recommending, by the one or more processors, via the interface, that the user implement changes to the proposed social media post;
determining, by the one or more processors, that the proposed social media post is within the desired engagement rate and updating the predictive model, the determining and updating comprising:
  determining the proposed social media post comprises a configured amount and selection of the qualities and that the sentiment is positive;
  posting, by the one or more processors, the proposed social media post to the social media, wherein based on the posting the proposed social media post is a social media post;
  monitoring, by the one or more processors, actual engagement with the social media post to determine the actual engagement rate;
  comparing, by the one or more processors, the actual engagement rate with the desired engagement rate; and
  tuning, by the one or more processors, the predictive model based on the comparing;
updating, by the one or more processors, a database comprising social media posts with the social media post and the actual engagement rate; and
training, by the one or more processors, the predictive model to determine if the number of hashtags of the proposed social media post increases the engagement rate of the proposed social media post a designated percentage, wherein the training comprises:
  accessing, by the one or more processors, the database comprising social media posts with associated engagement rates;
  calculating, by the one or more processors, mean engagement rates associated with various numbers of hashtags;
  determining, by the one or more processors, based on the mean engagement rates, a specific number of hashtags at which the engagement rate with a given social media post of the social media posts, increases the designated percentage;
  updating, by the one or more processors, the predictive model with the specific number of the hashtags, where the specific number of the hashtags comprises a baseline number of hashtags to increase the engagement rate the designated percentage; and
  determining, by the one or more processors, whether to increase the number of hashtags of the proposed social media post by applying the updated trained predictive model.

2. The computer-implemented method of claim 1, wherein the configured amount and selection of the qualities is configured based on the social media platform.

3. The computer-implemented method of claim 1, wherein the proposed social media post further comprises a multimedia element, and wherein the qualities further comprise multimedia qualities, and wherein determining if the proposed social media post comprises the qualities further comprises:
  performing, by the one or more processors, a multiple linear regression analysis on the multimedia element to determine a predicted level of engagement for the multimedia element.

4. The computer-implemented method of claim 3, wherein the multiple linear regression analysis comprises:
  identifying, by the one or more processors, one or more aspects in the multimedia element selected from the group consisting of: a person, an identifiable place, a landmark, a technological device, a positive or inspirational message, a tip, a behind-the-scenes activity; and
  weighting, by the one or more processors, a value representing a predicted level of engagement for the multimedia element based on the identifying.

5. The computer-implemented method of claim 4, further comprising:
  determining, by the one or more processors, if the predicted level of engagement for the multimedia element is above a pre-determined threshold, based on the weighted value.

6. The computer-implemented method of claim 1, wherein the designated percentage is based on measuring a significant difference in utilizing a statistical test.

7. The computer-implemented method of claim 1, wherein the proposed social media post further comprises one or more hashtags, and wherein the qualities further comprise hashtag qualities, and wherein determining if the proposed social media post comprises the qualities further comprises:
  determining, by the one or more processors, if the proposed social media post comprises the hashtag qualities, wherein the determining comprises:
    determining, by the one or more processors, if the proposed social media post comprises the baseline number of hashtags.

8. The computer-implemented method of claim 1, further comprising:
  accessing, by the one or more processors, a profile of the user on a social media platform, wherein the social media platform is an intended target platform for the proposed social media post;
  obtaining, by the one or more processors, a number of user profiles linked to the user profile;
  analyzing, by the one or more processors, historical posts of the user on the social media platform to determine an average percentage of the user profiles who see each post; and
  determining, by the one or more processors, based on the posting, if the social media post is seen by more than the average percentage of the user profiles.

9. The computer-implemented method of claim 1, wherein the qualities contributing to engagement with posts on social media are selected from the group consisting of: a seasonal component, a provision of tips or advice in a specific content area, a hyperlink, a posing of a question, a call-to-action, and a connection to a current news item.

10. The computer-implemented method of claim 1, further comprising:
  determining, by the one or more processors, if the qualities comprising the configured amount and selection of the qualities are correlated with each other; and
  based on determining that the qualities are correlated with each other, increasing a probability of attaining the desired engagement rate with the proposed social media post.

11. The computer-implemented method of claim 1, wherein the automatically recommending comprises:
  cognitively analyzing, by the one or more processors, the proposed social media post to identify one or more quality of the qualities missing from the proposed social media post;
  recommending, by the one or more processors, via the user interface, adding the identified one or more quality to the proposed social media post.

12. The computer-implemented method of claim 11, wherein the recommending comprises:
  generating, by the one or more processors, content comprising the one or more quality; and
  displaying, by the one or more processors, the content to the user via the user interface.

13. The computer-implemented of claim 12, further comprising:
  obtaining, by the one or more processors, an input via the user interface; and
  automatically implementing, by the one or more processors, the content in the proposed social media post, based on the obtaining.

14. The computer-implemented method of claim 1, wherein determining the proposed social media post does not comprise the qualities or that the sentiment is not positive comprises performing, by the one or more processors, a multiple linear regression analysis to determine the predicted level of engagement for the proposed social media post.

15. The computer-implemented method of claim 1, wherein determining the proposed social media post does comprises the qualities or that the sentiment is not positive comprises performing, by the one or more processors, a multiple linear regression analysis to determine the predicted level of engagement for the proposed social media post.

16. A computer program product comprising:
  a non-transitory computer readable storage medium readable by one or more processors and storing instructions for execution by the one or more processors for performing a method comprising:
    training, by the one or more processors, a predictive model to determine whether predicted engagement with the proposed social media post is at a desired engagement rate wherein an engagement rate comprises a quotient of engagement divided by number of followers;
    obtaining, by one or more processors, via a user interface, from a user, a proposed social media post, the proposed social media post comprising:
      text; and
      a number of hashtags;
    applying, by the one or more processors, the predictive model to the proposed social media post to determine whether predicted engagement with the proposed social media post is at the desired engagement rate, the predicting comprising:
      determining, by the one or more processors, if the proposed social media post comprises qualities contributing to engagement with posts on social media, wherein the qualities comprise textual qualities, wherein the textual qualities include simplicity, and readability, wherein the determining comprises:
        classifying, by the one or more processors, the text as simple if a word count or a character count of the text is below a pre-determined threshold; and
        classifying, by the one or more processors, the text as readable if based on applying a reading-level scale to the text to assess a reading level for the text the text is assessed to be at or below a pre-configured readability level;
      determining, by the one or more processors, if the sentiment of the text is positive, wherein the determining if the sentiment of the text is positive comprises:
        identifying and extracting, by the one or more processors, from the text positive words and negative words;
        comparing, by the one or more processors, based on the extracting, a number of the positive words in the text to a number of the negative words in the text; and
        determining, based on the comparing, that the sentiment is positive if the number of positive words in the text is greater than the number of negative words in the text;
      determining, by the one or more processors, that the proposed social media post is not at the desired engagement rate, comprising:
        determining the proposed social media post does not comprise the qualities or that the sentiment is not positive; and
        automatically recommending, by the one or more processors, via the interface, that the user implement changes to the proposed social media post;
      determining, by the one or more processors, that the proposed social media post is within the desired engagement rate and updating the predictive model, the determining and updating comprising:
        determining the proposed social media post comprises a configured amount and selection of the qualities and that the sentiment is positive;
        posting, by the one or more processors, the proposed social media post to the social media, wherein based on the posting the proposed social media post is a social media post;
        monitoring, by the one or more processors, actual engagement with the social media post to determine the actual engagement rate;
        comparing, by the one or more processors, the actual engagement rate with the desired engagement rate; and
        tuning, by the one or more processors, the predictive model based on the comparing;
      updating, by the one or more processors, a database comprising social media posts with the social media post and the actual engagement rate; and
      training, by the one or more processors, the predictive model to determine if the number of hashtags of the proposed social media post increases the engagement rate of the proposed social media post a designated percentage, wherein the training comprises:
        accessing, by the one or more processors, the database comprising social media posts with associated engagement rates;

calculating, by the one or more processors, mean engagement rates associated with various numbers of hashtags;

determining, by the one or more processors, based on the mean engagement rates, a specific number of hashtags at which the engagement rate with a given social media post of the social media posts, increases the designated percentage;

updating, by the one or more processors, the predictive model with the specific number of the hashtags, where the specific number of the hashtags comprises a baseline number of hashtags to increase the engagement rate the designated percentage; and determining, by the one or more processors, whether to increase the number of hashtags of the proposed social media post by applying the updated trained predictive model.

17. A system comprising:

a memory;

one or more processors in communication with the memory;

program instructions executable by the one or more processors via the memory to perform a method, the method comprising:

training, by the one or more processors, a predictive model to determine whether predicted engagement with the proposed social media post is at a desired engagement rate wherein an engagement rate comprises a quotient of engagement divided by number of followers;

obtaining, by one or more processors, via a user interface, from a user, a proposed social media post, the proposed social media post comprising:

text; and a number of hashtags;

applying, by the one or more processors, the predictive model to the proposed social media post to determine whether predicted engagement with the proposed social media post is at the desired engagement rate , the predicting comprising:

determining, by the one or more processors, if the proposed social media post comprises qualities contributing to engagement with posts on social media, wherein the qualities comprise textual qualities, wherein the textual qualities include simplicity, and readability, wherein the determining comprises:

classifying, by the one or more processors, the text as simple if a word count or a character count of the text is below a pre-determined threshold; and classifying, by the one or more processors, the text as readable if based on applying a reading-level scale to the text to assess a reading level for the text the text is assessed to be at or below a pre-configured readability level;

determining, by the one or more processors, if the sentiment of the text is positive, wherein the determining if the sentiment of the text is positive comprises:

identifying and extracting, by the one or more processors, from the text positive words and negative words;

comparing, by the one or more processors, based on the extracting, a number of the positive words in the text to a number of the negative words in the text; and determining, based on the comparing, that the sentiment is positive if the number of positive words in the text is greater than the number of negative words in the text;

determining, by the one or more processors, that the proposed social media post is not at the desired engagement rate , comprising:

determining the proposed social media post does not comprise the qualities or that the sentiment is not positive; and automatically recommending, by the one or more processors, via the interface, that the user implement changes to the proposed social media post;

determining, by the one or more processors, that the proposed social media post is within the desired engagement rate and updating the predictive model, the determining and updating comprising:

determining the proposed social media post comprises a configured amount and selection of the qualities and that the sentiment is positive;

posting, by the one or more processors, the proposed social media post to the social media, wherein based on the posting the proposed social media post is a social media post;

monitoring, by the one or more processors, actual engagement with the social media post to determine the actual engagement rate;

comparing, by the one or more processors, the actual engagement rate with the desired engagement rate; and tuning, by the one or more processors, the predictive model based on the comparing;

updating, by the one or more processors, a database comprising social media posts with the social media post and the actual engagement rate; and training, by the one or more processors, the predictive model to determine if the number of hashtags of the proposed social media post increases the engagement rate of the proposed social media post a designated percentage, wherein the training comprises:

accessing, by the one or more processors, the database comprising social media posts with associated engagement rates;

calculating, by the one or more processors, mean engagement rates associated with various numbers of hashtags;

determining, by the one or more processors, based on the mean engagement rates, a specific number of hashtags at which the engagement rate with a given social media post of the social media posts, increases the designated percentage;

updating, by the one or more processors, the predictive model with the specific number of the hashtags, where the specific number of the hashtags comprises a baseline number of hashtags to increase the engagement rate the designated percentage; and determining, by the one or more processors, whether to increase the number of hashtags of the proposed social media post by applying the updated trained predictive model.

18. The method of claim 1, wherein the one or more processors determine that the proposed social media post is not within the desired engagement rate, the method comprising:
- automatically implementing, by the one or more processors, the changes to the proposed social media post; and
- displaying, by the one or more processors, the social media post with the changes proposed to the social media post to the user, via the user interface.

19. The method of claim 18, further comprising:
- automatically publishing, by the one or more processors, the social media post with the changes proposed to the social media post.

20. The method of claim 3, wherein performing the multiple linear regression analysis on the multimedia element comprises analyzing elements of the multimedia selected from a group consisting of: people, identifiable places or landmarks, technological devices, positive or inspirational messages, tips, and behind-the-scenes activities.

* * * * *